United States Patent [19]
Strolle et al.

[11] Patent Number: 6,134,373
[45] Date of Patent: *Oct. 17, 2000

[54] SYSTEM FOR RECORDING AND REPRODUCING A WIDE BANDWIDTH VIDEO SIGNAL VIA A NARROW BANDWIDTH MEDIUM

[75] Inventors: Christopher H. Strolle, Glenside, Pa.; Chandrakant B. Patel, Hopewell; Werner F. Wedam, Lawrenceville, both of N.J.; Jung Wan Ko, Suweon, Rep. of Korea; Raymond Schnitzler, Piscataway, N.J.; Jong Kyung Yun, Suweon, Rep. of Korea

[73] Assignee: Samsung Electronics Co., Ltd., Suwon, Rep. of Korea

[*] Notice: This patent is subject to a terminal disclaimer.

[21] Appl. No.: 07/787,690

[22] Filed: Nov. 4, 1991

Related U.S. Application Data

[63] Continuation-in-part of application No. 07/635,197, Jan. 2, 1991, abandoned, which is a continuation-in-part of application No. 07/569,029, Aug. 17, 1990, Pat. No. 5,113,262.

[51] Int. Cl.[7] ...................................................... H04N 9/79
[52] U.S. Cl. ................................................. 386/9; 386/33
[58] Field of Search ..................................... 358/310, 335, 358/330, 11, 21 R, 12, 13, 133, 105, 135, 141, 142, 146, 16, 31, 8; 360/33.1; H04N 11/20, 11/06, 11/04, 9/64, 7/18, 7/04, 7/08, 9/44, 9/79, 5/76

[56] References Cited

U.S. PATENT DOCUMENTS

| | | | |
|---|---|---|---|
| 4,660,072 | 4/1987 | Fukinuki | 358/12 |
| 4,668,988 | 5/1987 | Sasaki et al. | 358/166 |
| 4,745,460 | 5/1988 | Fukinuki | 358/12 |

(List continued on next page.)

FOREIGN PATENT DOCUMENTS

| | | |
|---|---|---|
| 0 015 499 A1 | 9/1980 | European Pat. Off. . |
| 0 362 747 A2 | 4/1990 | European Pat. Off. . |

(List continued on next page.)

OTHER PUBLICATIONS

Archie R. McCrady, Patent Office Practice (Fourth Edition), 1959, p. 174.

*Primary Examiner*—Thai Tran
*Attorney, Agent, or Firm*—Robert E. Bushnell, Esq.

[57] ABSTRACT

An encoder separates luminance and chrominance signal components of a composite video signal. The frame-to-frame changes in the luminance signal are detected, and a motion signal is derived therefrom. The higher frequency portion of the luminance signal is adaptively de-emphasized in amplitude and folded into the spectrum of the lower frequency portion of the luminance signal, to generate a folded-spectrum luminance signal for modulating the frequency of a luma carrier. In a combined signal, suitable for magnetic recording in accordance with a modified VHS standard, the chrominance signal is translated in frequency to generate a color-under signal in a frequency band below that occupied by the FM luma carrier. The de-emphasized higher frequency portion of the luminance signal, as folded into its lower frequency portion, and encoding of the motion signal onto vacant portions of the frequency band below that occupied by the FM luma carrier in such a magnetic recording facilitate its being compatibly reproduced by conventional VHS reproduction devices. In a wideband reproduction device a decoder demodulates the folded-spectrum luminance signal from the FM luma carrier, unfolds the lumininance signal, and reemphasizes the high frequencies of the unfolded luminance signal. The color-under signal is translated in frequency to regenerate chrominance signal combined with the unfolded luminance signal with its high frequencies re-emphasized to their original amplitude, regenerating a composite signal descriptive of a full bandwidth image. The motion signal is utilized in the encoder for motion-adaptively pre-filtering the input luminance and is recovered in the decoder for motion-adaptively post-filtering the unfolded luminance.

128 Claims, 16 Drawing Sheets

U.S. PATENT DOCUMENTS

| | | | |
|---|---|---|---|
| 4,831,463 | 5/1989 | Faroudja . | |
| 4,870,481 | 9/1989 | Kawamata . | |
| 4,956,726 | 9/1990 | Takimoto et al. | 358/335 |
| 5,031,030 | 7/1991 | Hurst, Jr. | 358/12 |
| 5,037,361 | 8/1991 | Takahashi | 475/195 |
| 5,063,457 | 11/1991 | Ishikawa et al. | 358/330 |
| 5,113,262 | 5/1992 | Strolle et al. | 358/310 |
| 5,140,437 | 8/1992 | Yonemitsu et al. | 358/342 |
| 5,182,642 | 1/1993 | Gersdroff et al. | 358/133 |
| 5,202,957 | 4/1993 | Serrao | 379/53 |
| 5,218,438 | 6/1993 | Kim | 358/162 |

FOREIGN PATENT DOCUMENTS

| | | |
|---|---|---|
| 0 362 747 A3 | 4/1992 | European Pat. Off. . |
| 0 484 154 A2 | 5/1992 | European Pat. Off. . |
| 2 628 280 | 9/1989 | France . |
| 1 230 467 | 12/1966 | Germany . |

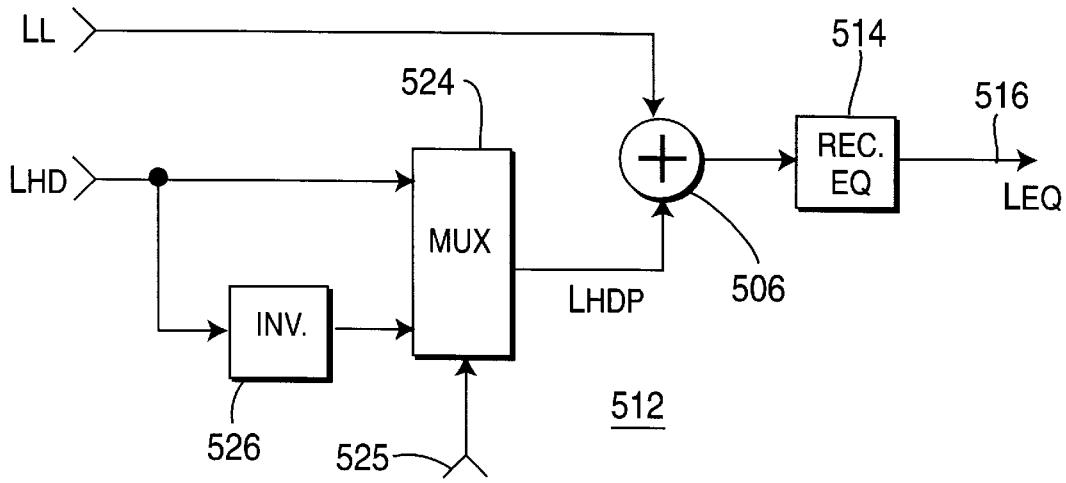
FIG. 6d
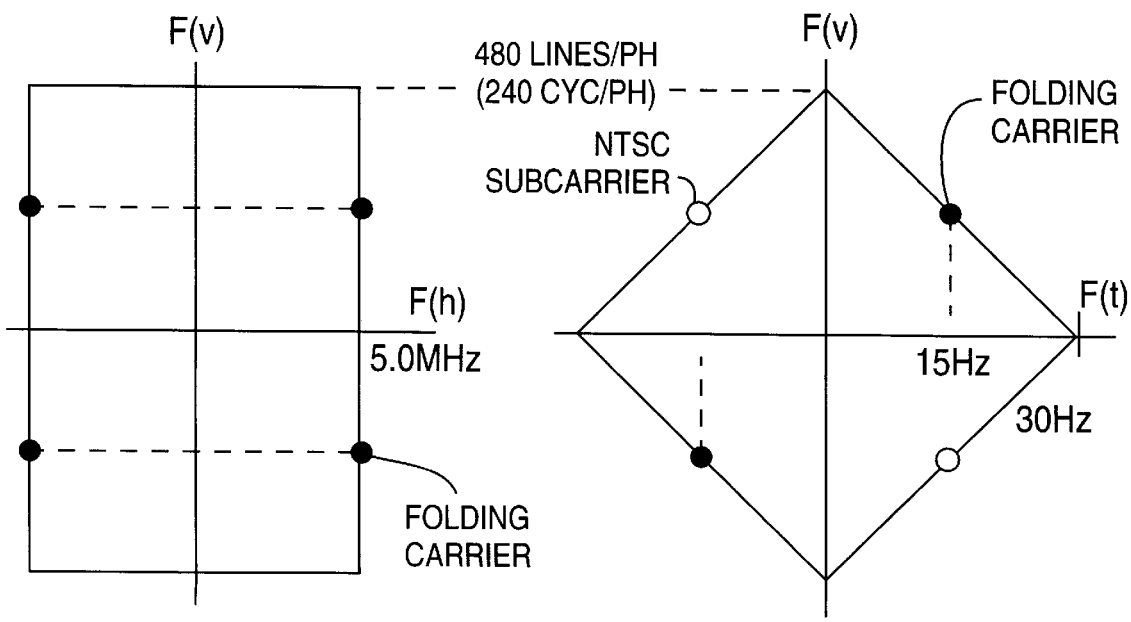
FIG. 6e  FIG. 6f

ORIGINAL INPUT SIGNAL

FOLDING (SUBNYQUIST SAMPLING)

FIXED DEEMPHASIS OF FOLDED HIGH LUMA

CHROMA COMB FILTER IN EXISTING PLAYERS

FIG. 10d   FIG. 10e

(629 KHz)

SYSTEM FOR RECORDING AND REPRODUCING A WIDE BANDWIDTH VIDEO SIGNAL VIA A NARROW BANDWIDTH MEDIUM

CROSS-REFERENCE TO RELATED APPLICATIONS

This application is a Continuation-In-Part of prior commonly assigned U.S. patent application Ser. No. 07/635,197 filed Jan. 2, 1991, now abandoned, which is itself a Continuation-In-Part of prior commonly assigned U.S. patent application Ser. No. 07/569,029 filed Aug. 17, 1990, now U.S. Pat. No. 5,113,262, the disclosures of which prior applications are incorporated hereinto by reference thereto.

The subject matter of the present application is related to the subject matter disclosed and claimed in the following prior co-pending U.S. patent applications, the claimed inventions of which were commonly assigned to or under an obligation of assignment to the assignee of the present application at the time the respective inventions were made, and in which prior applications at least one named inventor is in common with the present application: Ser. No. 531,057 filed May 31, 1990 and issued Jan. 21, 1992 as U.S. Pat. No. 5,083,203; Ser. No. 531,070 filed May 31, 1990; Ser. No. 531,144 filed May 31, 1990; Ser. No. 562,907 filed Aug. 6, 1990; Ser. No. 599,566 filed Oct. 18, 1990; Ser. No. 604,493 filed Oct. 26, 1990; Ser. No. 604,494 filed Oct. 26, 1990; Ser. No. 607,709 filed Nov. 1, 1990; Ser. No. 609,536 filed Nov. 5, 1990; and Ser. No. 657,029 filed Feb. 19, 1991, the disclosures of which prior applications are incorporated hereinto by reference thereto.

The subject matter of the present application is related to the subject matter disclosed and claimed in prior co-pending commonly assigned U.S. patent application Ser. No. 545,486 filed Jun. 29, 1990, the disclosure of which prior application is incorporated hereinto by reference thereto.

BACKGROUND OF THE INVENTION

The present invention relates generally to a video signal processing system for processing a wide bandwidth video signal into a reduced bandwidth signal suitable for transmission and/or recording via a narrow bandwidth signal medium whereby the information content of the wide bandwidth video signal is retained in the reduced bandwidth signal and the reduced bandwidth signal is compatible with conventional narrow bandwidth reception apparatus, and for receiving and/or reproducing and processing the transmitted reduced bandwidth signal for recovering therefrom the information content of the original wide bandwidth signal.

The present invention relates more particularly to a signal processing system applicable to a narrow bandwidth format video cassette recorder (VCR) for converting a wide bandwidth input video signal to a reduced bandwidth video signal containing the information content of the input wide bandwidth video signal within the reduced bandwidth whereby the reduced bandwidth video signal may be recorded and reproduced conventionally by such narrow bandwidth format VCR, and for processing the reproduced narrow bandwidth video signal to recover the information content of the wide bandwidth video signal therefrom whereby a wide bandwidth video signal may be reconstructed for yielding improved video bandwidth of the reproduced signal comparable to the full bandwidth of the input video signal, while maintaining backward compatibility of the recorded reduced bandwidth video signal for playing back video cassettes recorded by this improved video signal processing system on available conventional narrow bandwidth format VCRs.

Conventional consumer type VCRs record video information onto video tape cassettes in one of several formats. The well-known VHS format system uses a relatively narrow bandwidth format and produces degraded picture quality in comparison to standard broadcast video chiefly because the recorded VHS format video signal has insufficient horizontal resolution. An enhanced VHS format type recording system, popularly called Super VHS or S-VHS, produces enhanced picture quality by recording a wider bandwidth video signal on the video tape cassette using a higher FM carrier frequency for the luminance information, thus yielding improved picture resolution. Such a format requires a higher FM carrier frequency, higher quality tape in the cassette and higher quality recording and playback mechanisms, heads and circuitry. However, the S-VHS format is not backward compatible with standard VHS format VCRs. That is, although an S-VHS format VCR can reproduce (play back) cassettes recorded on either S-VHS format or standard VHS format VCRs, a standard VHS format VCR cannot play back cassettes recorded on S-VHS format VCRs.

It has long been a goal of video engineers to increase the amount of information transmitted through a given narrowband channel, such as an NTSC signal channel, which is limited to a nominal 4.2 Mhz of useful bandwidth. Because the frame and line rates (temporal and vertical resolution) are usually fixed, restricting the bandwidth translates into restricting the horizontal resolution. In some cases, the nominal bandwidth of the channel is limited to 3 MHz or even 2.5 MHz, resulting in an image with insufficient horizontal resolution.

It has long been recognized that in scanned television systems, the signal energy is concentrated spectrally in the spatio-temporal domain at periodic intervals according to the scanning frequencies, and the video spectrum has so-called 'holes', that is, gaps between these discrete signal areas in which the signal energy is very small, such gaps also occurring at regular intervals. The NTSC composite (i.e. 'colorplexed') color video system represents a system which uses one of these 'holes' to carry the color information. In the NTSC system, the signal, i.e., chrominance or 'chroma' signal containing the color information is transmitted encoded onto the baseband video as color difference or mixture signal quadrature, i.e. two-phase, amplitude modulation of a suppressed nominally 3.58 MHz sub-carrier (i.e. AM sidebands of a pair of suppressed subcarriers in phase quadrature) which carrier's frequency (3.579545 MHz) is very carefully selected (227.5 times the horizontal scanning frequency of 15.734 KHz) so that a minimum disturbance occurs when a color video signal is displayed on a black and white receiver. Specifically, the NTSC color subcarrier frequency is interleaved horizontally, vertically, and temporally with the luminance signal spectrum to minimize crosstalk and intermodulation between the luminance and chrominance components of the composite video signal.

It was recognized at around the time of the adoption of the NTSC colorplexed system that such frequency spectrum 'holes' could also be used to transmit additional horizontal information to increase the horizontal resolution of the reproduced image. In such systems, the higher frequency horizontal information is interleaved spectrally with the lower frequency horizontal information in a similar manner as the chrominance information is in the NTSC color system. An article entitled "REDUCTION OF TELEVISION BANDWIDTH BY FREQUENCY INTERLACE" by E. A. Howson et al. in J. Brit. I. R. E., February, 1960, pp. 127–136 contains a description of such a system which utilized analog signal processing techniques. This described system, however, could not accurately reproduce the full bandwidth image in its original form because it was unable to completely remove the artifacts resulting from the frequency interleaving, which manifested themselves as annoying dot crawl patterns.

Sampled data digital video signal processing techniques were later developed using sub-Nyquist sampling (sometimes termed subsampling) to address the problem. These techniques involved replacing every odd sample in a first video line with a zero-valued sample, and then on the next line, replacing every even sample with a zero-valued sample. On alternate frames, the patterns are reversed.

German Patent Publication No. 82100286.2 entitled "Verfahren zum Ubertagen von Fernsehsignalen uber einen genormten bandbreitebegrenzten Ubertragunskanal und Anordnung zum Durchfuhren des Verfahrens," Jan. 1, 1982 by Professor Wendland et al. describes principles of offset subsampling and bandwidth compression as applied to advanced television systems. This patent publication also describes techniques for implementing television systems in accordance with the described principles.

Theoretically, the Howson et al. frequency folding technique and the sub-Nyquist sampling technique are equivalent, when the folding carrier frequency '$f_f$' is one-half the sampling frequency '$f_s$'. But, although theoretically equivalent, the later sampled data digital systems provided improved reconstruction of the received image because of the existence of line and frame combing techniques, which had not been developed at the time of the Howson et al. system. The sub-Nyquist sampling techniques, however, were developed for totally sampled data digital systems as data reduction (i.e. compression) techniques in digital systems, and the signals generated by these sampling techniques were not generally intended to be passed through a narrowband analog channel.

In an article entitled "DEVELOPMENT OF HDTV RECEIVING EQUIPMENT BASED ON BAND COMPRESSION TECHNIQUE (MUSE)", by Kojima et al. in IEEE Transactions on Consumer Electronics, Vol. CE-32, No. 4, November 1986, pp. 759–768, another data compression scheme is described which achieves bandwidth compression by sampling each pixel once every other frame. This scheme works well for non-moving images. For moving images, a motion vector is developed, and the actual rate of sampling of each pixel is adaptively varied in response to the motion vector so that a sample of the pixel is transmitted every other frame on the average, but more often when that pixel is representing a moving image.

U.S. Pat. No. 4,831,463 issued May 16, 1989 to Faroudja describes apparatus for processing a video signal having a predetermined bandwidth in order to pass the video information through a limited bandwidth channel, such as magnetic tape. In the apparatus described in this patent, a video signal pre-processor includes a comb filter to produce spectral holes, such as described above, between spectrally active areas in the video signal spectrum. A folding circuit folds the baseband video luminance signal about a predetermined folding frequency selected so that aliases of the baseband luminance signal are placed in the spectral holes previously made in the video signal. A low pass filter then filters the resulting folded video signal so that its bandwidth is about one-half (½) the bandwidth of the original video signal. The resulting signal may then be transmitted through the limited bandwidth channel.

The Faroudja '463 patent further describes a post-processor which receives the folded signal from the limited bandwidth channel. The post-processor includes an unfolding circuit which unfolds the received signal about a predetermined unfolding frequency. A comb filter then processes the unfolded signal to remove the alias components resulting from the unfolding process. The signal produced by this comb filter closely approximates the original video signal in terms of the bandwidth and information content.

It is interesting to note that the Howson et al. article discussed two bandwidth reduction techniques for video luminance signals by frequency interlacing or interleaving. In the first technique discussed, the video luminance signal spectrum is divided into two equal half-bands (i.e. band-split at frequency 'f') and the upper half-band (i.e. the high band luminance from frequency 'f' to frequency '2f') is used to modulate a sub-carrier which has its frequency set to be near the upper frequency limit of the normal video band (i.e. '2f'). The lower sideband of the modulator output is selected and combined with the original lower half-band, whereby the resultant frequency-interlaced signal after combination contains all of the original luminance signal information but in one-half the bandwidth of the original signal, thus being suitable for transmission over a reduced bandwidth channel.

In the second technique discussed by Howson et al., instead of dividing the main video luminance signal into two half-bands and modulating the '2f' sub-carrier with the high frequency half-band only, the entire main video (i.e. baseband) luminance signal is used to modulate the '2f' sub-carrier. The lower sideband of the modulator output signal contains the required interleaved signal in correct frequency relationship with the main baseband video signal. If the modulator output is added to the main signal and the resultant added signal is passed through a low-pass filter having its cutoff frequency at approximately one-half the sub-carrier frequency, the low-pass filtered output signal consists of the correct composite reduced bandwidth signal (with the sub-carrier suppressed). Howson et al. teach that this second technique avoids the need for using complementary low-pass and band-pass filters as required by the first technique employing band-splitting, and Howson et al. adopted this second technique in a described experimental apparatus, although the summary abstract appearing in the Howson et al. article somewhat misleadingly implies that the first technique using band-splitting was employed.

The folding/unfolding system described in the Faroudja '463 patent is similar in principle to the second technique described and adopted by Howson et al., in that the folding modulation sub-carrier frequency in the Howson et al. system is selected to be an odd multiple of one-half the line scan frequency while the frequency of the folding heterodyne oscillator/mixer or of the sub-Nyquist sampling clock applied to the multiplier used as the folding modulator in Faroudja '463 is selected to be an odd harmonic of one-half the line scan rate or a harmonic of an odd multiple of the line and frame scan rate, and in both systems the folding modulation is performed on the baseband luminance signal and both systems thus necessarily require low-pass filtering after folding to remove frequencies greater than one-half the folding frequency from the folded signal.

Both the Howson et al. article and the Faroudja '463 patent describe folding systems which, if incorporated into an improved VCR, could not produce cassettes which could be played back on conventional VCRs without introducing unacceptable artifacts into the displayed image, that is, recordings of such a folded video signal would lack 'backward playback compatibility' to existing VCRs. This is primarily due to the amplitude of the folded high frequency components present within the spectrum of the low frequency components on the previously recorded cassette. The magnitude of the folded high frequency components is sufficiently high as to introduce intolerable artifacts and degradation (dot crawl, twinkling, line flicker, etc.) into an image display produced from a video signal from which the folded high frequency components were not properly removed.

Reference is also made to an article by T. S. Robson entitled "A Compatible High Fidelity Television Standard for Satellite Broadcasting", appearing in "Tomorrow's Television", SMPTE, (1982) at pages 218–236. This article proposed an extended definition 'MAC' component type video signal system including filtering high frequency diagonal information from conventional video signals to make available certain gaps in the signal spectrum, and using a 3-D sampling process to deliberately alias useful high frequency information into these gaps, followed by truncation of the original signal spectrum. A post filter/interpolator would be used to restore the folded energy to its correct high frequency location, thereby recreating the original spectrum. This article also describes the necessity for pre- and post-filtering to avoid aliasing in the displayed image. On a conventional display device without 3-D post filtering, however, the high frequency alias product will be present, resulting in image impairment.

It is desirable that an improved video recording system be able to record wider bandwidth video signals on a standard quality cassette than those recordable by conventional narrow bandwidth VCRs, while still maintaining backward compatibility with conventional narrow bandwidth VCRs, and not require especially high quality magnetic tape or record and playback mechanisms. That is, it is desirable that standard quality narrow bandwidth media video cassettes may be recordable with wider bandwidth, higher frequency video information using the improved system and be able to be compatibly played back by conventional narrow bandwidth VCRs without producing noticeable visual artifacts in the reproduced image, even if the conventional VCR may not be able to reproduce the full bandwidth signal recorded on such a cassette.

Howson et al. were not concerned with backward compatibility of the interleaved signal, but instead suggested including a pre-emphasis filter for boosting the interleaved high frequency components of the folded luminance signal in order to minimize the effects of crosstalk from the low frequency luminance components during the transmission of the folded signal through the channel and sub-carrier interference at the receiver. If a video cassette recorded by a VHS format VCR modified to include the system taught by Howson et al. were played back on a standard VHS format VCR, the interference of the pre-emphasized high frequency components which would not be removed would produce an even more objectionable image than that produced by the Faroudja system.

The Faroudja '463 patent does not include any teaching of compatibility with pre-existing recording media and apparatus, other than a mention that such is desirable and is one object of that patent's invention. There is no teaching whatsoever in the Faroudja '463 patent of any apparatus or process for achieving backward or 'downward' compatibility with existing playback apparatus. As described above, a recording made by a system according to the Faroudja '463 patent's teaching is not backward compatible with existing playback apparatus because of the high level of the folded luminance high frequencies in the luminance low frequencies.

Thus, the need has remained for improving the video resolution obtainable by the present limited bandwidth video recording and playback techniques, media and mechanisms in a manner which retains backward playback compatibility with existing VCRs and VCPs.

It is an object of the present invention to provide a video signal processing system by which an input wide bandwidth full resolution video signal may be transmitted or recorded as a limited bandwidth video signal as by broadcast or video recording via a limited bandwidth medium, while still retaining in the limited bandwidth signal essentially the information content of the input wide bandwidth signal in such a form that the limited bandwidth signal may be compatibly received or reproduced by conventional narrow bandwidth apparatus to produce a video image without objectionable artifacts.

It is also an object of the present invention to provide a video signal processing system capable of receiving or reproducing such a transmitted or recorded limited bandwidth video signal and reconstructing therefrom a wide bandwidth video output signal corresponding to and containing the information of the input wide bandwidth video signal so as to produce a full resolution video image therefrom.

It is further an object of the present invention to provide a video signal processing system applicable to conventional narrow bandwidth video recording and playback apparatus for improving the resolution of video recordings made and reproduced thereby without requiring higher quality recording and playback mechanisms or recording media.

Still further objects of the present invention include providing a video recording apparatus capable of recording an input wide bandwidth video signal within a limited bandwidth such that the recorded limited bandwidth signal may be compatibly reproducible by conventional narrow bandwidth playback apparatus, and providing a video playback apparatus capable of reproducing such a recorded limited bandwidth signal to recover therefrom a wide bandwidth playback signal corresponding to the input wide bandwidth video signal.

Additional objects of the present invention include providing video signal processing techniques for encoding an input wide bandwidth signal into a limited bandwidth video signal containing in encoded form essentially the information of the input wide bandwidth video signal within a substantially reduced bandwidth and compatibly reproducible by conventional narrow bandwidth playback apparatus for producing a video image without objectionable artifacts, and for decoding such a limited bandwidth video signal to produce therefrom a wide bandwidth video signal corresponding to the input wide bandwidth video signal for producing a video image having the same resolution as the input wide bandwidth video signal.

SUMMARY OF THE INVENTION

In accordance with one aspect of the present invention, there is provided a video signal processing system by which it is possible to bandwidth-reduce an input wide bandwidth video signal into a narrow bandwidth video signal, by suitably processing the input wide bandwidth video signal to convert it into a narrow bandwidth video signal while retaining the video information content of the input wide bandwidth video signal, the resultant converted narrow bandwidth video signal being recordable and reproducible via a narrow bandwidth recording medium.

In accordance with another aspect of the present invention there is provided a video recording system capable of converting an input wide bandwidth video signal into a narrow bandwidth video signal while retaining the video information content of the input wide bandwidth video signal, and recording the converted narrow bandwidth video signal onto a narrow bandwidth recording medium, which recorded narrow bandwidth video signal also retains therein the video information content of the original input wide bandwidth video signal, such that the thusly recorded narrow bandwidth video signal may be compatibly reproduced by conventional narrow bandwidth reproducing devices to provide a reproduced compatible narrow bandwidth video image of comparable quality to that of conventional narrow bandwidth video recordings.

In accordance with a further aspect of the present invention, there is provided a video recording and reproducing system capable of converting an input wide bandwidth video signal to a narrow bandwidth video signal retaining the video information content of the input wide bandwidth video signal by an adaptive process controlled by a control signal derived from the input video signal, recording the converted narrow bandwidth video signal onto a narrow bandwidth recording medium, which thusly recorded narrow bandwidth video signal also retains encoded compatibly therein the video information content of the original input wide bandwidth video signal as well as the control signal, whereby the recorded narrow bandwidth video signal may be compatibly reproduced by conventional narrow bandwidth reproducing devices to provide a compatible narrow bandwidth video image of comparable quality to that of conventional narrow bandwidth video recordings and without objectionable artifacts, and which inventive system is also capable of reproducing the recorded narrow bandwidth video signal from the recording medium, recovering the control signal therefrom and processing the reproduced narrow bandwidth signal in accordance with the recovered control signal to reconstruct the reproduced narrow bandwidth video signal into a wide bandwidth video signal corresponding to the original input wide bandwidth video signal.

In accordance with the present invention, a full-bandwidth input video signal is passed through an encoder which generates an encoded reduced bandwidth video signal having a limited bandwidth low frequency luminance component with a de-emphasized amplitude high frequency luminance component folded into it. Encoded video signals produced by the encoder according to the present invention can be output to a narrow bandwidth video medium or channel, e.g. be recorded on a conventional narrow bandwidth magnetic medium such as a VHS format video cassette.

When played back by a VCR embodied in accordance with the present invention, the reproduced narrow bandwidth encoded video signal is passed through a decoder wherein the folded de-emphasized amplitude high frequency luminance component may be recovered by unfolding and amplitude re-emphasis processing and the full-bandwidth video signal thereby restored, while when played back by a conventional narrow bandwidth VCR lacking any capability for unfolding and recovery of the recorded folded high frequency luminance component, the reproduced folded high frequency luminance component is at a sufficiently low amplitude level, by virtue of the advantageous de-emphasis performed thereon during the encoding processing of the present invention, that no objectionable interference will result in the reproduced narrow bandwidth video image, thus providing backward playback compatibility of the encoded recording with conventional narrow bandwidth VCRs.

The video recording and reproducing system in accordance with the present invention is embodied in part by an encoder for receiving and suitably processing a wide bandwidth baseband video input signal which includes a baseband luminance component having low and high frequency luminance (luma) components and a chrominance (chroma) component, to produce therefrom an encoded band-limited luminance signal in which the high frequency luminance components of the input wide bandwidth video signal are advantageously folded into the spectral bandwidth of the low frequency luminance components, along with an encoded chrominance-plus-motion signal containing the chrominance component of the input wide bandwidth video signal together with a motion representative signal derived from the input video signal and utilized in a motion adaptive processing of the input video signal in the encoder, thereby producing an encoded video signal having its bandwidth limited or compressed to a narrow bandwidth relative the bandwidth of the original input video signal while still retaining the high frequency luminance detail information of the original input video signal. The encoded luminance and chrominance-plus-motion signals from the encoder, which are suitable for a narrow bandwidth video channel or medium, may thus advantageously be recorded onto a narrow bandwidth capacity videotape as by conventional narrow bandwidth format VCR recording apparatus.

The encoding process in accordance with the present invention carefully controls the magnitude of the high frequency luminance component adaptively during the folding operation to an appropriate level in order to ensure that the folded high frequency component in the band-limited signal will not generate objectionable noise, interference or artifacts in the displayed video image when the recorded encoded band-limited signal is reproduced by a conventional narrow bandwidth format VCR or VCP, thereby assuring backward playback compatibility of improved recordings processed in accordance with the present invention with conventional narrow bandwidth format VCRs and VCPs.

In contrast to prior bandwidth folding techniques such as that proposed by Howson et al. in which the high frequency components of the luminance signal are boosted in amplitude by a pre-emphasis process or that described both by Howson et al. and by the Faroudja '463 patent, in which the baseband luma signal is folded without any amplitude adjustment, the encoding processing in accordance with the present invention splits the baseband luminance signal into high and low frequency components, as described but disfavored by Howson et al., and then advantageously adaptively de-emphasizes the high frequency components of the luminance signal during the folding operation with the degree of de-emphasis being governed by the energy measured in the high band luminance, so that the folded high frequency luminance component in the encoded band-limited luminance signal will not generate objectionable interference or noise in a displayed video image when the encoded band-limited video signal is reproduced by a conventional narrow video bandwidth reproduction device, for thereby providing backward compatibility of the encoded band-limited video signal with existing narrow video bandwidth reproduction devices.

De-emphasis of the high frequency luminance components of the folded band-limited video signal can be performed in various ways, for example in a fixed manner. However, the present inventors have found it to be particularly advantageous to apply an adaptive de-emphasis to the high frequency luminance components whereby those high frequency luminance components in the folded band-limited signal which will most tend to generate objectionable noise or interference in the displayed video image on reproduction by a conventional narrow video bandwidth reproduction device, for example high amplitude—high frequency luminance components, will be de-emphasized to a greater extent, while those high frequency luminance components in the folded band-limited signal which have less tendency to cause noise or interference on narrow bandwidth reproduction and which might tend to suffer noise degradation in the displayed wide-bandwidth video image on reproduction by a wide bandwidth reproduction system if greatly de-emphasized, for example low amplitude—high frequency luminance components, will be de-emphasized to a lesser extent or passed unaltered. Such an adaptive de-emphasis technique has the advantage that it provides backward compatibility to the encoded band-limited video signal while also preserving the image quality of the reproduced wide-bandwidth video signal. Thus, the high luma de-emphasis during the folding operation in the encoder is preferably performed adaptively in accordance with the present invention.

Furthermore, in advantageous contrast to the prior baseband folding systems described in the Howson et al. article and the Faroudja '463 patent which require low pass filtering of the luma signal after folding because the folding process, performed on the baseband luminance signal, results in unwanted upper sideband components, in the encoding process according to the present invention the luminance signal can be band-split prior to de-emphasis processing and folding, the folding operation performed directly upon the high frequency luminance component signal by a sampling technique whereby the folded de-emphasized high band luminance signal, after being band-shifted to the low band frequency spectrum, is then simply combined with the low band luminance signal to produce the band-limited folded luminance signal, without requiring any lowpass filtering of the folded luminance signal. Alternatively, the present invention may implement folding in the baseband in combination with de-emphasis of the luminance high frequencies.

It has previously been known to apply different processing, such as different types of filtering, to a video signal depending upon some factor such as, for example, the degree of motion in the video image, for instance where one type of filtering is more appropriate for portions of the video image signal in which there is no motion or only a small amount of motion while another different type of filtering is more appropriate for portions of the video image signal exhibiting a greater degree of motion. A motion signal may be generated by analyzing the video image signal to determine the degree of motion occurring in the video image, and then this motion signal may be used to control a switch which appropriately applies the video image signal to different filters depending upon the degree of motion in the video image. The motion signal may for example control a soft switch at the outputs of different filters so that amounts of the filtered signals from the different filters provided to an output may be controlled depending upon the motion content of the respective portions of the video image.

In accordance with a further aspect of the present invention, the encoder also generates a motion representative signal derived from the input wide bandwidth video signal and utilizes this motion representative signal for effecting a motion-adaptive spatio-temporal filtering of the video signal during the encoding processing. So that this generated motion representative signal can advantageously be also utilized in the decoding process for effecting a corresponding motion adaptive processing of the reproduced video signal, the motion representative signal is itself suitably encoded into the band-limited video signal in such a way that it may be recovered on reproduction and utilized in reconstructing the wide bandwidth video signal from the encoded band-limited video signal. However, at the same time this encoding of the motion signal onto the encoded band-limited video signal must not give rise to noise or interference when reproducing the encoded band-limited video signal by a conventional narrow bandwidth format reproduction device. Therefore, in accordance with a further aspect of the present invention, the motion signal may advantageously be encoded onto a vacant portion of the video signal spectrum which will not affect narrow bandwidth reproduction, for backward compatibility with existing narrow bandwidth reproduction devices. In a practical implementation of the inventive system for the conventional VHS format, this is advantageously accomplished in accordance with a further aspect of the present invention by suitably encoding the motion signal onto vacant portions of the VHS format color-under signal in such a way that the encoded band-limited video recording may be compatibly reproduced by a conventional VHS format VCR without interference, yet permit an improved VCR according to the invention to extract the encoded motion signal by a decoding process on the playback side.

The video recording and reproducing system in accordance with the present invention is also embodied by a decoder for processing the encoded band-limited video to unfold and recover the high frequency luminance components encoded in the band-limited video signal and to restore the wide bandwidth of the original input video signal by a bandwidth-expansion reconstructive processing which includes unfolding of the folded signal and performing a motion-adaptive filtering of the unfolded signal.

In accordance with another aspect of the present invention, the decoder performs a re-emphasis processing of the recovered unfolded high frequency luminance components to restore them to their original amplitude and then combines them with the recovered low frequency luminance components so that a wide bandwidth video signal can be reconstructed therefrom whereby a wide bandwidth video image may be reproduced from the reconstructed wide bandwidth video signal. Advantageously, where the de-emphasis processing during encoding is performed adaptively, the re-emphasis processing is also performed adaptively, preferably with a transfer function which is the inverse of that employed during the encoding side de-emphasis processing, in order to realize a more faithful reconstruction of the amplitude relationship of the high frequency luminance components in the unfolded wide bandwidth video signal.

The decoder also provides for recovering the encoded motion signal from the encoded band-limited video signal, so that the recovered motion signal may be utilized in the decoding processing. In accordance with a further aspect of the invention, when implemented for use with the conventional VHS format, in the decoder the encoded motion signal, previously combined together with the chrominance component of the video signal into a chrominance-plus-motion signal during encoding, is separated from the chrominance component during the decoding process.

These and other features and advantages of the present inventive system will be described in greater detail in the following detailed description taken together with the accompanying drawings.

BRIEF DESCRIPTION OF THE DRAWINGS

FIG. 6d is a detailed block diagram of a folding modulator in the folding circuit;

FIG. 6e is a plot of the vertical versus horizontal frequency characteristics of a folding modulation performed in the folding circuit;

FIG. 6f is a plot of the vertical versus temporal frequency characteristics of the folding modulation;

FIG. 10b is a detailed block diagram of an adaptive re-emphasis circuit forming a part of the unfolding circuit illustrated in FIG. 10a;

FIG. 10d shows a folded signal;

FIG. 10e shows an unfolded signal;

FIG. 10g is a block diagram of a soft switch of a spatio-temporal post-filter circuit of the unfolding circuit in FIG. 10a;

DETAILED DESCRIPTION OF THE INVENTION

The system of the present invention may be implemented using analog and/or digital signal processing techniques. For sake of example, an implementation of the system according the present invention will be described below using digital signal processing. However, given the description herein, one of ordinary skill in the art will understand that the invention may be practiced using analog techniques and how such may be implemented.

In the Figures, equalizing delays have been omitted for the purposes of simplicity. One skilled in the art of video signal processor design will appreciate the need for such delays to properly time-align pixels subject to different delays on different processing paths due to the differing processing performed in those paths. One skilled in the art would understand where such delays would be necessary and how long each of the delays would have to be, and such delays will not be described or discussed below.

In addition, in the Figures, various filters are used for filtering in the horizontal, vertical, and temporal directions, having both high pass and low pass response characteristics. One skilled in the art of video signal processor design will appreciate that some of such filters may be constructed as known comb filter designs, and would understand how to properly select the delay periods of the respective delay lines, the number of taps and the weighting of the taps. Consequently, the detailed design of such comb filters will not be discussed below, unless such a design detail is important for other reasons. Further, where A/D and D/A converters are shown or described in the present disclosure, one skilled in the art would understand the desirability of preceding or following such converters with anti-aliasing or sampling clock rejection lowpass filters, respectively, and how this could be implemented, and such will not be further described in detail below.

Also, in the Figures and in the following detailed description, various embodiments constructed in accordance with the present invention are directed to an NTSC composite video baseband signal. One skilled in the art would understand how to modify the embodiments in order to process a PAL video signal, a SECAM video signal or a video signal according to any other standard. Such embodiments could still be constructed in accordance with the teaching of the present invention.

Figure 1:
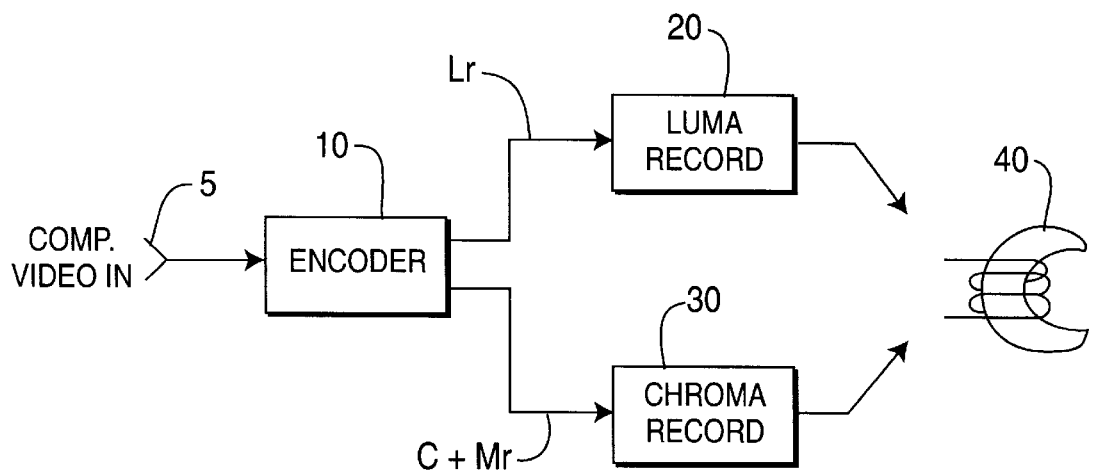
FIG. 1 is a block diagram of the record section of a video recorder implemented in accordance with the present invention.

FIG. 1 is a block diagram of a portion of a record section of a video signal recorder according to the present invention. In FIG. 1, an input terminal 5 is coupled to a source (not shown) of a video signal, for example, an NTSC composite video signal. Input terminal 5 is coupled to an input terminal of an encoder 10. A first output terminal of encoder 10 is coupled to an input terminal of a luminance (LUMA) record circuit 20, similar to those found in conventional VCRs. An output terminal of the luminance record circuit 20 is coupled to a record head 40 in a standard tape transport mechanism, similar to those found in conventional VCRs. A second output terminal of encoder 10 is coupled to an input terminal of a chrominance (CHROMA) record circuit 30, similar to those found in conventional VCRs. An output terminal of the chrominance record circuit 30 is also coupled to the record head 40. The record head records the signals supplied to it by the luma and chroma record circuits 20, 30 onto magnetic tape (not shown) in a standard video cassette.

In operation, the encoder 10 takes a standard full-bandwidth composite NTSC video signal and generates an encoded luminance signal $L_r$, which has the same reduced bandwidth as a standard luminance signal produced by a conventional narrow bandwidth VCR, but with a de-emphasized high frequency component folded into its spectrum. The encoded luminance signal $L_r$ thus contains all the luminance information from the full-bandwidth NTSC input signal, within the reduced bandwidth which can be recorded on the magnetic media of the videotape cassette, thus allowing standard quality cassettes and record and playback mechanisms to be used. In addition, the reduced amplitude of the folded high frequency luminance component in the encoded recording will not cause objectionable artifacts in a displayed image if the recorded cassette is subsequently played back on a standard narrow bandwidth VCR. The luminance record circuit 20 records the encoded luminance signal $L_r$ in exactly the same manner as a limited bandwidth (i.e. narrow band) luminance signal is conventionally recorded in a standard VCR. In a conventional VHS format VCR recording circuit, for example, the separated NTSC luminance signal is frequency modulated onto a luminance carrier which can vary in frequency between approximately 3.4–4.4 MHz (±0.1 MHz) and, after filtering to remove sidebands below 1.2 MHz, occupies a band of frequencies around 1.2–7 MHz.

The encoder 10 also produces a composite chrominance-plus-motion signal $C+M_r$ to be supplied to the chrominance record circuit 30. This composite signal includes the standard chrominance information signal of the input NTSC composite video signal as one component, and a motion representative signal as another component.

As is described more fully below, in the record side processing performed by the encoder 10 of FIG. 1, a motion representative signal M is developed by analysis of the image motion in the input video signal and is advantageously utilized as a control signal for motion-adaptive processing of the video luminance components of the input video signal prior to folding. On reproduction, use of the same motion representative signal M utilized during the record side luminance processing can significantly facilitate luminance processing during reconstruction, so the motion representative signal M is additionally processed in encoder 10 to advantageously combine it with the video chrominance component signal C to provide the composite chrominance-plus-motion signal $C+M_r$ to the chroma record circuit 30 for recording. Details of the encoding and decoding of the motion representative signal M will be more fully described later.

The chrominance record circuit 30 records the chrominance-plus-motion signal $C+M_r$ in exactly the same manner as the conventional chrominance signal is recorded in a standard VCR. In a VHS format VCR for example, the 3.58 MHz NTSC chrominance sub-carrier frequency is heterodyned down (i.e. down-converted) to about 629 KHz to provide a color-under carrier. In accordance with an implementation of the encoder of the present invention for the standard VHS VCR format which will be more fully described later, the composite chrominance-plus-motion signal $C+M_r$ is modulated on a color-under carrier and supplied to the record head 40 together with the luminance signal $L_r$ to be conventionally recorded by the record head 40 onto the video tape in the cassette. It will be understood by those skilled in the art in connection with the chrominance encoding and decoding in accordance with the invention that the NTSC chroma carrier is a two-line sequence, phase alternating by 180° every other line, whereas the color-under chroma carrier is a four-line sequence advancing or retarding in phase by 90° per line, with the phase advancing or retarding on alternate tracks.

Figure 2:
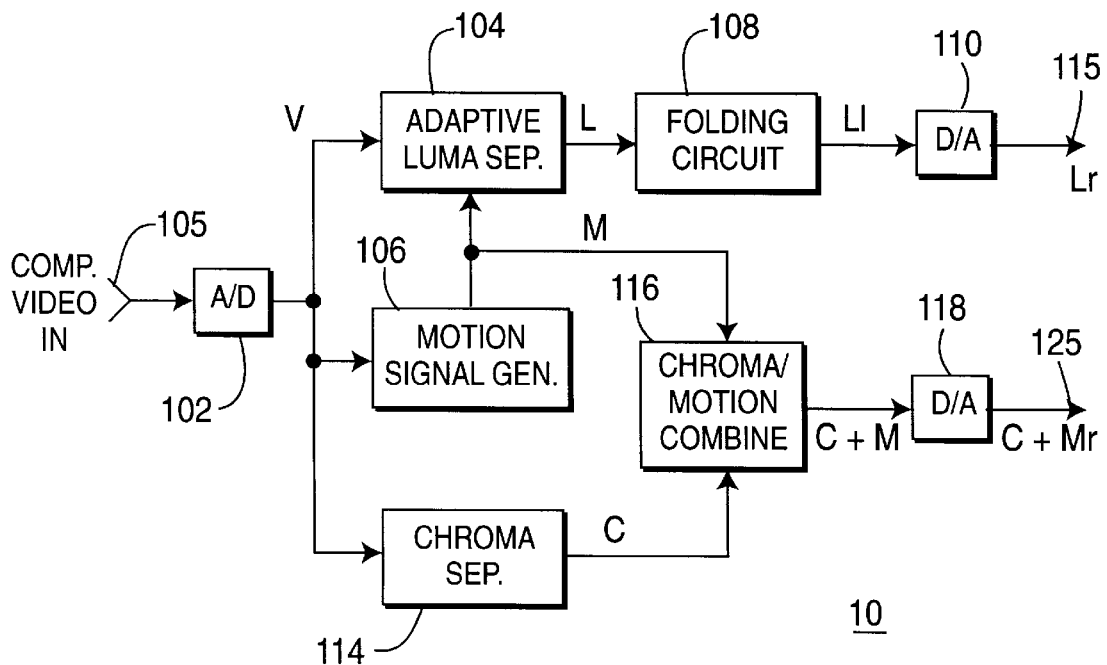
FIG. 2 is a block diagram of an encoder which is a part of the record section of FIG. 1.

FIG. 2 is a more detailed block diagram of the encoder 10 illustrated in FIG. 1. In FIG. 2, an input terminal 105 corresponds to input terminal 5 in FIG. 1. For facilitating the signal processing, digital signal processing techniques may advantageously be implemented, and so input terminal 105 is coupled to an input terminal of an analog-to-digital converter (A/D) 102 which produces a digitized (quantized) composite video output signal V. An output terminal of A/D 102 is coupled to respective input terminals of an adaptive luminance signal separator 104, a motion signal generator 106 and a chrominance signal separator 114. An output terminal of the adaptive luminance signal separator 104 is coupled to an input terminal of a folding circuit 108. As will be more fully described below, folding circuit 108 performs band-splitting of the separated luminance signal from luminance separator 104 into low and high frequency luminance components, performs an adaptive de-emphasis processing of the high frequency luminance component, modulates a folding carrier with the thusly de-emphasized high frequency luminance component to fold the adaptively de-emphasized high frequency luminance component into the low frequency luminance component spectrum, and adds the folded adaptively de-emphasized high frequency luminance component into the low frequency luminance component to thereby provide a bandwidth-limited folded luminance signal $L_f$.

An output terminal of the folding circuit 108 is coupled to an input terminal of a digital-to-analog converter (D/A) 110 by which the digital folded luminance signal $L_f$ is converted to an analog signal $L_r$ suitable for conventional analog recording. An output terminal of D/A 110 is coupled to a first output terminal 115 of encoder 10 to which is supplied the analog luminance signal $L_r$ to be recorded. Output terminal 115 is coupled to the input terminal of the luminance record circuit 20 of FIG. 1.

A motion representative signal output terminal of the motion signal generator 106 is coupled to a control input terminal of the adaptive luminance signal separator 104 and a motion signal input terminal of chrominance/motion signal combining circuit 116. A separated chrominance signal output terminal of the chrominance signal separator 114 is coupled to a chrominance signal input terminal of a chrominance/motion signal combining circuit 116. The composite digital chrominance-plus-motion signal C+M output by chrominance/motion signal combining circuit 116 is coupled to an input terminal of a second digital-to-analog converter (D/A) 118 which outputs the analog chrominance-plus-motion signal C+M$_r$. An output terminal of D/A 118 is coupled to a second output terminal 125 of the encoder 10. Output terminal 125 couples the analog chrominance-plus-motion signal C+M$_r$ to the input terminal of the chrominance record circuit 30 of FIG. 1 for recording onto the magnetic tape in a videocassette.

In operation, the encoder 10 of FIG. 2 first converts the composite video signal input at input terminal 105 to a sampled data multi-bit digital composite video signal V using A/D 102. For an NTSC signal having a nominal bandwidth of approximately DC—4.2 MHz for example, the sampling frequency may be selected to be about 10 MHz. Digital composite video signal V is supplied to the adaptive luminance separator 104, which extracts the luminance component L therefrom and performs a motion-adaptive spatio-temporal filtering of the separated luminance signal; to the motion signal generator 106, which derives a motion representative signal M (hereafter simply referred to as 'motion signal M') therefrom for controlling the motion-adaptive filtering on the encoder side and also on the decoder side; and to a chrominance signal separator 114, which extracts the chrominance component C therefrom.

The extracted luminance signal L is further processed by the folding circuit 108. This circuit folds the adaptively de-emphasized high frequency component of the luminance signal L back into the bandwidth of the lower frequency luminance component so that all the information in the full-bandwidth baseband luminance signal L is contained in a folded luminance signal L$_f$ having a reduced bandwidth of about e.g. 2.5 MHz. The adaptive folding circuit 108 will be described in more detail below. The folded luminance signal L$_f$ is converted to an analog signal L$_r$ in D/A 110. This signal is in a form which can be conventionally recorded on a video cassette by luminance recording circuitry 20 and record head 40 in FIG. 1.

The extracted motion signal M and the extracted chrominance component signal C are combined into a single composite chrominance-plus-motion signal C+M in the chrominance/motion signal combining circuit 116. A chrominance/auxiliary signal combining circuit, which may be used as the chrominance/motion signal combining circuit 116, is described in more detail in prior copending commonly assigned U.S. patent application Ser. No. 07/531,070 filed May 31, 1990. Moreover, for a particularly advantageous implementation of the present invention in the case of adapting it for compatibility with conventional VHS format video cassette recording and reproduction, use may be made of the chrominance component processing, recording and reproduction conventions according to the standard VHS format by compatibly encoding the motion signal into the VHS format's recorded chrominance component signal, as will be more fully described later.

The chrominance-plus-motion signal C+M is converted into an analog signal C+R$_r$ by D/A 118. This signal is in a form which can be recorded on a video cassette by standard chrominance recording circuitry 30 and record head 40 in FIG. 1.

As is known in the video signal processing art, frame comb low pass filtering (temporal low pass filtering) may be used to extract the luminance component from a composite video signal with no loss of spatial resolution. However, in the presence of motion in the video image, undesirable artifacts are introduced into the frame comb extracted luminance signal. Line comb low pass filtering (vertical comb low pass filtering or spatial low pass filtering) may also be used to extract the luminance component, even in the presence of motion. However, the luminance component extracted by line combing has decreased spatial (diagonal) resolution. It is preferable to extract the luminance signal using frame comb filtering in order to preserve spatial resolution, unless there is motion in an area of the image, in which case it is preferable to use line comb filtering in that area.

Figure 3:
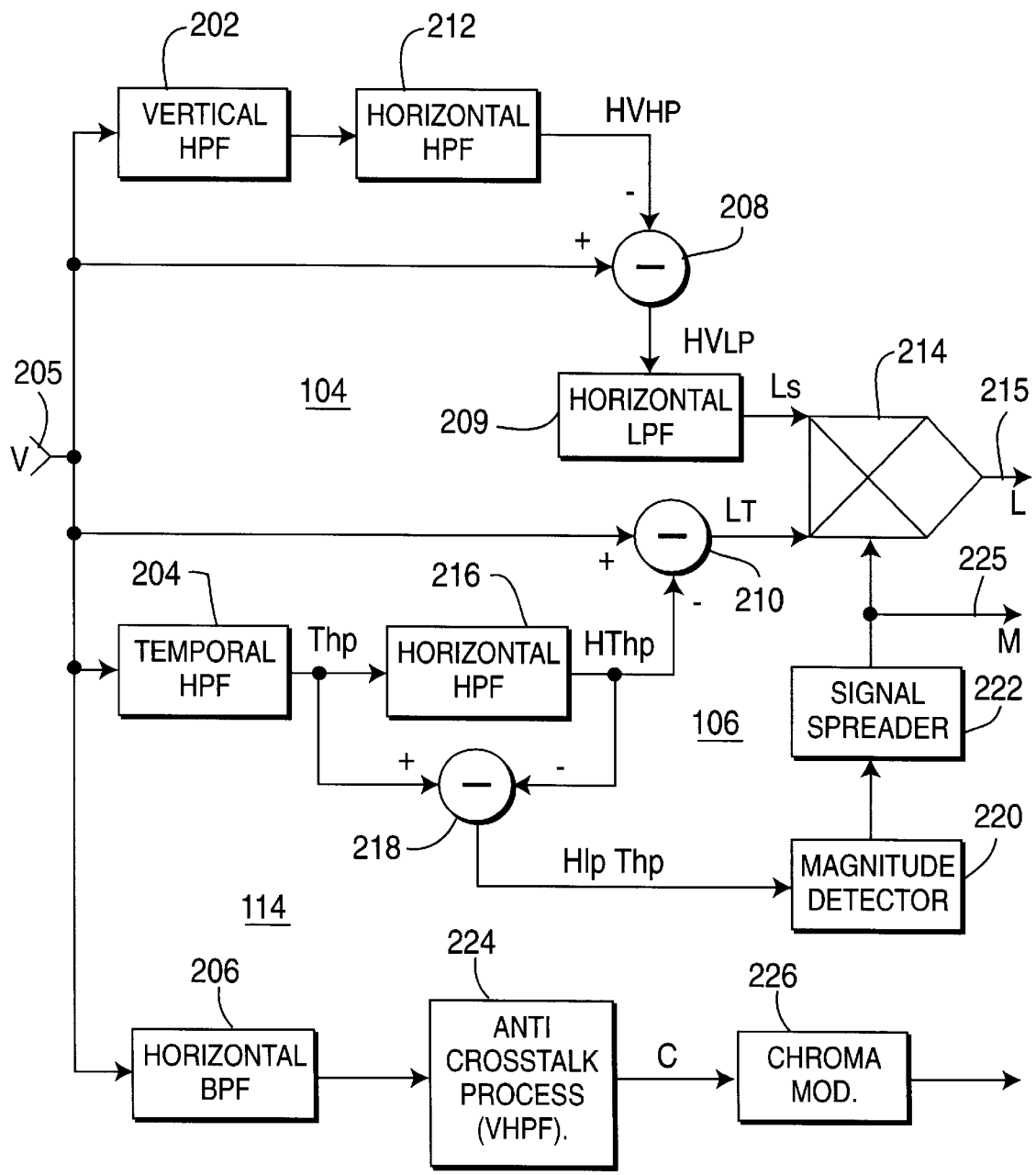
FIG. 3 is a block diagram showing in more detail an adaptive luminance signal separation portion, a motion signal generating portion and a chrominance signal separation portion of the encoder illustrated in FIG. 2.

FIG. 3 is a more detailed block diagram of a portion of encoder 10 illustrated in FIG. 2. In FIG. 3, an input terminal 205 is coupled to the output terminal of the A/D converter 102 of FIG. 2. Input terminal 205 is coupled to respective input terminals of a vertical high pass filter (VHPF) 202, a temporal high pass filter (THPF) 204, a horizontal band pass filter (HBPF) 206 and to respective minuend input terminals of subtractors 208 and 210. An output terminal of the VHPF 202 is coupled to an input terminal of a horizontal high pass filter (HHPF) 212 which may, for example, have a cutoff frequency selected at 1.7 MHz. An output terminal of horizontal HPF 212 is coupled to a subtrahend input terminal of subtractor 208. An output terminal of subtractor 208 is coupled to an input terminal of a horizontal low pass filter (HLPF) 209. An output terminal of HLPF 209 is coupled to a first data input terminal of a soft switch 214. An output terminal of soft switch 214 is coupled to an output terminal 215. Output terminal 215 is coupled to the input terminal of the folding circuit 108 of FIG. 2.

An output terminal of THPF 204 is coupled to an input terminal of a horizontal high pass filter (HHPF) 216 and to a minuend input terminal of a subtractor 218. An output terminal of HHPF 216 is coupled to respective subtrahend input terminals of subtractors 210 and 218. An output terminal of subtractor 210 is coupled to a second data input terminal of soft switch 214.

An output terminal of subtractor 218 is coupled to an input of a signal magnitude detector (rectifier) 220. An output terminal of magnitude detector 220 is coupled to an input terminal of a signal spreader 222. The signal spreader 222 can be of the form described by inventors J. W. Ko and H. J. Weckenbrock in their U.S. Pat. No. 5,083,203 entitled CONTROL SIGNAL SPREADER issued Jan. 21, 1992, on U.S. patent application Ser. No. 531,057 filed May 31, 1990. An output terminal of signal spreader 222 is coupled to an output terminal 225 and to a control input terminal of soft switch 214. Output terminal 225 is coupled to the motion signal input terminal of chrominance/motion signal combining circuit 116 of FIG. 2.

An output terminal of HBPF 206 is coupled to an input terminal of an anti-crosstalk processor 224 for processing the chrominance component prior to combining with the motion signal. An output terminal of anti-crosstalk processor 224 is coupled to an input terminal of a chrominance signal modulator 226 forming part of the chrominance/motion signal combining circuit 116 of FIG. 2 as will be described in detail later.

In operation, the horizontally and vertically high pass filtered signal HV$_{hp}$ produced by the serially coupled VHPF 202 and HHPF 212 contains all the chrominance information present in the composite video signal V in addition to all the spatial detail information. This signal $HV_{hp}$ is subtracted from the composite video signal V by differencing in subtractor 208 to produce a diagonally lowpass-filtered signal $HV_{lp}$ containing only the luminance information. The output signal $HV_{lp}$ from subtractor 208 is applied to HLPF 209 which may e.g. have a cutoff frequency selected at 3.3 MHz, for removing the horizontal frequency spectrum components above 3.3 MHz from $HV_{lp}$ in order to avoid aliasing noise in the spatially reconstructed luminance signal during playback processing (as will be described later in reference to FIG. 10f), thereby providing at the output of HLPF 209 a spatially derived luminance signal $L_S$. The spatially derived luminance signal $L_S$ produced by HLPF 209 therefore contains only luminance information, but has reduced diagonal resolution.

Temporally and horizontally high pass filtered signal $HT_{hp}$, produced by the serially coupled THPF 204 and HHPF 216, also contains all the chrominance information present in the composite video signal V, in addition to most of the temporal detail information. This signal $HT_{hp}$ is subtracted from the composite video signal V by differencing in subtractor 210 to produce a temporally derived luminance signal $L_T$. The temporally derived luminance signal $L_T$ produced by subtractor 210 therefore contains only luminance information at full spatial resolution, but has reduced temporal resolution.

The temporally high pass filtered signal $T_{hp}$ from THPF 204 contains motion information at horizontal low frequencies and chrominance information at high horizontal frequencies. Thus, the output signal $HT_{hp}$ from HHPF 216 is subtracted by differencing in subtractor 218 from the temporally high pass filtered signal $T_{hp}$ to derive a horizontally lowpass-filtered, temporally highpass-filtered signal $H_{lp}T_{hp}$ which is a bipolar motion-representative signal. The signal $H_{lp}T_{hp}$ varies in magnitude as a function of both the magnitude of the motion in the image (that is, the greater the degree of motion in the image, the greater the signal magnitude) and the contrast between the moving and still portions of the image. This signal $H_{lp}T_{hp}$ has greatest magnitude at the edges of an object having high contrast with respect to the background against which it is moving. Where the background and the moving object are close in intensity, the motion-representative signal $H_{lp}T_{hp}$ has a low magnitude. In addition, quickly moving objects with soft edges also produce a low magnitude motion signal. Finally, even with quickly moving, high contrast objects, the motion-representative signal $H_{lp}T_{hp}$ is usually only strong within several pixels of the moving object's edge.

In order to minimize the effect of these variations in the derived motion-representative signal $H_{lp}T_{hp}$, magnitude detector 220 detects the magnitude of the motion-representative signal $H_{lp}T_{hp}$ from the subtractor 218 and produces a single bit signal indicating either the presence or absence of motion for that pixel. A known magnitude detector 220 may include a multiplexer having a control input terminal responsive to a sign bit of the applied motion-representative signal $H_{lp}T_{hp}$. The motion-representative signal $H_{lp}T_{hp}$ would be coupled to a first input terminal of the multiplexer and an input terminal of an arithmetic negator circuit. An output terminal of the arithmetic negator circuit would be coupled to a second input terminal of the multiplexer. The output terminal of the multiplexer produces the magnitude (absolute value) of the motion-representative signal $H_{lp}T_{hp}$. If the sign bit is a logic '0', indicating, for example, that the motion-representative signal value is positive, then the multiplexer couples the first input terminal, carrying the motion-representative signal $H_{lp}T_{hp}$ to the output terminal. If the sign bit is a logic '1', indicating that the motion-representative signal value is negative, then the multiplexer couples the second input terminal, carrying the arithmetic negative of the motion-representative signal $H_{lp}T_{hp}$ (which would be a positive valued signal) from the negator to the output terminal.

This magnitude signal is then supplied to a known comparator circuit. The comparator circuit compares the magnitude signal to a predetermined threshold value. If the magnitude signal exceeds the threshold value, then the comparator circuit produces an output signal which is a logic '1' signal. If the magnitude signal is less than the threshold value, then the comparator circuit produces an output signal which is a logic '0' signal. The output of this comparator is a single bit motion-representative signal which is a logic '1' in the presence of motion, and a logic '0' otherwise.

This single bit motion-representative signal is spread vertically and horizontally by signal spreader 222 to generate the spread motion signal M. Optionally, the signal may be spread temporally, vertically and horizontally by signal spreader 222. Apparatus for spreading such a single bit motion representative-signal is described in detail in co-pending commonly assigned U.S. patent application Ser. No. 531,057 filed May 31, 1990. The spread motion signal M produced by signal spreader 222 is a multi-bit digital signal whose value gradually decreases from a maximum value in moving areas (as indicated by the single-bit bi-level signal having a logic '1' value) to a minimum (zero) value in the still region area around the moving area in the vertical and horizontal directions (and optionally, temporally). This spread motion signal M is used in the encoder 10 for adaptively processing the video signal V as described below. The motion signal M is also compatibly encoded so as to be recordable and reproducible, to be recovered and utilized by a decoder as will be described in detail later.

As described above, in the absence of image motion, the luminance signal L is preferably the temporally derived luminance signal $L_T$, but in the presence of image motion, the luminance signal L is preferably the spatially derived luminance signal $L_S$. Soft switch 214 will continuously vary the proportion of the two input signals $L_T$ and $L_S$ which can be coupled to the luminance signal L output terminal 215 in response to the value of the motion signal M. If the value of the motion signal M is zero, or nearly zero, indicating no motion or a low level of motion, then the soft switch produces an output signal L which is composed completely of the temporally derived luminance input signal $L_T$. If the value of the motion signal M is at a maximum, or nearly maximum, indicating a high level of motion, then the soft switch 214 produces an output signal L which is composed completely of the spatially derived luminance signal $L_S$. At intermediate values of the motion signal M, the output signal contains some proportion of each of the input signals $L_T$ and $L_S$. The operation of soft switch 214 will be described in more detail below.

The NTSC chrominance component is extracted from the composite video signal V in a known manner using the horizontal BPF 206. The separated chrominance component signal (modulated on the 3.58 MHz NTSC chroma subcarrier) from horizontal BPF 206 is processed to avoid crosstalk by anti-crosstalk processor 224, and then supplied as chrominance signal C to the input of the chroma modulator 226 of chrominance/motion signal combining circuit 116, to be frequency down-converted, e.g. to a 629 KHz color-under signal for VHS format recording by chrominance signal modulator 226 in known manner, e.g. by heterodyning the 3.58 MHz NTSC chroma sub-carrier against a 4.21 MHz four-phase carrier and passing the lower resultant sidebands only to provide the color-under chrominance component signal amplitude modulated on a 629 KHz carrier. The down-converted chrominance component signal from modulator 226 will thus have been first processed (to reduce adjacent line crosstalk with the motion signal M in the composite chrominance-plus-motion signal C+M) by anti-crosstalk element 224. Anti-crosstalk element 224 may be, for example, a vertical high pass filter (VHPF), which may be implemented as a three-tap line comb low pass filter. Optionally, a vertical filtering of the composite video signal V may precede the horizontal bandpass filtering by horizontal BPF 206 at the chroma separation stage. It will be noted that in FIG. 3, VHPF 202 and THPF 204 are both responsive to the composite video signal V. Because they are implemented as comb filters, they can share delay lines.

Figure 4:
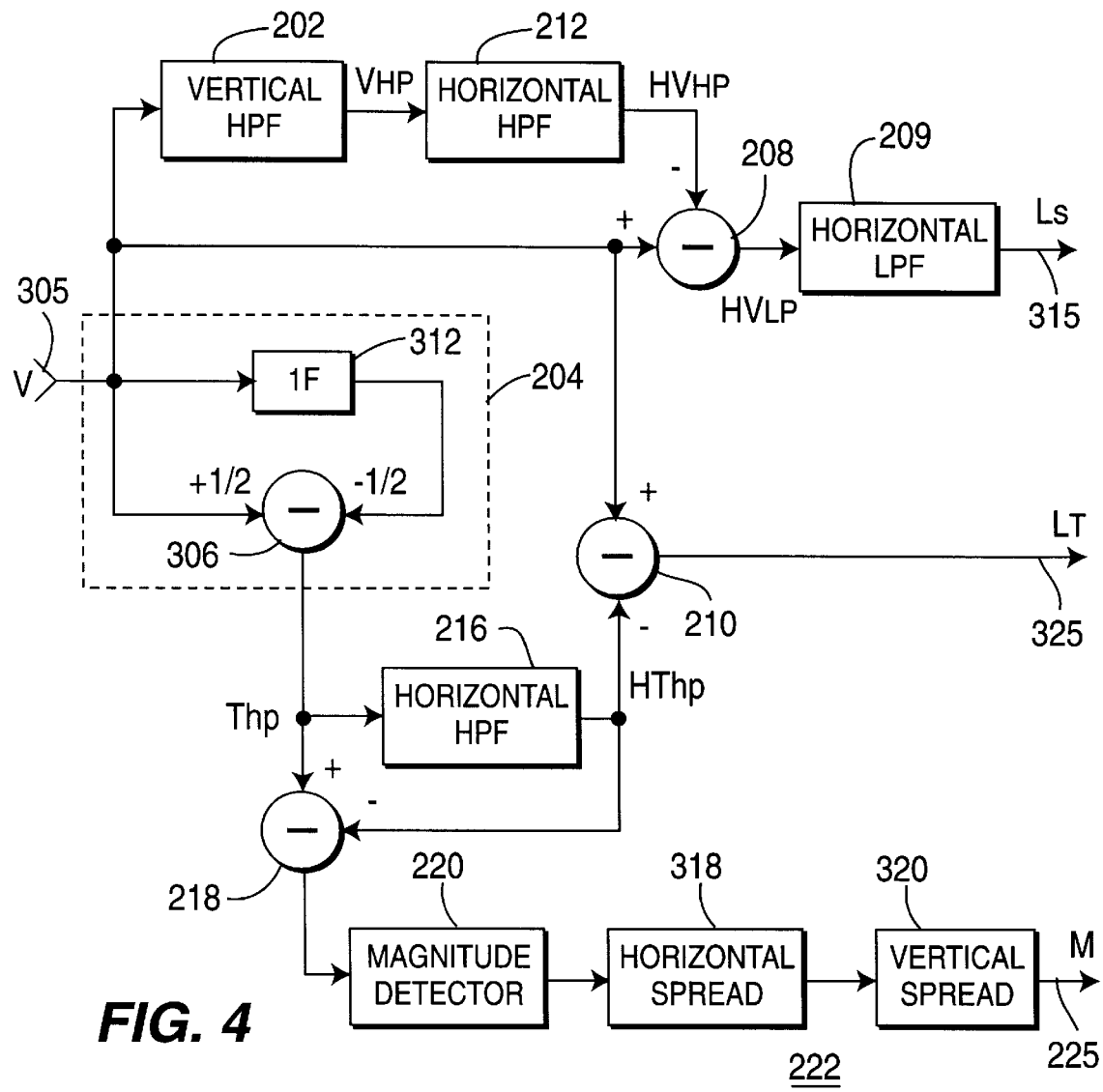
FIG. 4 is a block diagram showing an implementation of the adaptive luminance separation and motion signal generation portions of the encoder illustrated in FIG. 3.

FIG. 3 illustrates a portion of encoder 10 which is primarily applicable for processing an NTSC video signal. One skilled in the art would understand how to construct encoder 10 in accordance with the present invention for processing a PAL video signal, a SECAM video signal or a video signal according to any other standard. FIG. 4 is a more detailed block diagram illustrating the luminance component separation and spatial and temporal filtering sections and the motion representative signal generation section of FIG. 3 in more efficiently constructed form, sharing delay lines, whenever possible.

In FIG. 4, elements which are the same as those in FIG. 3 have the same reference number designation and are not described in further detail below. In FIG. 4, an input terminal 305 is coupled to the output terminal of A/D converter 102 in FIG. 2. Input terminal 305 is coupled to an input of VHPF 202, to the minuend input terminal of subtractor 208, to the minuend input terminal of subtractor 210, to a minuend input terminal of a weighted subtractor 306 whose input is weighted by ½, and to an input terminal of a 1F delay device 312. Delay 312 produces a 1F-delayed signal at its output terminal which is the signal(V) applied at its input terminal delayed by a period of time equal to one frame scan period (1F). An output terminal of 1F delay device 312 is coupled to a subtrahend input terminal of weighted subtractor 306, whose input is weighted by ½. The combination of 1F delay device 312 and weighted subtractor 318 forms THPF 204 configured as a frame high pass comb filter of known design producing the temporally high pass filtered output signal $T_{hp}$.

An output terminal of VHPF 202 is coupled to the input terminal of HHPF 212, and the derivation of spatially derived luminance signal $L_S$ is as described previously in connection with FIG. 3.

An output terminal of subtractor 218 is coupled to serially coupled magnitude detector 220, horizontal spreader 318 and vertical spreader 320. The combination of horizontal spreader 318 and vertical spreader 320 forms motion signal spreader 222 of FIG. 3 and operates as described above.

The remainder of the block diagram of FIG. 4 is the same as illustrated in a portion of FIG. 3 and described above. It will be understood that FIG. 4 does not purport to show timing accuracy, or timing matching. That is, in FIG. 4 there are not shown any delay lines which would be utilized for equalizing the delays along the respective signal paths for maintaining pixel correlation. A person of ordinary skill in the signal processing art would understand the need for providing correction for timing mismatching, and would also have knowledge of various ways in which such correction could be implemented, and it is therefore not necessary to describe such in detail here.

The horizontal HPFs 212 and 216 may be standard digital high pass filters each having a break frequency at around 2 MHz. A 15-tap horizontal high pass filter is preferred, yielding a response characteristic which is −6 dB at 1.75 MHz. In regard to the spatial, e.g. diagonal pre-filtering performed in the encoder prior to folding and also the diagonal post-filtering after unfolding as will be described later, the diagonal filters in the encoder and decoder are well matched, and in the diagonal filtering process the input signal is vertically highpass-filtered, then the vertically high-passed part of the signal is horizontally highpass-filtered at around 1.7 MHz, and the resultant signal is then subtracted from the input signal to provide a diagonally lowpass filtered output signal which is in turn then horizontally lowpass-filtered at around 3.3 MHz to produce the spatially derived luminance signal (see e.g. FIG. 10f).

Figure 5:
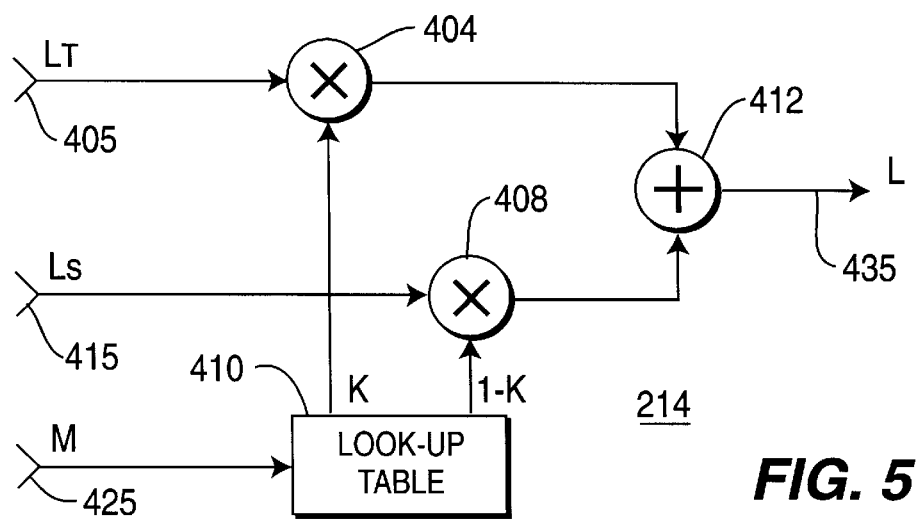
FIG. 5 is a detailed block diagram of a soft switch of an adaptive luminance filtering section of the encoder illustrated in FIG. 2.

FIG. 5 is a more detailed block diagram of the soft switch 214 illustrated in FIG. 3. Soft switch 214 is utilized for motion-adaptive processing of the temporally and spatially derived luminance signals $L_T$ and $L_S$. In FIG. 5, a first signal input terminal 405 of soft switch 214 is coupled to the output terminal of subtractor 210 of FIG. 3 for receiving the temporally derived luminance signal $L_T$ therefrom. Input terminal 405 is coupled to a first input terminal of a multiplier 404. An output terminal of multiplier 404 is coupled to a first input terminal of an adder 412. An output terminal of adder 412 is coupled to an output terminal 435. Output terminal 435 is coupled to the folding circuit 108 of FIG. 2.

A second signal input terminal 415 of soft switch 214 is coupled to an output terminal of subtractor 208 of FIG. 3 for receiving the spatially derived luminance signal $L_S$ therefrom. Input terminal 415 is coupled to a first input terminal of a multiplier 408. An output terminal of multiplier 408 is coupled to a second input terminal of adder 412. A control input terminal 425 of soft switch 214 is coupled to the spread motion signal (M) output terminal of signal spreader 222 of FIG. 3. Input terminal 425 is coupled to an input terminal of a look-up table 410. A first scaling factor output terminal K of look-up table 410 is coupled to a second input terminal of multiplier 404, and a second scaling factor output terminal 1−K of look-up table 410 is coupled to a second input terminal of multiplier 408.

In operation, multiplier 404 scales the temporally derived luminance signal $L_T$ by a scaling factor K, and multiplier 408 scales the spatially derived luminance signal $L_S$ by a scaling factor 1−K. Adder 412 sums the two scaled signals output by the multipliers 404 and 408 to produce the motion-adaptively spatio-temporally filtered separated luminance signal L.

The spread motion signal M from input terminal 425 is applied to the input of look-up table 410. Look-up table produces two scaling factors, K and 1−K which are related to the value of the control signal M. The first scaling factor K is the proportion of the temporally derived luminance signal $L_T$ which should be in the luminance output signal L. The second scaling factor 1−K is the proportion of the spatially derived luminance signal $L_S$ which should be in the motion-adapted luminance output signal L. The sum of K and 1−K is one. The motion adaptive spatio-temporal luminance processing function K(M) is selected such that when M is equal to zero or nearly zero (corresponding to a low level of motion in the luminance component), K is equal to one (all temporally derived luminance) and 1−K is equal to zero (no spatially derived luminance), and when M is at maximum or nearly maximum (corresponding to a high level of motion in the luminance component), K is equal to zero (no temporally derived luminance) and 1−K is equal to one (all spatially derived luminance). The function K(M) is continuous and may be linear or non-linear. As the value of the motion signal M gradually changes from zero to maximum, the proportion of the temporally derived luminance signal $L_T$ in the luminance output signal L gradually decreases and the proportion of the spatially derived luminance signal $L_S$ in the luminance signal output L gradually increases, and vice versa.

Look-up table 410 may be implemented in known manner as a multi-bit read-only memory (ROM) having spread motion signal M input terminal 425 coupled to its address input terminals. A first subset of its data output terminals are coupled to the K signal input terminal of multiplier 404, and a second subset are coupled to the 1−K signal input terminal of multiplier 408.

In operation, the storage locations of the ROM of LUT 410 are accessed by the motion signal M at the address input terminals, where each separate value which the motion signal M can assume accesses (addresses) a different storage location of the ROM. Each storage location has stored thereat a first data portion (which is coupled to the first subset of data output terminals) pre-programmed with the K value corresponding to the M value which accesses that location, and a second data portion (which is coupled to the second subset of data output terminals) pre-programmed with the 1−K value corresponding to that value of the motion signal M.

Next, the de-emphasis and folding processing in accordance with the invention will be described. As described above, in prior luminance signal folding systems, the luminance high frequencies were folded back as aliases into the luminance low frequency spectral bandwidth at their original amplitude (or, if pre-emphasized in accordance with the proposal of Howson et al., boosted to a higher amplitude). If such folded luminance signals are recorded and then played back on a conventional narrow bandwidth VCR which has no provision for removing the folded high luminance frequency aliases, highly objectionable artifacts will be present in reproduced images, rendering such a video recording backwardly incompatible for conventional playback apparatus reproduction.

The present inventors have found that by appropriately de-emphasizing the folded high frequency luminance components in the band-limiting folding operation during the encoder side processing, it is advantageously made possible to reduce the artifacts in the video image displayed on playing back the band-limited folded luminance signal on the videotape with a conventional narrow bandwidth reproduction device to a level which is not objectionable to the viewer, thereby providing desirable backward compatibility with existing playback apparatus.

In prior co-pending U.S. patent applications Ser. No. 569,029; Ser. No. 604,493; Ser. No. 604,494 and Ser. No. 635,197 noted above, there have been earlier proposed luminance folding/unfolding systems utilizing a de-peaking or thresholding type of de-emphasis of the high frequency luminance components on the record side accompanied by a re-peaking type of re-emphasis for restoration of the de-peaked high frequency luminance components on the playback side, utilizing a coring operation and also utilizing a scaling operation controlled by a scaling control signal which, in some instances, is recorded and then recovered during playback processing.

In the instant application, there is presented, in accordance with the present invention, an advance over these earlier proposed folding and unfolding systems, for providing improved video image display performance when reproducing the folded signal and recovering the unfolded signal on a playback system operating in accordance with the present invention, and also for providing at the same time improved backward compatibility when reproducing the recorded folded signal with a conventional narrow bandwidth playback device.

Figure 6A:
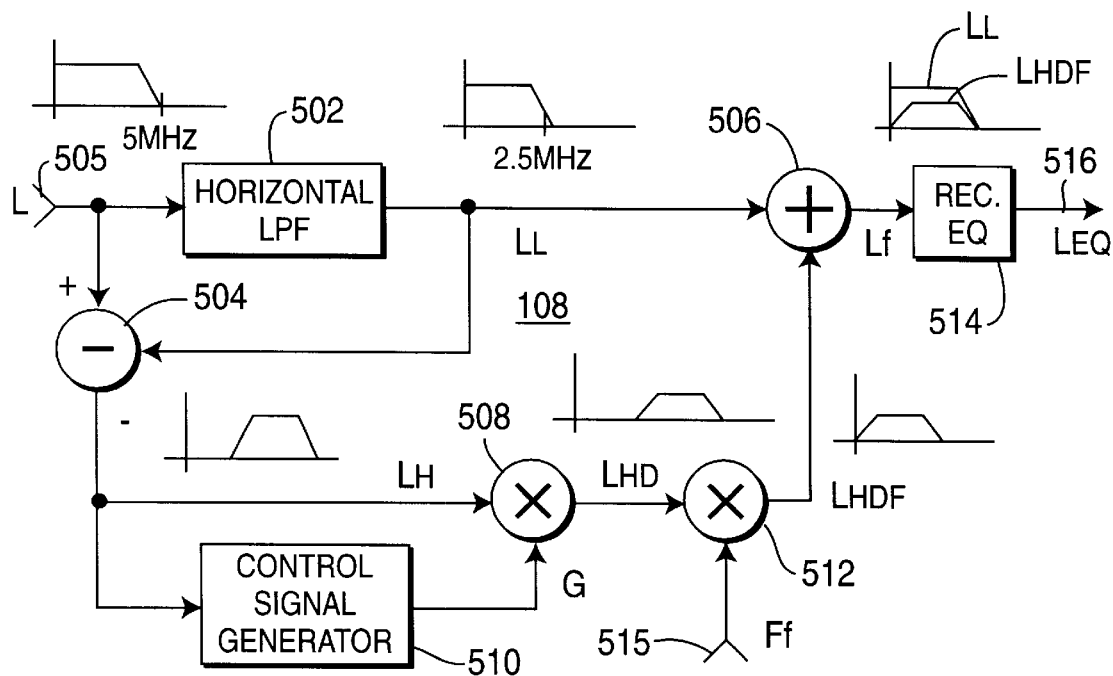
FIG. 6a is a block diagram of a folding circuit which is a part of the encoder of FIG. 2.

FIG. 6a is a more detailed block diagram of the folding circuit 108 illustrated in FIG. 2. Folding circuit 108 performs several operations on the motion-adaptively spatio-temporally processed luminance signal in order to limit the luminance bandwidth for narrow band recording, in particular performing an advantageous de-emphasizing, preferably performed adaptively, of the amplitude of the high frequency luminance components which are folded into the spectrum of the low frequency luminance components to produce the band-limited luminance signal for recording. As will be more fully described below, folding circuit 108 performs band splitting of the luminance signal into low frequency components and high frequency components, appropriately de-emphasizes the high frequency luminance components, and folds the high frequency luminance components into the spectral bandwidth of the low frequency luminance components to thereby compress the full bandwidth luminance information of the input video signal into a narrow frequency band corresponding to the bandwidth of the narrow band video medium.

In the folding circuit 108 shown in FIG. 6a, an input terminal 505 is coupled to the output terminal of the adaptive luminance separator 104 of FIG. 2, that is, to the spatio-temporally processed luminance signal L output terminal 215 of soft switch 214 in FIG. 3. Input terminal 505 receives the baseband motion-adaptively spatio-temporally processed luminance signal L output from soft switch 214 and couples it to an input terminal of a horizontal low pass filter (LPF) 502 as well as to the minuend input of a first subtractor 504. Horizontal LPF 502 may be selected to have its −6 dB point at approximately 2.5 MHz to correspond to one-half the folding frequency. The low pass filtered luminance signal $L_L$ output of horizontal LPF 502 will therefore contain only low frequency luminance components below 2.5 MHz, and this output signal $L_L$ is coupled to a first input terminal of an adder 506 and also to the subtrahend input terminal of subtractor 504. Horizontal LPF 502 and subtractor 504 thus are configured to form a band splitting filter at 2.5 MHz, with LPF 502 outputting the low frequency luminance component (low band luma) signal $L_L$ below 2.5 MHz and with the signal $L_H$ at the output terminal of subtractor 504 being comprised of the high frequency luminance component (high band luma) above 2.5 MHz.

The output of LPF 502 passes the low band luma signal $L_L$ to first adder 506. The output of subtractor 504 passes the high luma signal $L_H$ to a signal input terminal of a first multiplier 508 which performs a de-emphasis operation thereon, and also to an input terminal of a control signal generator 510 which controls the operation of the de-emphasis multiplier 508. The control signal generator 510 generates a de-emphasis gain control signal (where the de-emphasis amount D corresponds inversely to the amount of gain through multiplier 508, i.e. D=1/Gain and Gain=1/D) which is coupled to a gain data input terminal of de-emphasis multiplier 508.

Control signal generator 510 and de-emphasis multiplier 508 form a de-emphasis section for de-emphasizing, that is, attenuating, the amplitude of the high frequency luminance component signal $L_H$. De-emphasis processing of high band luma $L_H$ in multiplier 508 produces a de-emphasized high frequency luminance signal $L_{HD}$ which is coupled to a data input terminal of a folding modulator 512 where the de-emphasized high band luma $L_{HD}$ is spectrally shifted by a form of amplitude modulation, 4-field offset modulation, (bearing in mind that sampling is an amplitude modulation operation) around a folding carrier to shift the de-emphasized high band luma $L_{HD}$ to the spectrum of the low band luma below 2.5 MHz, that is, to produce a high frequency luminance component shifted into the frequency spectrum of the low frequency luminance component signal $L_L$ thereby providing a shifted de-emphasized high band luminance signal $L_{HDF}$. The shifted de-emphasized high band luminance signal $L_{HDF}$ is then supplied to the other input of adder 506 to be added back into the baseband of the low frequency luminance component $L_L$ to thereby produce the interleaved band-limited folded luminance signal $L_f$ having a bandwidth of e.g. 2.5 MHz, thus being suitable for the narrow luminance component recording bandwidth of a conventional VCR, e.g. VHS format.

Figure 6B:
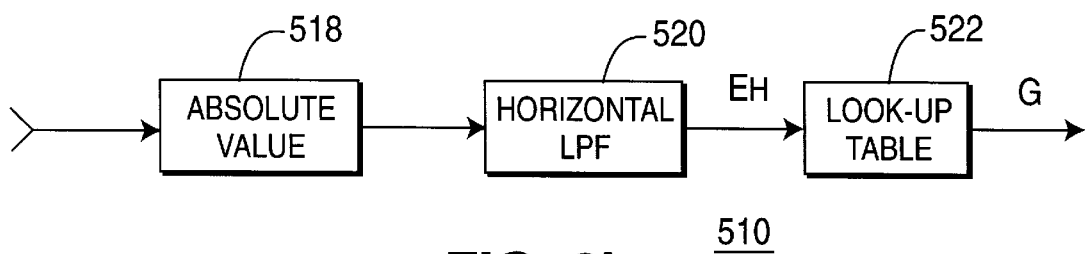
FIG. 6b is a more detailed block diagram of a control signal generator of an adaptive de-emphasis circuit which forms part of the folding circuit.
Figure 6C:
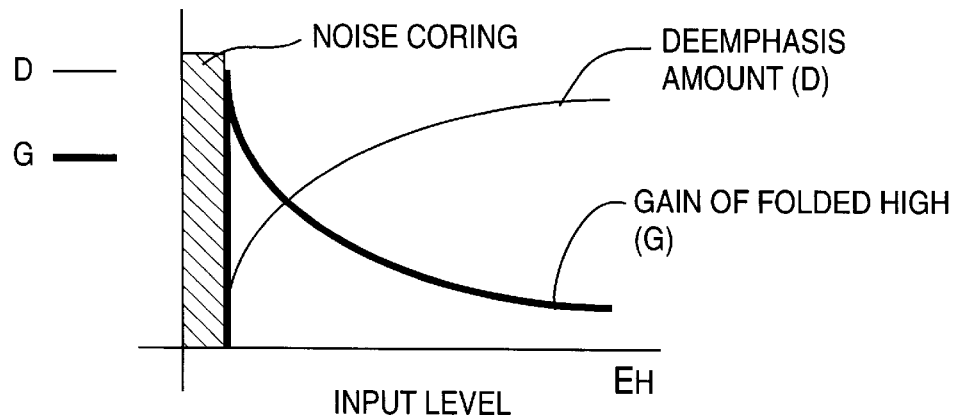
FIG. 6c is a graph showing a gain/de-emphasis transfer function of the control signal generator of FIG. 6b, including a noise coring function.
Figure 6G:
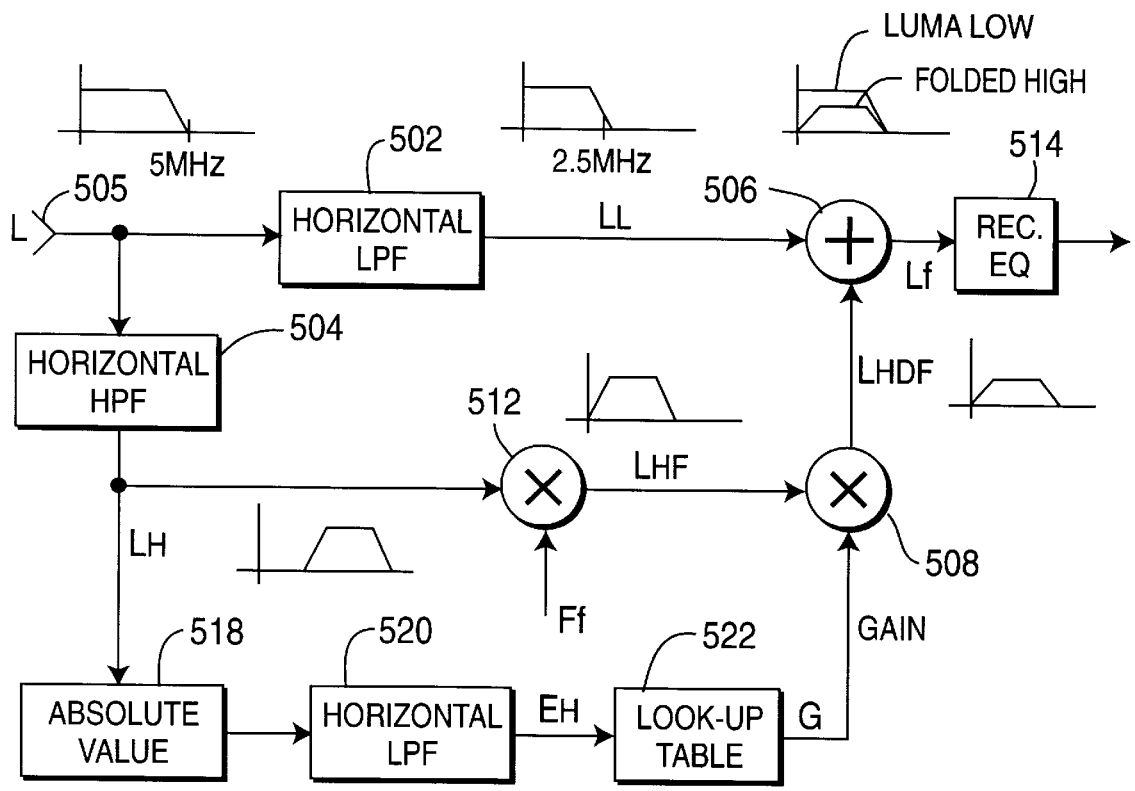
FIG. 6g is a block diagram of an alternative implementation of the folding circuit.
Figure 6H:
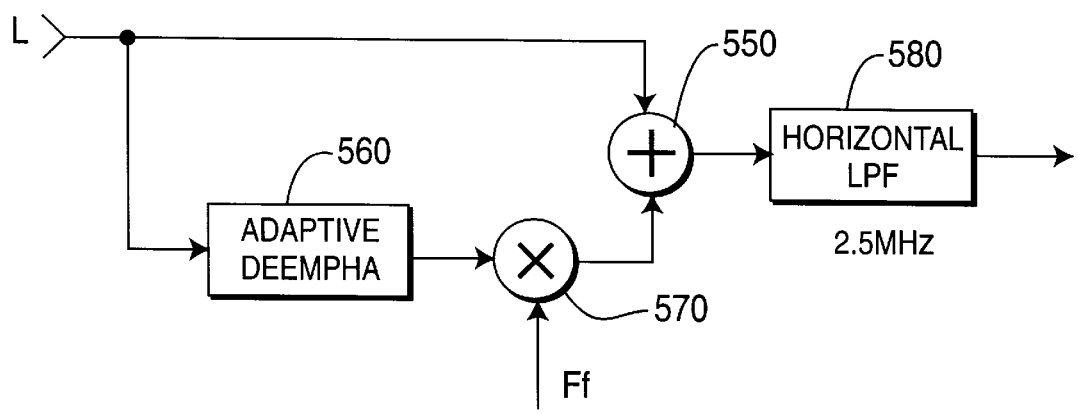
FIG. 6h is a block diagram of a further alternative implementation of the folding circuit.
Figure 6I:
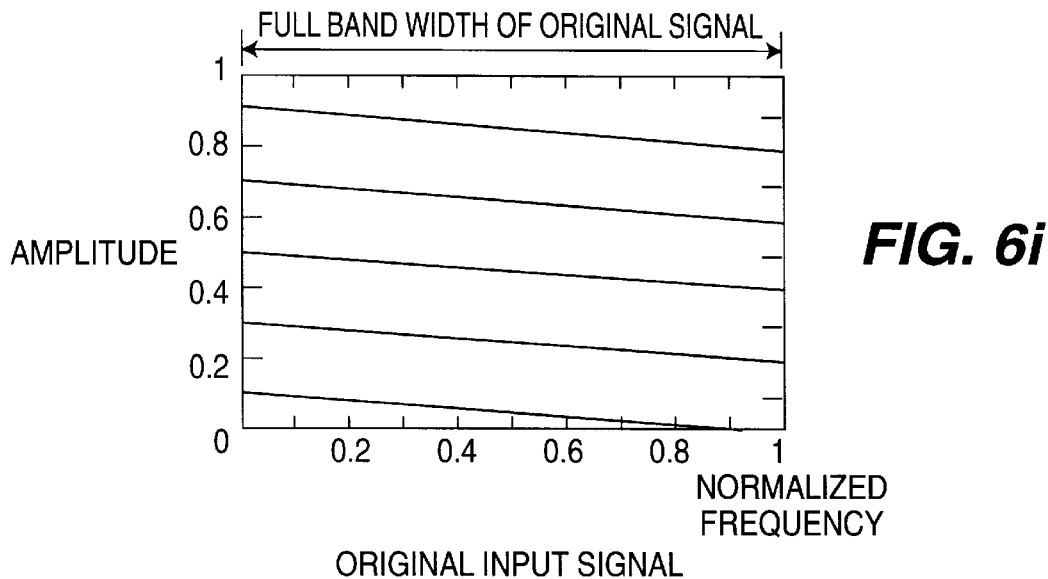
FIG. 6i shows an input signal.
Figure 6J:
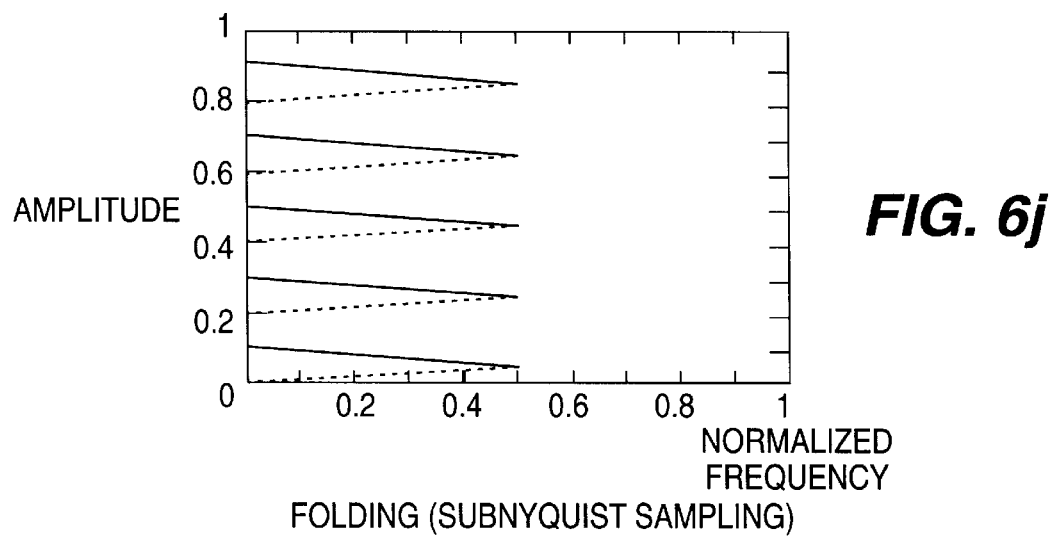
FIG. 6j shows the input signal of FIG. 6i after folding by sub-Nyquist sampling.

FIG. 6*i* shows an input full bandwidth signal, and FIG. 6*j* shows the same signal after folding of the high frequency band by sub-Nyquist sampling to reduce it to one-half the bandwidth of the original, the folded high frequency signal component being indicated by the broken lines.

Figure 6K:
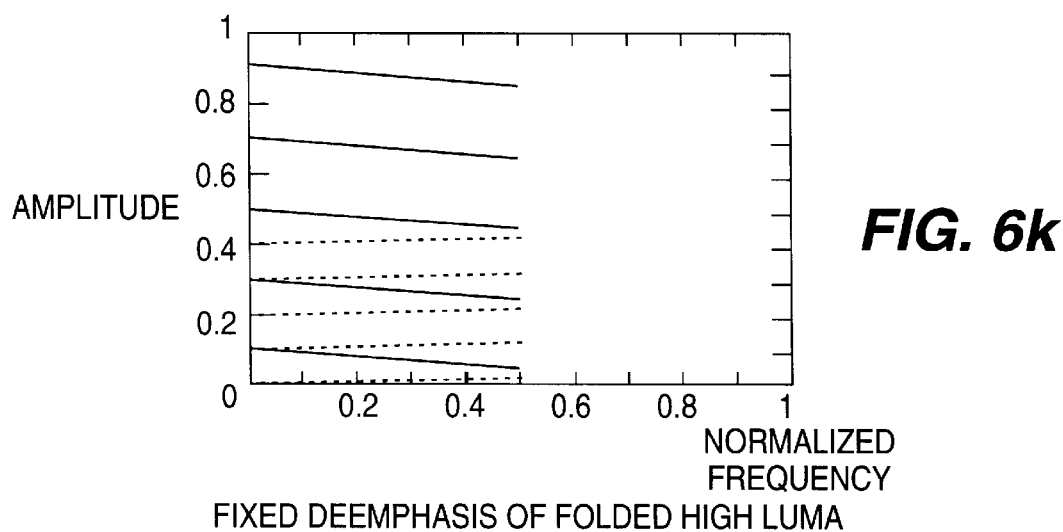
FIG. 6k shows the input signal of FIG. 6i after folding with a fixed de-emphasis of the high frequency component.

In a simple implementation of a de-emphasis circuit for record side band-limiting in accordance with the present invention, multiplier 508 and control signal generator 510 may be replaced by a simple attenuator providing a fixed amount of attenuation or amplitude reduction to high frequency luminance signal component $L_H$, so that the high frequency luminance amplitude level in the folded luminance signal $L_f$ is maintained below a level at which objectionable artifacts would become noticeable in the displayed narrow bandwidth video image on reproduction by a narrow band playback device. FIG. 6*k* shows the folded signal of FIG. 6*j* after it has undergone a fixed de-emphasis of the amplitude of the folded high frequency components by approximately one-half.

However, while providing against objectionable artifacts (i.e. dot crawl) in the displayed narrow band image which could result from high amplitude folded high frequency components in the folded narrow band luminance signal, this fixed form of de-emphasis can undesirably degrade the S/N performance on the playback side because portions of the high frequency luminance signal which are at a relatively low amplitude, such as broad flat areas with little or no contrast change, may also be reduced in amplitude by the fixed de-emphasis process, degrading the S/N ratio of these portions of the recorded luminance signal during reproduction.

That is, because folding the high frequency luminance at full amplitude will cause a severe disturbance in the reproduced images on conventional playback as occurs in the case of the system described by Faroudja, it is therefore desirable, for preventing the folded high frequency luminance components from manifesting as objectionable artifacts in the displayed image when playing back an encoded recording on a conventional narrow bandwidth VCR, to reduce the amplitude (i.e. modulation level) of the high frequency luminance component interleaved with the low band luminance component. Reducing the modulation level of the folded highs by one-half can provide improved backward compatibility, but at the cost of increased noise in the displayed wide bandwidth improved image. This noise increase occurs when the attenuated highs are boosted in the playback side decoding for restoring them to their original level. This noise is most noticeable in broad, low level, flat areas of the image.

In accordance with the present invention, the de-emphasizing of the folded high frequency luminance component during the record side encoding and the accompanying re-emphasis processing for restoring the unfolded de-emphasized high frequency luminance component to its original amplitude during playback side decoding are preferably performed adaptively, that is, the level of the folded high frequency luminance component is de-emphasized adaptively during the encoding processing, and re-emphasized adaptively during the decoding processing. Such adaptive de-emphasis of the high frequency luminance component during the folding process can significantly improve image noise performance during decoded playback of the encoded recording by a playback system in accordance with the invention, while also providing enhanced backward compatibility to the encoded recording.

The adaptive de-emphasis processing provides folding of the high band luma $L_H$ at a full level when the high frequency luminance component is at a very low amplitude, and folding of the high band luma $L_H$ at a reduced level when the luminance highs are at a high amplitude. When the high frequency luminance is adaptively de-emphasized in this manner during the folding process, the re-emphasis operation during playback decoding only increases the noise level during high frequency high amplitude transitions where it is not noticeable on viewing the reproduced image.

Figure 6L:
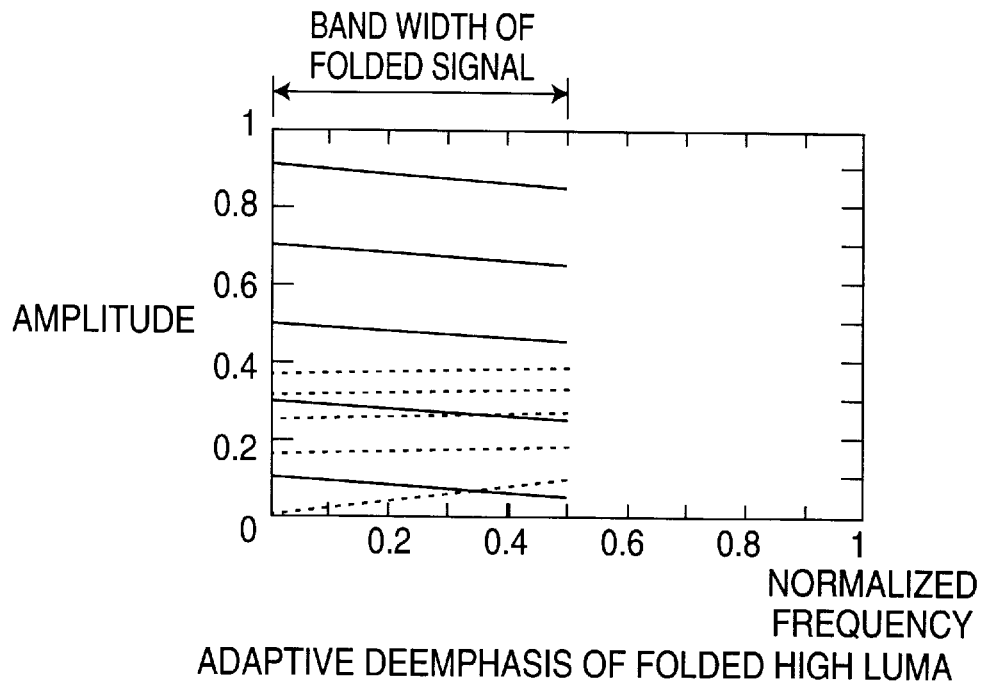
FIG. 6l shows the input signal of FIG. 6i after folding with an adaptive de-emphasis of the high frequency component in accordance with the invention.
Figure 6M:
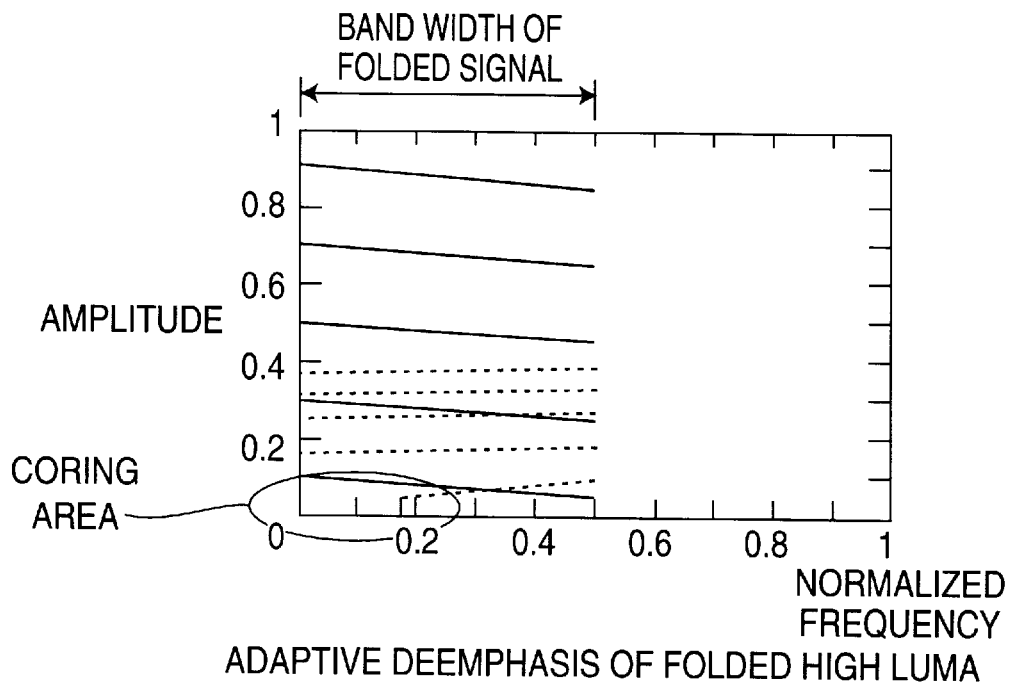
FIG. 6m shows the input signal of FIG. 6i after folding with an adaptive de-emphasis of the high frequency component including a noise coring operation.

FIG. 6*l* shows the folded high frequency components of FIG. 6*j* after adaptive de-emphasis in accordance with the invention, from which it may be seen that the level of de-emphasis of the folded highs is varied in comparison to the fixed de-emphasis in FIG. 6*k*. FIG. 6*m* corresponds to FIG. 6*l* but shows additionally the effect of a noise coring operation performed in adaptively de-emphasizing the folded high band luma.

As shown in more detail in FIG. 6*b*, control signal generator 510 may be constructed of a serially connected absolute value processor 518, horizontal lowpass filter (LPF) 520 and look-up table (LUT) 522. Absolute value processor 518 may be conveniently implemented as a full-wave rectifier. The high band luminance signal $L_H$ supplied to absolute value processor 518 is full-wave rectified and then applied to horizontal LPF 520 which has a cutoff frequency of approximately 1 MHz. The output signal $E_H$ from LPF 520 provides an accurate representation of the average energy in the luminance high band signal $L_H$ over a time period determined by the time constant of LPF 520. That is, the value of signal $E_H$ represents the average "local" energy of $L_H$. In broad flat areas, the signal $E_H$ will be at zero, whereas during sharp contrast, high amplitude transitions, the signal $E_H$ will have a high amplitude. The signal $E_H$ is applied as an address to LUT 522 whose output signal 1/D controls the gain of the de-emphasis multiplier 508.

The gain G transfer function of LUT 522 is monotonically decreasing in characteristic, as depicted by the thick line in FIG. 6*c* where the energy level $E_H$ of the high band luma $L_H$ applied to control signal generator 510 is shown along the horizontal axis and the gain G through multiplier 508 is plotted on the vertical axis. As may be seen in FIG. 6*c*, as the level of the high band luma increases, the gain G through modulator 508 correspondingly decreases monotonically, thus providing the de-emphasis transfer function $D(L_H)$ through multiplier 508. The de-emphasis amount D is depicted by the thin line in FIG. 6c. Optionally, for improved noise performance, at low amplitudes of the high luma component $L_H$ a coring function may be included in the transfer function of LUT 522 as shown by the diagonally striped area in FIG. 6c. The operation of LUT 522 is similar to that of LUT 410 in FIG. 5 described previously, except that in LUT 522 only one data output signal, the de-emphasis gain control signal 1/D, is generated from the memory location in the ROM addressed by $E_H$. If the measured average high luminance band energy $E_H$ is very low or at zero, then the gain G is set near or equal to unity, passing the high luminance signal $L_H$ through multiplier 508 without any de-emphasis, i.e. no attenuation. However, when $E_H$ is at a high level, the gain G is set at a lower value, reducing the gain through multiplier 508 below unity and thereby reducing the effective level of the luminance high band component passed through multiplier 508 to provide maximum de-emphasis. At intermediate values of $E_H$, de-emphasis gain control signal G will assume correspondingly intermediate values between zero and one, and an intermediate de-emphasizing of $L_H$ will thus occur. The effect of this adaptive de-emphasis processing is to provide little or no attenuation of the folded luminance high band components when they are of low amplitude, but to provide significant attenuation when the folded luma highs have a high amplitude.

After the adaptive de-emphasis processing, the de-emphasized high band luminance output signal $L_{HD}$ is applied to the signal input of amplitude modulator 512. A modulation clock input terminal 525 of modulator 512 is coupled to a source (not shown) of a folding carrier signal having a frequency $f_f$ of e.g. 5 MHz for thereby providing shifting of the high band luminance components to the low band luminance component spectrum, e.g. below 2.5 MHz.

The de-emphasized high luminance signal $L_{HD}$ is then modulated, as by a +1, −1 type modulation operation, about a folding frequency one-half the folding carrier (sampling) frequency $f_f$ in modulator 512. The folding frequency $f_f$ is selected so as to maximize the distance between the folding carrier and the baseband luminance signal in the temporal, vertical and horizontal directions. The folding carrier is preferably placed at one-half the maximum vertical frequency, and one-half the maximum temporal frequency, that is, to correspond to the so-called Fukinuki holes in the temporal and vertical dimensions, and at about 5 MHz in the horizontal directions. This maximizes the spectral distance between the folding carrier and the vertical and temporal lower frequency components of the luminance signal.

Modulator 512 may be a standard four quadrant multiplier, or preferably, if the sampling frequency is properly selected, a +1,−1 type modulator. A +1, −1 type modulator modulates a sampled signal by a frequency equal to one-half the sampling frequency by arithmetically negating every other sample. For example, if the sampling frequency is selected to be at about 10 MHz, then the folding frequency will be about 5 MHz, with the actual frequency selected so as to satisfy the above criteria relating to vertical and temporal spectral distance from vertical and temporal DC. The output signal contains a component of one-half the sampling frequency, and upper and lower sidebands centered around +½ and −½ the sampling frequency containing the spectral information contained in the input signal. Thus the +1, −1 amplitude modulation will shift (i.e. alias) the high band luma $L_H$ to a −½ lower sideband in the 2.5 MHz bandwidth of the low band luma $L_L$.

As shown in FIG. 6d, the amplitude modulator 512 of FIG. 6a having data input and output terminals and a clock input terminal may be implemented using a multiplexer (MUX) 524 having a first data input terminal corresponding to the data input terminal of the modulator 512 and receiving the signal $L_{HD}$. An arithmetic negator, i.e. invertor (INV), 526 is also coupled to the data output terminal of the de-emphasis multiplier 508 for receiving the signal $L_{HD}$ therefrom. An output terminal of the arithmetic negator 526 is coupled to a second data input terminal of the multiplexer 524. An output terminal of the multiplexer 524 is coupled to an input terminal of the adder 506. A folding clock signal, which has a frequency equal to one-half the sampling clock frequency, is coupled to the control input terminal of the multiplexer. This signal alternates between a logic '1' value and a logic '0' value at the sampling frequency, and may be generated by a flip-flop coupled to the sampling clock signal.

In operation, when the folding clock signal is a logic '1' signal, then the multiplexer 524 couples the non-negated (+1) signal from the input terminal to its output terminal. When the folding clock signal is a logic '0' signal, then the multiplexer couples the negated (−1) signal from the arithmetic negator 526 to its output terminal. In this fashion, a (+1, −1) modulated signal is reproduced. The lower sideband of the modulated signal contains a spectral image of the 2.5–4.2 MHz bandwidth de-emphasized high band luminance signal $L_{HD}$ but inverted in frequency. That is, the de-emphasized high band luminance signal $L_{HD}$ is folded about the folding frequency such that the lower frequency components of the de-emphasized luminance high band frequencies are folded into the bandwidth below 2.5 MHz, and the higher frequency components of the de-emphasized high band luminance frequencies of 4.2 MHz, for example, are folded into the neighborhood of 800 kHz, thus producing the folded de-emphasized high band luminance signal $L_{HDF}$.

The folded de-emphasized high band luminance signal $L_{HDF}$ is then combined with the low band luminance signal $L_L$ in adder 506. This adder outputs the composite folded luminance signal $L_f$ which contains the luminance information of the input luminance wide baseband signal L compressed within a folded bandwidth of 2.5 Mhz, thus making it possible to transmit the 4.2 MHz NTSC baseband luminance information via a narrow 2.5 MHz bandwidth medium such as by a conventional narrow bandwidth format VCR and videocassette.

The folded luminance signal $L_f$ may then be supplied to a record equalization section 514, shown in FIG. 6a, where the signal is equalized prior to D/A conversion to precompensate for loss in the tape path and to compensate for encoder processing losses, for example by boosting the frequencies around the 2.5 MHz region to compensate for the signal attenuation characteristic in the band split region of the de-emphasis circuit band splitting filter. The folded luminance signal $L_f$ from the folding section 108 is then supplied to the D/A converter 110 as shown in FIG. 2 to be converted to an analog luminance signal $L_r$, then applied to luminance record circuit 20 of FIG. 1 where it frequency modulates the recording carrier, and is ultimately recorded onto videotape by record head 40 as a frequency modulated narrow bandwidth luminance component.

It will be appreciated that although in the above example the luminance high band signal $L_H$ was adaptively de-emphasized prior to folding modulation and addition with the low band luma signal $L_L$ in the folding circuit 108, an equivalent result would be effected by reversing the order of the multiplier 508 and modulator 512 in the folding circuit 108 shown in FIG. 6a, for first folding the luma high band signal $L_H$ in the folding modulator 512 and then adaptively de-emphasizing the folded high band output signal from the folding modulator 512 in the de-emphasis multiplier 508, as shown in the block diagram of FIG. 6g, where like elements corresponding to the circuits of FIGS. 6a and 6b are designated with like reference numerals.

Furthermore, it will be appreciated that because the folding operation according to the present invention is performed only upon the high band luminance component signal, it is not necessary to employ a low pass filter after the adder 506 in the folding circuit 108 as would normally be required if folding were performed on the baseband luminance signal. However, the adaptive de-emphasis processing according to the present invention may likewise be applied effectively to a folding system in which folding is performed on the baseband luminance signal L. An alternative folding circuit of this type is shown in FIG. 6h, where the baseband luminance signal L is applied to one input of an adder 550 and also to an adaptive de-emphasis circuit 560 where the high frequency luminance component is adaptively de-emphasized with a monotonically decreasing transfer function. The de-emphasized baseband luminance signal is then applied to folding modulator 570, where it is shifted as by +1, −1 multiplexing in accordance with a folding clock as described above, and the de-emphasized shifted baseband luminance signal is then applied to the other input of adder 550 to be combined with the input baseband luminance signal. The interleaved luminance signal from adder 550 is then passed through a horizontal lowpass filter 580 having a cutoff of 2.5 MHz, then D/A converted and recorded as previously described.

In the above-described folding circuit embodiments employing a band-splitting filter in the de-emphasis processing as shown in FIGS. 6a and 6g, the bandwidth of the compatibly-recorded luminance signal $L_r$ extends only to around 2.5 MHz, that is, the upper limit of the low band luma out of the band splitting filter, while the luma frequencies above 2.5 MHz are carried in the folded signal. In the folding circuit of FIG. 6h just described, the necessary use of lowpass filter 580 after folding also limits the recorded luminance signal $L_r$ bandwidth to 2.5 MHz. This limiting of the recorded luminance bandwidth is of no significant consequence when the recorded signal is reproduced by a playback apparatus implementing a decoder in accordance with the invention for unfolding the compatibly encoded recorded folded luminance signal and reconstructing a wide bandwidth luminance signal therefrom, since the folded luminance frequencies extending beyond 2.5 MHz can be recovered in playback decoding in accordance with the present invention in order to display an image having full horizontal resolution. However, when playing back the compatibly encoded recording on a conventional playback apparatus lacking such a decoding facility, the displayed horizontal resolution will be limited by the limited bandwidth of the reproduced luminance signal, since the higher luma frequencies carried in the folded signal will not be recovered.

Figure 6N:
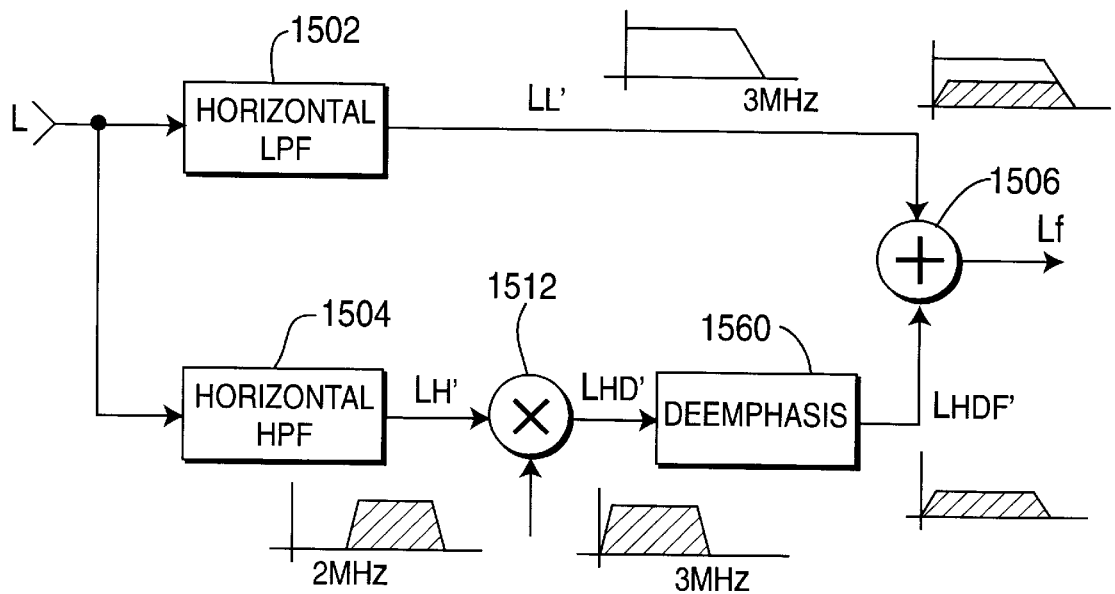
FIG. 6n is a block showing a further alternative implementation of a folding circuit in accordance with the invention.

A further embodiment of a folding circuit in accordance with the invention shown in FIG. 6n can improve the horizontal resolution during compatible playback by implementing a different band-split filtering of the luminance signal during the encoding process. In comparison to the folding circuit shown in FIG. 6g described previously, in the folding circuit of FIG. 6n the HLPF 502 and HHPF 504 forming the band-splitting filter in FIGS. 6a and 6g are replaced respectively by a horizontal lowpass filter (HLPF) 1502 which may have its characteristics selected to provide a −6 dB response at around 3 MHz, and a vertical highpass filter (VHPF) 1504 providing a −6 dB response at 2 MHz, with both HLPF 1502 and VHPF 1504 receiving the input luminance signal L. HLPF 1502 and VHPF 1504 together perform a band-splitting function, however, their respective output signals $L_L$, and $L_H$, are not contiguous half- or split-bands but rather are overlapping in frequency.

Figure 6O:
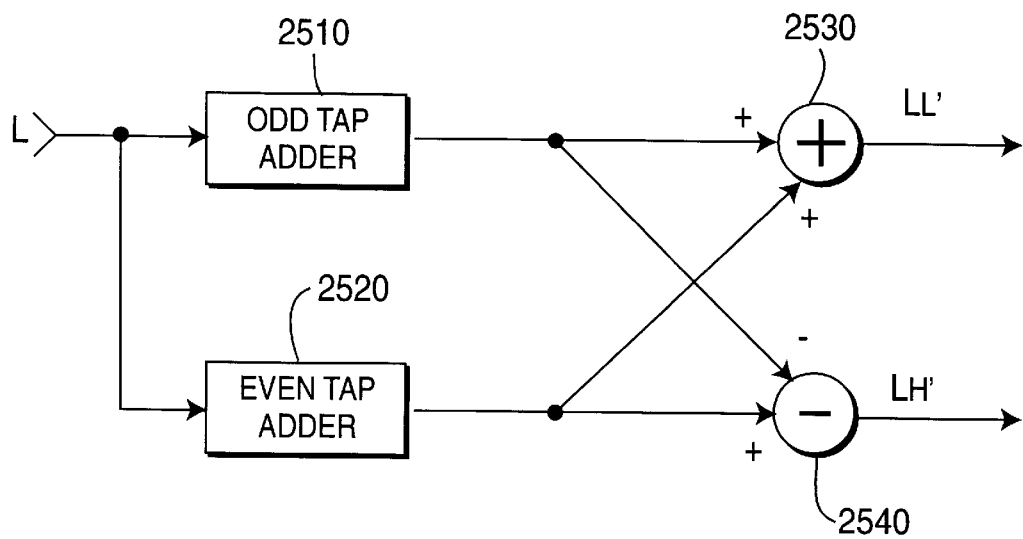
FIG. 6o is a more detailed block diagram of an alternative band-splitting filter shown in FIG. 6n.

That is, HLPF 1502 and VHPF 1504 together form an inverse filter (e.g. their respective response characteristics are the inverse of one another and symmetrical) which may be implemented as shown in more detail in FIG. 6o. The luminance signal L is input to an odd tap adder 2510 and also to an even tap adder 2520. The output of odd tap adder 2510 is coupled to one input of an adder 2530 and also to a subtrahend input of a subtractor 2540. The output of even tap adder 2520 is coupled to the other input of adder 2530 and also to a minuend input of subtractor 2540. Adder 2530 adds the outputs of odd tap adder 2520 and even tap adder 2530 together to provide a horizontally lowpass-filtered output signal $L_L$, and subtractor 2540 differences the outputs of odd tap adder 2520 and even tap adder 2530 to provide a vertically highpass-filtered output signal $L_H$.

The low frequency luminance signal $L_L$, out of HLPF 1502 will thus have a bandwidth which at its upper end is 6 dB down at around 3 MHz, while the high frequency luminance signal $L_H$, out of VHPF 1504 will contain only those luminance frequencies above approximately 2 MHz. The high luma signal $L_H$, from VHPF 1504 is band-shifted by folding modulator 1512 operating in a manner previously described, and the resultant shifted high luma signal $L_{HF}$, is adaptively de-emphasized by a de-emphasis section 1560 in a manner previously described to provide the band-shifted de-emphasized high frequency luma signal $L_{HFD}$, to adder 1506 for combining with the low frequency luma signal $L_L$, to output the folded luma signal $L_f$ which is then supplied to the luma record circuit 20.

It will be appreciated that because the low band luminance signal $L_L$, from HLPF 1502 has a bandwidth extending up to approximately 3 MHz, so also the folded luminance signal $L_f$, will have a bandwidth extending to approximately 3 MHz at the high end, i.e. its frequency characteristic will be 6 dB down at 3 MHz, thereby providing the advantage of the folded luminance signal $L_f$ having approximately 0.5 MHz greater bandwidth over the folded luminance signal $L_f$ output by the folding circuit shown in FIG. 6a. Thus, the recorded luminance signal $L_r$, will contain the low band luminance components up to 3 MHz, thereby providing a luminance signal having its bandwidth limited to 3 MHz, as well as the band-shifted high luminance frequencies above 2 MHz folded within the limited bandwidth occupied by the low frequency luminance components. Accordingly, the folded limited bandwidth luminance signal $L_f$ when recorded and then reproduced by a conventional narrow bandwidth playback apparatus lacking any facility for recovering the folded high frequency luminance component will provide greater horizontal resolution than will the folded limited bandwidth luminance signal $L_f$ provided by the folding circuit of FIG. 6a, offering the advantage of higher horizontal resolution in compatible playback.

Additional advantages of the use of HLPF 1502 and VHPF 1504 in the folding circuit of FIG. 6n are that in implementing them in the fashion of the inverse filter shown in FIG. 6o, any ripple can be made symmetrical between the low and high bands, thereby rendering the folding very uniform, and the need for equalization of the folded luminance signal $L_f$ prior to recording can be reduced or even eliminated since it is not necessary to compensate for loss in the band-splitting filter cutoff regions.

It is helpful for an understanding of the present invention to provide a further explanation regarding the choice of the folding and pre-filtering processing employed, in the context of applying the present invention to a narrow bandwidth video recording format such as the conventional VHS format. It has previously been proposed to shift a high frequency luminance signal component by filtering and sub-Nyquist sampling to insert it within spectral holes within the spatio-temporal frequency domain occupied by the NTSC chrominance sub-carrier component, but offset relative thereto. See for example, T. Fukinuki et al., "Extended Definition TV Fully Compatible with Existing Standards", IEEE Trans. on Communications, Vol. COM-32, No. 8, August 1984, pages 948–953; and T. Fukinuki et al., "NTSC FULL COMPATIBLE EXTENDED DEFINITION TV PROTO MODEL AND MOTION ADAPTIVE PROCESSING", reprinted from IEEE Communications Society "IEEE Global Telecommunications Conference", No. 4.6, Dec. 2–5, 1985, pages 113–117; the disclosures of which are incorporated hereinto by reference thereto.

As described above, the luminance components above 2.5 MHz normally lost by low luma band recording systems such as are employed in conventional VHS and Beta format VCRs are, in accordance with the invention, folded into frequency slots below 2.5 MHz by a form of sub-Nyquist sampling known as four-field offset subsampling, which provides adequate spatio-temporal performance. For still or low motion image areas, high vertical resolution can be obtained through the use of intra-frame processing, and a spatio-diagonal lowpass performance is possible for image motion areas by employing intra-field processing.

FIGS. 6e and 6f show the frequency characteristics of the folding process employed in the present invention, in the vertical-horizontal frequency spectrum and the vertical frequency-temporal domains, respectively. The high band luminance is folded into the so-called "Fukinuki" areas in the upper left and lower right quadrants of the diamond in FIG. 6f. Because conventional VCRs employ a component type recording system, in applying the present invention to such recording systems it would also have been possible to fold the high band luminance into the spectral 'holes' from which the NTSC chrominance sub-carrier has been removed in the upper left and lower right quadrants of the diamond. However, because there may still be residual chroma sidebands present in those areas which might interfere with the folding and unfolding processes, it has been found to be advantageous to fold the high band luma into the Fukinuki areas as shown, with the result that by folding into these quadrants, any residual chroma components when unfolded will be in complementary phase on successive fields and will be optically canceled in the display monitor. Further, it should be noted that because the folded highs alternate in phase at 15 Hz, motion detection becomes impractical after folding, so that it is preferred to detect motion prior to folding by temporal differencing and spatial lowpass filtering of the separated baseband luminance prior to folding.

Next, with reference to FIGS. 7a through 7f, the processing of the chrominance and motion signals to provide the composite chrominance-plus-motion signal C+M in the encoder will be described in more detail in the exemplary case of implementing the system of the present invention for compatibility with the conventional VHS format. As is well known, in VCRs according to the standard VHS format, the input video chrominance (color difference) information which is modulated on a chroma sub-carrier (nominally 3.58 MHz for NTSC composite video) is separated from the luminance information prior to recording and then frequency down-converted by heterodyning against a 4.21 MHz carrier to provide a sub-carrier at approximately 629 KHz (40 times the horizontal scanning frequency) with the sidebands reversed in order from the NTSC chroma component, to be directly recorded onto the videotape as a so-called 'color-under' sub-carrier signal, that is, in the frequency spectrum below the recorded luminance component, i.e. below approximately 1.2–1.3 MHz. As is also well known, in order to reduce beat and cross-talk between mutually adjacently recorded tracks, during the recording process the phase of the VHS format's 629 KHz color-under carrier is shifted 90° each line in every track (i.e. every field), so that its phase is shifted or rotated +90° per line (advanced) on odd tracks and −90° per line (retarded) on even tracks. See for example U.S. Pat. Nos. 3,723,638 to Fujita, No. 4,068,257 to Hirota et al. and No. 4,178,606 to Hirota, the disclosures of which patents are incorporated hereinto by reference thereto.

Figure 7A:
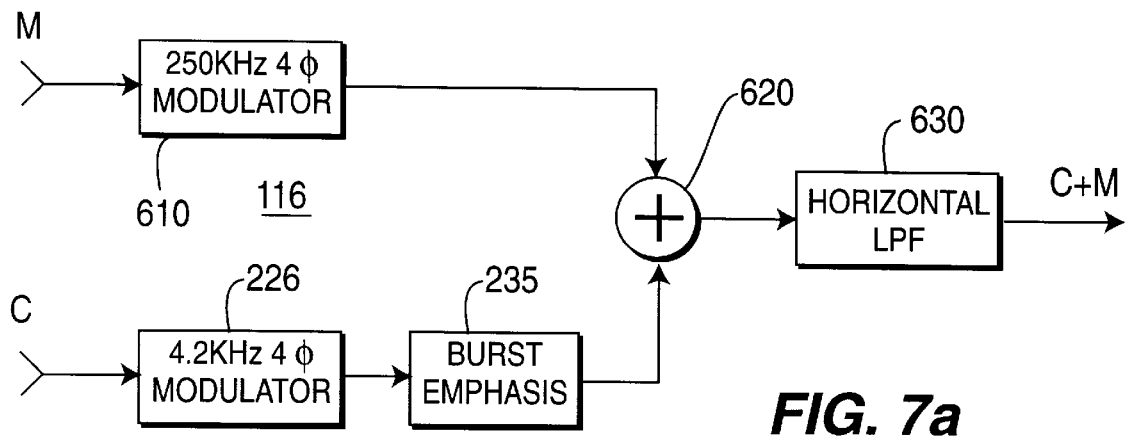
FIG. 7a is a detailed block diagram of a chrominance/motion signal combining circuit of FIG. 2.
Figure 7B:
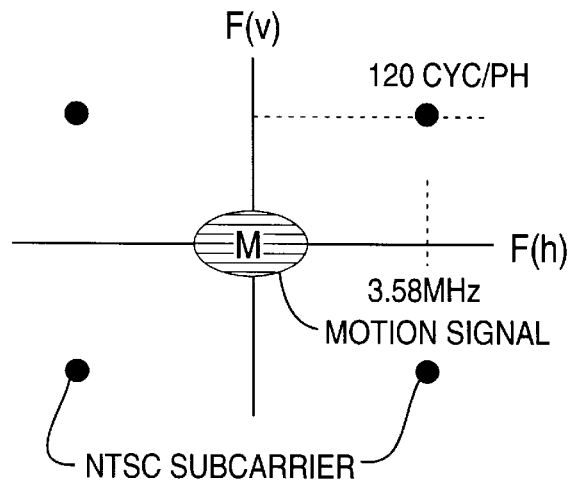
FIG. 7b is a diagram showing the relationship between the NTSC color carrier and the motion signal prior to encoding.
Figure 7C:
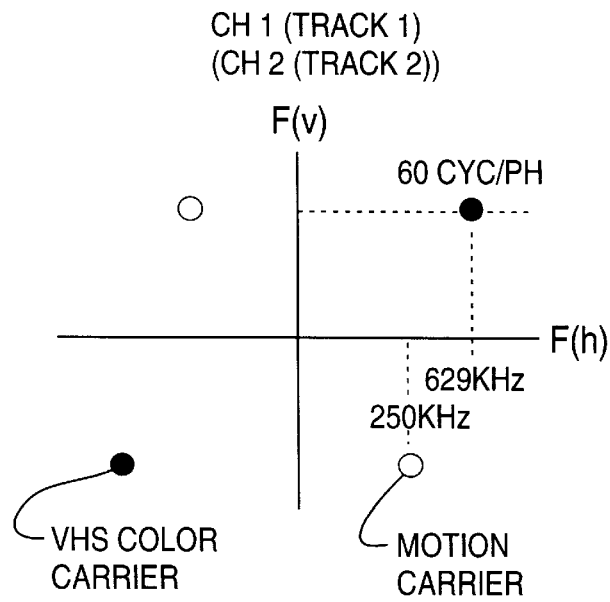
FIG. 7c is a diagram showing the relationship between a VHS format color-under carrier and the encoded motion signal in an even track (channel)
Figure 7D:
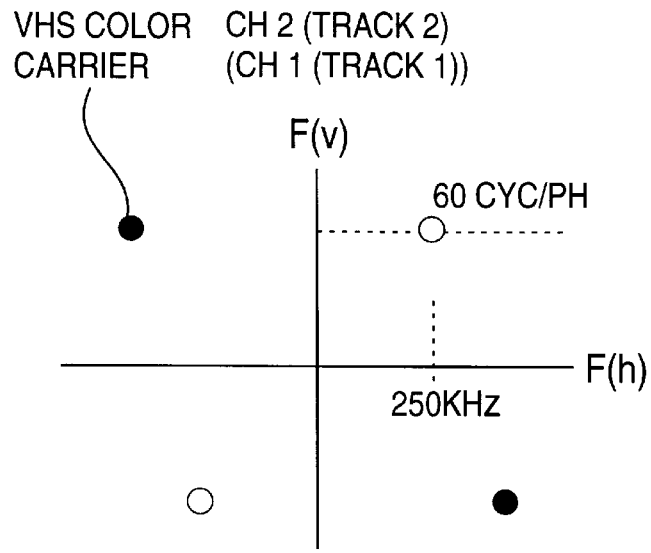
FIG. 7d is a diagram showing the relationship between a VHS format color-under carrier and the encoded motion signal in an odd track (channel)
Figure 7E:
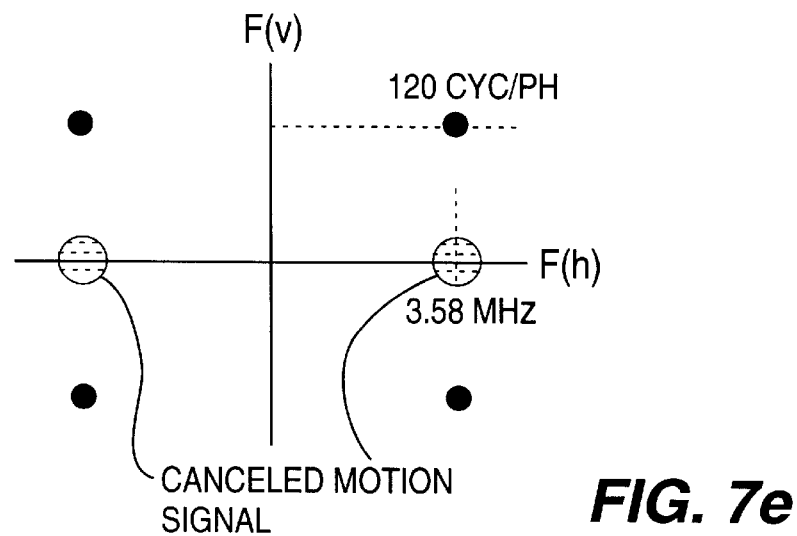
FIG. 7e is a diagram illustrating phase opposition cancellation of the reproduced encoded motion signal in a conventional VCR.

FIG. 7b depicts the relationship between the "raw" spread motion signal M (e.g. out of signal spreader 222) and the NTSC chrominance sub-carrier in the vertical and horizontal frequency domain. As a consequence of the phase shifting of the VHS format's color-under carrier, a two-dimensional (horizontal and vertical frequency) spectral analysis of the VHS format's 629 KHz color carrier shows that on even tracks (fields) it occupies the first and third quadrants and on odd tracks (fields) it occupies the second and fourth quadrants, as depicted in FIGS. 7c and 7d. Thus, it may be seen that on even tracks the second and fourth quadrants of the VHS format 629 MHz color-under carrier are normally "vacant" or unused, that is, not utilized for signal carriage, while on odd tracks the first and third quadrants are "vacant".

In accordance with the present invention as exemplarily embodied for compatibility with conventional VHS format recording and reproduction apparatus, during the encoding processing in the chrominance/motion combining circuit 116 of FIG. 2 the spread motion signal M is modulated on a carrier and combined with the down-converted VHS color-under signal so that the modulated motion signal appears in the vacant second and fourth quadrants of the VHS format 629 KHz color-under carrier C on even tracks, and in the vacant first and third quadrants of the color-under carrier on odd tracks, to produce the composite chrominance-plus-motion signal C+M.

It should be noted that the "vacancy" in the quadrants of the quadrature modulated chrominance signal for accommodating the motion signal encoding therein may be created in several ways and at different stages of the encoding process, such as by implementing a pre-combing of the separated NTSC chrominance signal e.g. by the use of anti-crosstalk element 224 in the form of a 2H comb filter. Thus for example, the NTSC chrominance signal at 3.58 MHz may be processed by passing it through a vertical high pass filter (such as VHPF 224), or the down-converted color-under chrominance signal at 629 KHz may be passed through a diagonal filter, or the baseband chrominance (U+V/I+Q) signal may be vertically lowpass filtered. Each of these processes will provide essentially an equivalent effect, namely creating the "vacant" quadrants in the modulated chrominance signal into which the motion signal may then be compatibly encoded.

FIG. 7a shows the chrominance/motion combining circuit 116 of FIG. 2a according to a VHS format-compatible embodiment in more detail. The spread motion signal M from output terminal 225 is input to a modulator 610 and modulated on a 250 KHz four-phase carrier to generate a modulated motion signal component having a horizontal frequency of 250 KHz and with its phase shifting forward or backward 90° per line in alternate fields in complementary fashion (phase complement) to that of the 629 VHS KHz color-under carrier C, so that in those fields (tracks) where the color-under carrier C occupies the first and third quadrants, the motion signal M occupies the second and fourth quadrants, while in opposite fields (tracks) the color-under carrier C and motion signal M reverse quadrants. The down-converted color-under carrier component C from chroma modulator 226 in FIG. 3 and the modulated motion signal component M from modulator 610 are input to respective signal inputs of an adder 620 to be combined into the resultant chrominance-plus-motion signal C+M. It will be understood by those skilled in the art that the chrominance signal C may be appropriately processed for color burst emphasis as by burst emphasis or gating circuitry 235 prior to application to adder 620. The chrominance-plus-motion signal C+M output by adder 620 thus contains the chrominance information C as well as the spread motion signal information M modulated on a four-phase carrier but occupying complementary quadrants of the carrier, advancing and retarding 90° in phase and alternating between even and odd quadrants in alternate fields. The chrominance-plus-motion signal C+M from adder 620 is then filtered by a horizontal lowpass filter (HLPF) 630 having a cutoff frequency of around 1.2–1.3 MHz and supplied to D/A converter 118 to be converted to an analog signal C+$M_r$ which is supplied to chrominance record circuit 30 to be recorded directly onto the videocassette tape the same as a color-under component by the recording head 40 in conventional manner. The choice of the 250 KHz carrier frequency for the motion signal is made in order to reduce the visibility of interference during playback of an encoded recording on a conventional VHS format playback device, however, it is also possible to modulate the motion information on a 629 KHz carrier like the chroma, so long as the quadrants occupied by the respective signals are complementary as described above.

Figure 7F:
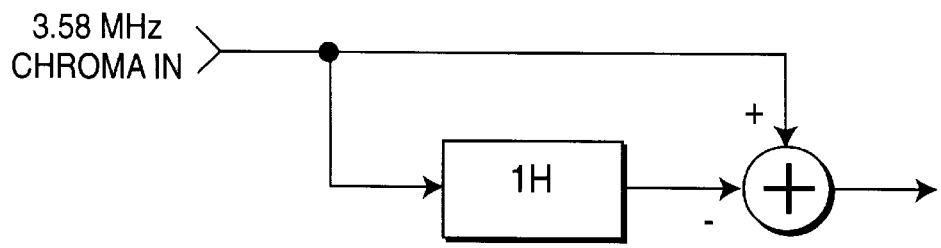
FIG. 7f is a block diagram of a conventional chroma comb filter.

As is well known, in playback processing according to the VHS format, the reproduced 629 KHz color-under carrier is up-converted to 3.58 MHz by reversing the heterodyning process employed on the record side. As shown in FIG. 7f, conventional VCRs typically employ a vertical high-pass comb filtering (line comb filtering) in a bandpass amplification processing of the recovered 3.58 MHz chrominance sub-carrier after the up-conversion, to cancel out the luminance and adjacent track crosstalk signals from the chroma. Further, many conventional television sets include a chroma bandpass amplification circuit using such a chroma comb filter. Thus, on reproduction, the encoded motion signal component M, being 180° out of phase with the chrominance component C, will be canceled by the line combing and only the in-phase chroma signal will be output from the chroma comb filter in such a conventional VCR or TV when playing back an encoded recording, as shown graphically in FIG. 7e, thereby ensuring that even though the encoded motion signal will be reproduced from the tape during playback, it will be filtered out of the chroma signal in a conventional VCR during playback processing (or filtered out in the television set used to display the playback) and not generate any noise or interference in the reproduced image.

Furthermore, as described above, because in accordance with the invention the folded high frequency luminance components which are inserted into the bandwidth of the low band luminance are advantageously adaptively de-emphasized during the encoding process on the record side, the amplitude of these high luma components in the reproduced signal on playback of the encoded recording by a conventional low band VCR will be sufficiently below a level which would cause objectionable artifacts in the displayed reproduced video image.

The apparatus and processing described above may be used to record a full-bandwidth video signal in encoded bandwidth-reduced form on a standard video cassette, which encoded narrow band recording may then be compatibly played back on a standard narrow bandwidth VCR to reproduce a narrow bandwidth video image without objectionable artifacts. Apparatus and processing as described hereafter may be used for extracting the luminance high frequencies folded into the luminance low frequencies and regenerating the full bandwidth video signal upon playback of such a previously recorded video cassette.

Figure 8:
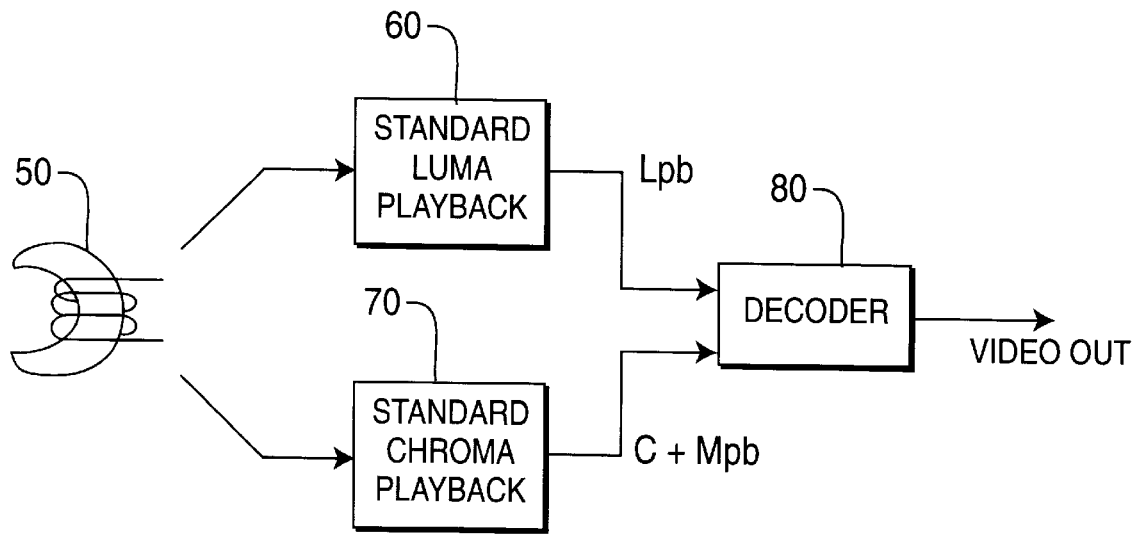
FIG. 8 is a block diagram of a playback section of a video recorder implemented in accordance with the present invention.

FIG. 8 is a block diagram of a VCR playback system in accordance with the present invention. In FIG. 8, a playback head 50 is incorporated in a standard tape transport (not shown) of a conventional narrow bandwidth (e.g. VHS format) VCR. Playback head 50 is coupled to respective input terminals of a luminance signal playback circuit 60 and a chrominance signal playback circuit 80. An output terminal of luminance signal playback circuit 60 is coupled to a first input terminal of a decoder 70, and an output terminal of chrominance signal playback circuit 80 is coupled to a second input terminal of decoder 70. An output terminal of decoder 70 is coupled to a video output terminal 15. Output terminal 15 is coupled to utilization circuitry (not shown) which may be, for example, a television receiver for reproducing the images previously recorded on the video cassette, or a Y-C output jack.

In operation, playback head 50 supplies its reproduction signal to both the luminance playback circuit 60 and the chrominance playback circuit 80, in a known manner. The previously recorded folded luminance signal occupies a band of frequencies at about 1.4–7.0 MHz, and the previously recorded chrominance-plus-motion signal occupies a 1 MHz band of frequencies at around 500 KHz above and below 629 kHz. The luminance playback circuitry processes the folded luminance signal in the usual manner (i.e. frequency demodulation) to produce the narrow bandwidth playback folded luminance signal $L_{pb}$. The chrominance playback circuitry processes the chrominance-plus-motion signal to produce the playback chrominance-plus-motion signal C+$M_{pb}$. This signal is then processed by the decoder 70 which separates the motion signal from the chrominance signal, and uses the recovered motion signal to aid in processing the luminance component for reconstructing the full bandwidth luminance signal. The reconstructed full bandwidth luminance signal and the separated chrominance signal may then be combined to form a composite video signal at output terminal 15.

Figure 9:
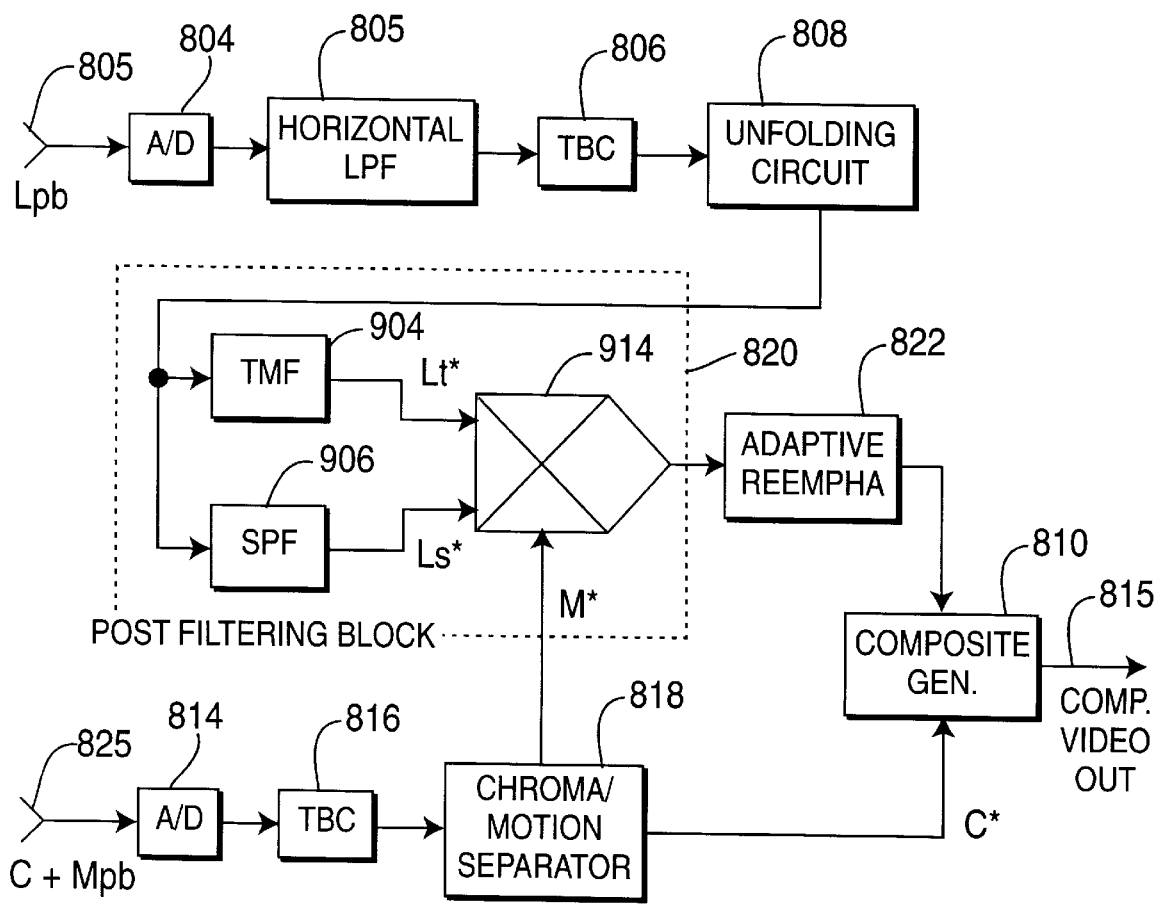
FIG. 9 is a more detailed block diagram of a decoder in the playback section illustrated in FIG. 8.

FIG. 9 is a more detailed block diagram of the decoder 70 illustrated in FIG. 8. In FIG. 9, an input terminal 805 is coupled to the output terminal of luminance playback circuit 60 of FIG. 8. Input terminal 805 is coupled to an input terminal of an analog-to-digital converter (A/D) 804. An output terminal of A/D 804 is coupled to an input terminal of a horizontal lowpass filter HLPF 805 having its passband selected at around 2.5 MHz or 3 MHz, depending on the bandwidth of the folded luminance signal. An advantage of filtering the playback luminance signal digitally is that the group delay characteristics of the digital HLPF 805 may be made flat, which is difficult to achieve in an analog implementation. The output terminal of HLPF 805 is coupled to an input terminal of a time base corrector (TBC) 806. An output terminal of TBC 806 is coupled to a data input terminal of an unfolding circuit 808. An output terminal of unfolding circuit 808 is coupled to a luminance signal input terminal of a spatio-temporal post-filter 820. An output terminal of post-filter 820 is coupled to an input terminal of an adaptive re-emphasis circuit 822. An output terminal of adaptive re-emphasis circuit 822 is coupled to a luminance signal input terminal of composite video signal generator 810. Composite video signal generator 810 may typically include a D/A converter for converting the applied digital luminance and chrominance component signals to analog signals. An output terminal of composite video signal generator 810 is coupled to an output terminal 815. Output terminal 815 is coupled to utilization circuitry (not shown) which, for example, may be a television receiver for reproducing the images which were previously recorded on the cassette or a Y-C output jack.

Alternatively, the recovered luminance and chrominance signals L* and C*, which are in digital form, may be output directly in digital form for utilization in further processing, or may be D/A converted and output directly as analog Y and C signals for further utilization.

An input terminal 825 is coupled to the output terminal of the chrominance playback circuit 80 of FIG. 8. Input terminal 825 is coupled to an input terminal of an analog-to-digital converter (A/D) 814. An output terminal of A/D 814 is coupled to an input terminal of a time base corrector (TBC) 816. An output terminal of TBC 816 is coupled to an input terminal of a chrominance/motion signal separator 818. A chrominance signal output terminal of the chrominance/motion signal separator 818 is coupled to a chrominance input terminal of the composite video signal generator 810. A motion signal output terminal of the chrominance/motion signal separator 818 is coupled to a control input terminal of the spatio-temporal pre-filter 820.

In operation, the upper elements in FIG. 9 operate to extract the full-bandwidth luminance signal from the reduced bandwidth luminance signal previously recorded on the cassette. A/D 804 produces a sampled multi-bit digital signal representing the playback folded luminance signal. The TBC 806 operates to correct any timing inaccuracies which are introduced by jitter in the tape mechanism or any other source of timing inaccuracy, and produces the recovered folded luminance signal $L_f^*$ (where "*" indicates a playback signal representing the same signal as previously recorded on the cassette).

The lower elements in FIG. 9 operate the extract the chrominance-plus-motion (C+M) signal previously recorded on the cassette. The A/D 814 produces a sampled multi-bit digital signal representing the chrominance-plus-motion signal and the TBC 816 operates to correct any timing inaccuracies in this signal, and produces the recovered chrominance-plus-motion signal C+M*.

When recorded, the chrominance signal and the luminance signals were in phase synchronism. However, they are passed through two separate independent paths in the record circuitry (illustrated in FIG. 1) and are frequency division multiplexed on the cassette. This separate processing may introduce phase inaccuracies between the two signals which are not compensated for in the two separate TBCs 806 and 816. Prior co-pending U.S. patent application Ser. No. 531,144 describes in detail apparatus for restoring the proper phase relationship between the chrominance and luminance signals.

Chrominance/motion separator 818 processes the recovered chrominance-plus-motion signal C+M* to produce a recovered motion signal M*, which is supplied to the control input terminal of the spatio-temporal post-filter 820, and chrominance signal C*, which is supplied to the chrominance signal input terminal of the composite video signal generator 810.

The unfolding circuit 808 unfolds (i.e. re-shifts) the luminance high band frequencies which were previously folded into the luminance low band frequency spectrum and combines the low and high band luminance signals to output the full bandwidth unfolded luminance signal $L_{uf}$. This full bandwidth unfolded luminance signal $L_{uf}$ is supplied to the spatio-temporal post-filter 820 where the unfolded full bandwidth luminance signal $L_{uf}$ is motion-adaptively spatiotemporally filtered to provide the de-emphasized luminance signal $L_D^*$ having the high frequency luminance components still de-emphasized due to the record side de-emphasis processing. This unfolded de-emphasized luminance signal $L_D^*$ is supplied to the adaptive re-emphasis circuit 822 where the de-emphasized high frequency components are adaptively re-emphasized to restore them to their original amplitude to provide the recovered full bandwidth luminance signal L* with proper amplitude relationship. The recovered full bandwidth luminance signal L* is supplied to the luminance signal input terminal of the composite video signal generator 810. Composite video signal generator 810 operates in a known manner to combine the luminance signal L* and chrominance signal C* to form a standard (digital or analog) composite video signal. This signal may be used by any equipment which utilizes such a signal, for example, a television receiver or display monitor.

Figure 10A:
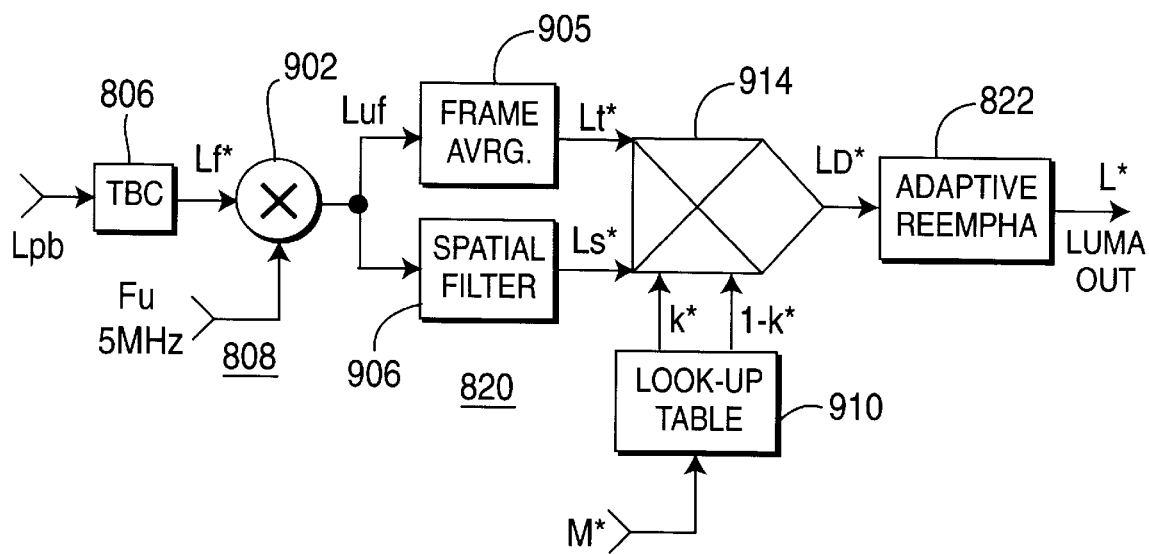
FIG. 10a is a block diagram of an unfolding circuit of the decoder illustrated in FIG. 9.

FIG. 10a is a block diagram of a portion of the luminance recovery section illustrated in the upper half of FIG. 9, showing in more detail the unfolding circuit 808 and the spatio-temporal post-filter 820. After time base correction by TBC 806, the folded luminance signal $L_f^*$ is applied to one input of unfolding circuit 808, which may be implemented by a modulator 902 to which is also supplied an unfolding carrier having a frequency $f_u$. A three-dimensional spectral plot of folded luminance signal $L_f^*$ is depicted in FIG. 10d, with the low band luminance component appearing in the foreground (i.e. temporal zero frequency) and the folded luminance high band component appearing in the background (i.e. 15 Hz temporal frequency). The folded luminance signal $L_f^*$ is unfolded by direct or "straight" sub-Nyquist sampling (as contrasted to the 'offset' technique employed during folding) around the unfolding frequency (selected to be e.g. 5 MHz in accordance with the criteria described above in the description of the folding modulator 512 of FIG. 6a) by the modulator 902, to provide the unfolded luminance signal $L_{uf}$. Unfolding modulator 902 may be constructed in a known manner using a four quadrant multiplier, and is preferably a +1, 0 type modulator operating to insert zero values replacing odd or even samples depending on the unfolding phase, driven by a clock signal at one-half the sampling frequency, which in this example is a sampling frequency of 10 MHz.

The unfolded (i.e. remodulated) luminance signal $L_{uf}$ is then applied to the input terminal of spatio-temporal post-filter 820 for removal of byproducts of the unfolding process prior to re-emphasis of the unfolded high frequency luminance component. The post-filter 820 includes a temporal lowpass filter (TMF) 904 configured as a frame comb lowpass filter (which may be identical in structure and operation to THPF 204, HHPF 216 and subtractor 210 in FIGS. 3 and 4) which provides frame averaging and removes components all the way down to spatial DC from the unfolded luminance signal $L_{uf}$ for providing temporally derived unfolded luminance signal $L_T^*$. Temporal filter 904 is arranged in parallel with a spatial filter (SPF) 906 (which may be identical in structure and operation to VHPF 202, HHPF 212, subtractor 208 and HLPF 209 in FIGS. 3 and 4) acting as a diagonal lowpass filter for providing spatially derived unfolded luminance signal $L_S^*$.

A soft switch 914 having its data inputs connected to the $L_T^*$ and $L_S^*$ outputs of TMF 904 and SPF 906, respectively, varies its data output proportionally between the temporally filtered and spatially filtered unfolded luminance signals applied at its data inputs from TMF 904 and SPF 906, under control of motion-adaptive scaling factor signals K* and 1−K* which are applied to control input terminals of soft switch 914 from a look-up table (LUT) 910. LUT 910 generates scaling factor signals K* and 1−K* in accordance with the recovered motion signal M* applied to its input terminal from chrominance/motion separation circuit 818, for performing motion-adaptive post-filtering of the unfolded luminance signal $L_{uf}$ prior to the re-emphasis stage processing. The output terminal of soft switch 914 is coupled to an output terminal of post-filter 820 at which is provided the spatio-temporally post-filtered unfolded de-emphasized luminance signal $L_D^*$ which is in turn coupled to the luminance signal input terminal of adaptive re-emphasis circuit 822.

As noted, SPF 906 may correspond in structure and operation to the luminance spatial filter section of the adaptive luma separation circuit 104 formed by VHPF 202, HHPF 212, subtractor 208 and HLPF 209 shown in FIG. 3, providing a diagonal lowpass filtering response for spatially processing the unfolded signal to remove unfolding artifacts, i.e. remodulation byproducts and residual unfolding carrier which may be present during image motion and which manifest strongly in the diagonal. This correspondence permits utilization of the same filter in encoding and decoding.

The unfolded luminance signal $L_{uf}$ from modulator 902 of unfolding circuit 808 is applied to the input of post-filter 820 and is commonly supplied to the inputs of both TMF 904 and the SPF 906. The temporally derived unfolded luminance signal $L_T^*$ output from TMF 904 is supplied to a first data input terminal of soft switch 910. The spatially derived unfolded luminance signal $L_S^*$ output from SPF 906 is supplied to a second data input terminal of soft switch 914.

The unfolding carrier frequency in the decoder corresponds to the folding carrier frequency in the encoder. As described above with respect to the folding carrier, the carrier frequency is selected to maximize the distance between the baseband luminance signal and the luminance image signal in the temporal, vertical and horizontal directions. But the spectral characteristics of the recorded luminance signal effect the spectral shape of the unfolded luminance signal and the image signal. Thus, the spectral characteristics of the recorded luminance signal must be used to adaptively filter the reproduced video signal to leave only the full bandwidth unfolded luminance signal. Prior co-pending U.S. patent applications Ser. No. 562,907 filed Aug. 6, 1990 and Ser. No. 635,197 filed Feb. 19, 1991 describe in detail techniques for spatial filtering of an unfolded luminance signal to remove unwanted diagonal frequency components present during image motion.

When the level of motion in the video image is low, the unfolded luminance signal lies at temporal low frequencies, close to temporal DC, and the luminance component lies close in the temporal direction to the unfolding carrier, which was selected to be far away from temporal DC. In the presence of motion in the video image, the luminance component occupies a wider temporal bandwidth. In this case modulation byproducts may overlap temporally with the unfolded luminance signal and must be removed spatially. This is graphically depicted in FIGS. 10e and 10f. In FIG. 10e is shown three-dimensionally the spatio-temporal ($F_{(v)}$, $F_{(h)}$, $F_{(t)}$) spectrum of the unfolded luminance signal $L_{uf}$ output from unfolding circuit 808. During still image areas (no motion), the baseband luminance (low band and unfolded high band luma) is in the temporal foreground (i.e. at zero temporal frequency), while in the temporal background (i.e. at 15 Hz temporal frequency) where the unfolding carrier is shown are the folded highs and remodulated lows.

Figure 10B:
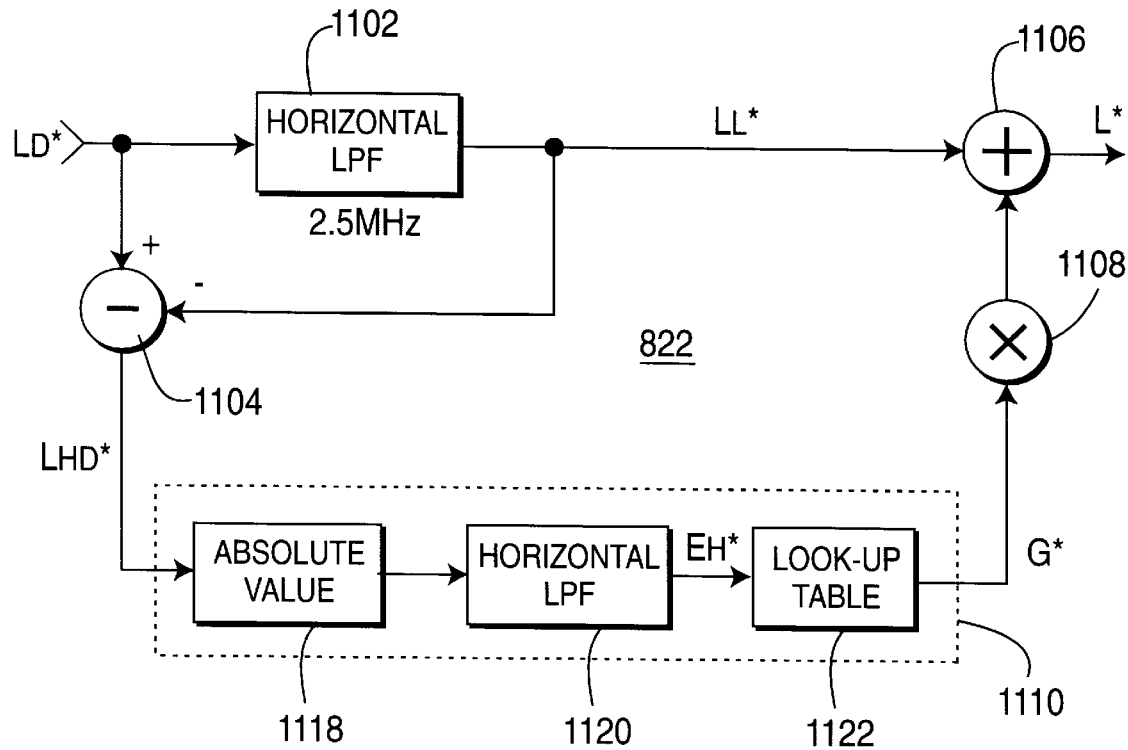

In the case of still motion areas of the video image, the frame averaging (frame lowpass filtering) performed by TMF 904 will cancel out all of the components in the temporal background by the unfolding carrier (e.g. at 15 Hz) by frame combing. In this manner, a 3 dB reduction of low spatial frequency noise components can be obtained. However, during image motion, it becomes necessary to employ spatial filtering of the unfolded luminance signal as shown in FIG. 10f, in order to notch out remodulation byproducts which manifest in the diagonal, thereby maintaining the baseband luminance including the unfolded highs in the temporal foreground.

The selection between what amounts of the temporally- and spatially-filtered unfolded luminance signals $L_T^*$ and $L_S^*$ which will be output is performed by soft switch 914 under control of the recovered motion signal M*. Recovery of the motion signal in the decoder 70 will be described in more detail later.

Soft switch 914 controls the proportion of the temporally derived and spatially derived unfolded full bandwidth luminance signals $L_T^*$ and $L_S^*$ to be included in the spatio-temporally post-filtered unfolded de-emphasized luminance signal $L_D^*$ in response to the recovered motion control signal M*. When the level of image motion is zero or nearly zero, the output of the soft switch 914 consists completely of temporally derived unfolded luminance signal $L_T^*$ from TMF 904, and does not contain any of spatially derived unfolded luminance signal $L_S^*$. As the magnitude of motion in the image gradually increases, the proportion of the temporally derived luminance signal $L_T^*$ input from the TMF 904 in the output of the soft switch 914 correspondingly decreases and the proportion of the spatially derived luminance signal $L_S^*$ input from SPF 906 correspondingly increases. In the presence of relatively high levels of motion, the output from the soft switch 914 will consist entirely of the spatially derived signal $L_S^*$ from SPF 906.

Figure 10C:
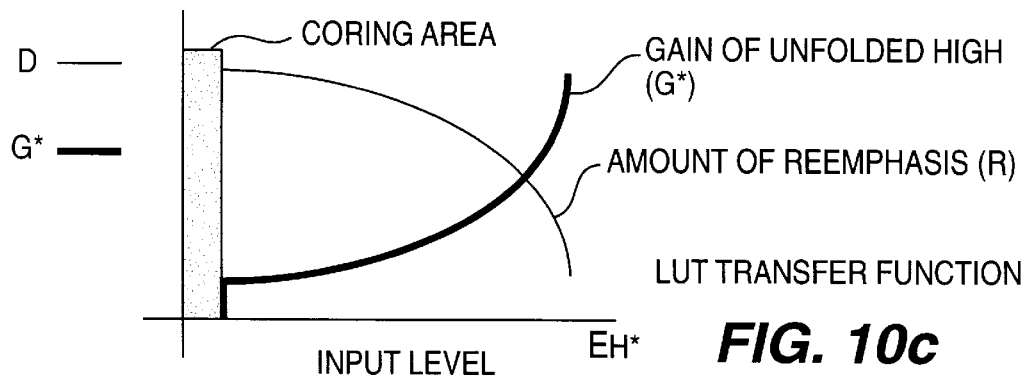
FIG. 10c shows a re-emphasis/gain transfer function of a control signal generator of the adaptive re-emphasis circuit, including a coring function.
Figure 10F:
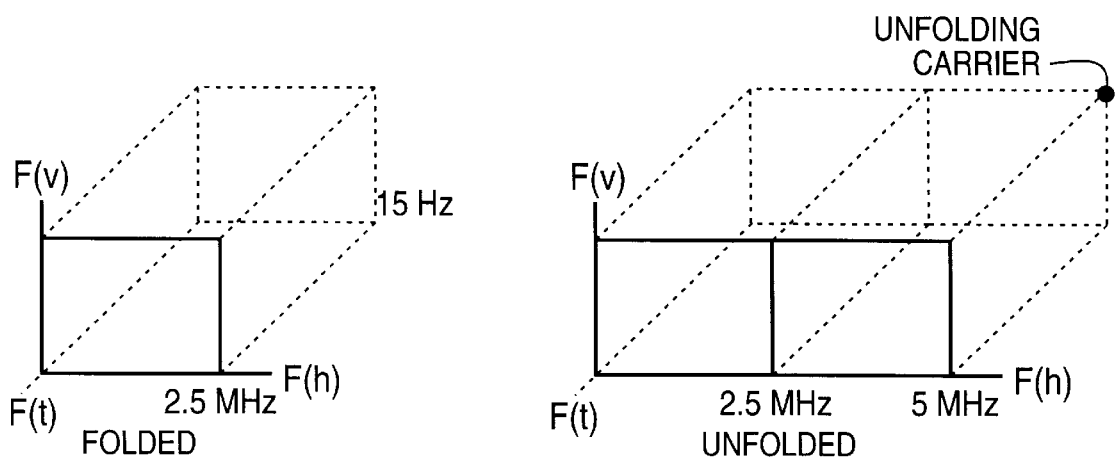
FIG. 10f shows the unfolded signal of FIG. 10f with spatial filtering.
Figure 10F:
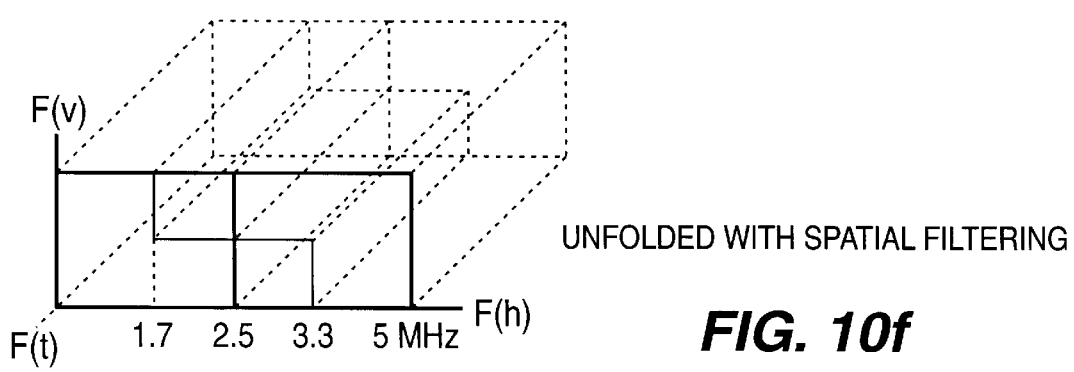
Figure 10G:
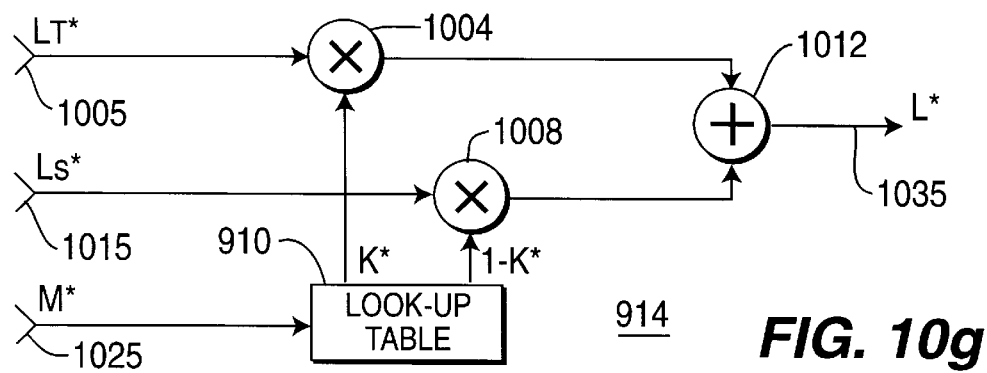

Referring now to FIG. 10g, there is shown a more detailed block diagram of the soft switch 914 of the post-filter 820 in FIG. 10a. It will be seen that soft switch 914 is constructed in identical fashion to soft switch 214 shown in FIG. 5. In FIG. 10g, input terminals 1005 and 1015 for temporally derived unfolded luminance signal $L_T^*$ and spatially derived unfolded luminance signal $L_S^*$ respectively correspond to input terminals 405 and 415 in FIG. 5. Multipliers 1004 and 1008 correspond to multipliers 404 and 408, respectively, in FIG. 5. Likewise, LUT 910 in FIG. 10f having motion signal M* input terminal 1025 corresponds to LUT 410 in FIG. 5 having motion signal M input terminal 425. Similarly, adder 1012 for adding the outputs of modulators 1004 and 1008 to provide thereby the motion adaptively spatio-temporally filtered unfolded de-emphasized luminance signal $L_D^*$ at output terminal 1012 in FIG. 10g corresponds to adder 412 in FIG. 5. Generation of the scaling factor signals K* and 1−K* in LUT 910 in accordance with the applied recovered motion signal M* is performed in the same manner as was previously described above with regard to the operation of soft switch 214 in FIG. 5 for generating scaling factors K and 1−K in accordance with motion signal M, and will not be described in further detail here.

Advantageously, the ROM employed for LUT 910 may be the same as in LUT 410. Furthermore, because the encoder 10 and decoder 70 will typically not be operated simultaneously, for advantages of convenience and economy the pre-filter 820 may share many common elements such as filter blocks and the soft switch with the encoder side luminance separation circuit 104.

Next, the re-emphasis processing of the post-filtered unfolded luminance signal will be described with reference to FIGS. 10a through 10c. After motion-adaptive spatio-temporal filtering by post-filter 820, the unfolded baseband luminance signal $L_D^*$ contains a reduced amplitude high frequency luminance component $L_H^*$ (the de-emphasized high horizontal detail signal) as a result of the adaptive de-emphasis processing during the encoding on the record side, as shown in FIG. 10b. In order to restore the unfolded high luminance component to its original amplitude, the adaptive re-emphasis circuit 822 shown in more detail in FIG. 10b is employed for performing the inverse operation to the de-emphasis processing of the high luma by the adaptive de-emphasis circuit in the encoder.

Adaptive re-emphasis circuit 822 is constructed in similar manner to the adaptive de-emphasis circuit 108 shown in FIGS. 6a and 6b, and for convenience the two circuits may advantageously share many common elements. The post-filtered unfolded luminance signal $L_D^*$ from the output terminal 435 of soft switch 914 is applied to a 2.5 MHz band-splitting filter configured by a 2.5 MHz horizontal lowpass filter (HLPF) 1102 and a subtractor 1104, corresponding to HLPF 502 and subtractor 504 in FIG. 6a. The low band luminance signal $L_L^*$ from HLPF 1102 is supplied to the subtrahend input terminal of subtractor 1104 and also to one input of an adder 1106 corresponding to adder 506 in FIG. 6a. At the subtractor 1104, the low band luma $L_L^*$ is subtracted from the de-emphasized baseband luma $L_D^*$ which is applied to the minuend input terminal of subtractor 1104, to output the recovered de-emphasized high band luminance component $L_{HD}^*$ corresponding to the de-emphasized high band luminance component $L_{HD}$ output at the multiplier 508 in the adaptive de-emphasis circuit 108 during encoding. The de-emphasized high band luminance component $L_{HD}$ output by subtractor 1104 is applied to the data input of the re-emphasis multiplier 1108 corresponding to de-emphasis multiplier 508 of de-emphasis circuit 108 in FIG. 6a, and also to the input of a control signal generator 1110. Control signal generator 1110 includes serially arranged absolute value circuit 1118, horizontal low pass filter (HLPF) 1120 and look-up table (LUT) 1122, in similar fashion to absolute value circuit 518, HLPF 520 and LUT 522 in control signal generator 510 of de-emphasis circuit 108 in the encoder 10. However, as will be explained below, the characteristics of LUT 1122 used in the re-emphasis processing are reversed from those of LUT 522 used in the de-emphasis processing.

The action of control signal generator 1110 corresponds to that of control signal generator 510 in FIG. 6a, except that their respective transfer functions are substantially the inverse of one another, as may seen from comparing the characteristic graphs in FIGS. 6c and 10c. That is, whereas the de-emphasis gain G transfer function of LUT 522 in the de-emphasis circuit 108 is preferably monotonically decreasing for providing luma de-emphasis, the re-emphasis gain $G^*$ transfer function of LUT 1122 is preferably monotonically increasing for providing unity gain through re-emphasis multiplier 1108 at low signal levels of $L_{HD}^*$ and high gain through re-emphasis multiplier 1108 at high signal levels of $L_{HD}^*$. Thus, re-emphasis circuit 822 has the adaptive characteristic that in broad flat image areas it provides little or no gain to the de-emphasized high band luma signal $L_{HD}^*$, with the resultant effect that a high frequency luminance component which was originally at a low level in the wideband video signal input to the encoder (that is, in high band luma signal $L_H$ in de-emphasis circuit 108) and did not therefore undergo de-emphasis during the encoding process is not subjected to re-emphasis during the decoding processing but is passed through multiplier 1108 at unity gain and output at its original amplitude. On the other hand, for those portions of the de-emphasized high band luma signal $L_{HD}^*$ which correspond to high frequency, high amplitude transitions in the original input video signal (that is, in high band luma signal $L_H$) and were therefore de-emphasized during encoding, the gain through multiplier 1108 is increased to restore these high frequency luminance components to their original level. The adaptive re-emphasis is accomplished by measuring the average energy level (i.e. the average "local" energy) in the de-emphasized high band luma signal $L_{HD}^*$ by operation of absolute value circuit 1110 and LPF 1120 to derive the average energy signal $E_H^*$ which is applied as an address to LUT 1122. LUT 1122 then outputs a re-emphasis gain control signal $G^*$ to the gain control data input of multiplier 1108 to control the gain through multiplier 1108, and thereby the amount of re-emphasis R performed on the de-emphasized high band luma signal $L_{HD}^*$. The relation between $E_H^*$, the gain $G^*$ through multiplier 1108 and the re-emphasis amount $R$ is shown in FIG. 10c, where the gain $G^*$ is depicted by a heavy line and the re-emphasis amount $R$ is shown by a thin line.

The re-emphasized unfolded high frequency luminance component signal $L_H^*$ output from re-emphasis multiplier 1108 is applied to adder 1106 to be added together with the unfolded low frequency luminance component $L_L^*$, and adder 1106 outputs the reconstructed baseband luminance signal L* with proper amplitude relationship restored thereto and corresponding to the full bandwidth luminance signal L in the encoder. The reconstructed baseband luminance signal L* is supplied to the luminance input of composite video signal generator 810.

In practice, on the recording side, some amplitude boosting of very low amplitude high frequency luminance signal components may be done, allowing for some compression during playback, thus improving the S/N ratio in broad flat areas of the image without degrading backward compatibility of the encoded recorded signal. Correspondingly, in the re-emphasis circuit 822, the control signal generator 1110 may provide a coring function, as by incorporating such a coring function in the transfer characteristic of LUT 1122 as depicted by the shaded area in FIG. 10c.

It will be understood that the re-emphasis processing employed in the playback side decoding will correspond as closely as possible to the de-emphasis processing employed in the record side encoding. Thus, in the case where the de-emphasis processing employed the alternative embodiment low pass filter 1502 and high pass filter 1504 in the folding circuit of FIG. 6n which are formed by the inverse filter of FIG. 6o for deriving the low and high band luma signals $L_L$ and $L_H$, then the re-emphasis circuit 822 will employ a corresponding lowpass and highpass filter arrangement (preferably the same inverse filter arrangement) in place of the band-split filter of HLPF 1102 and subtractor 1104, in order to derive the low and high luma signals $L_L^*$ and $L_H^*$, and similarly, because the folded signal $L_f^*$ on playback will contain the low band luma frequencies up to 3 MHz, it will be understood that in such case the lowpass filter HLPF 805 may be selected to correspondingly pass frequencies below 3 MHz rather than 2.5 MHz.

As described above, during recording it is possible to derive a motion-representative signal during the chrominance/luminance signal separation processing of the input composite video signal itself. So-called "false motion" may be introduced into this motion-representative signal by the chrominance signal (i.e. chrominance information which aliases as motion), but this false motion can be largely eliminated by vertically and horizontally lowpass filtering the temporally highpass-filtered signal (or temporally highpass-filtering the spatially lowpass-filtered composite signal). Because the NTSC chrominance component sidebands do not extend down below 2 MHz, horizontal lowpass-filtering ensures that chrominance components which might give rise to false motion are removed from the motion-representative signal during the motion derivation process.

As described above, the luminance high frequencies are folded into the low frequency luminance signal spectrum by modulating them on a folding carrier which is placed in a Fukinuki hole, similar to the manner in which the NTSC chrominance subcarrier is placed in the composite NTSC video signal. However, there are no restrictions on the lower sidebands of the folded luminance high frequencies. In fact, diagonal detail in the high band luminance signal, when folded into the luminance low band frequencies, can extend all the way down to spatial DC. Because the folding carrier is alternated on a frame-to-frame basis (to maximize the temporal distance from DC) these diagonal details may incorrectly get detected, i.e. mis-recognized as motion, giving rise to false motion detection, and no degree of spatial filtering can prevent this false motion detection. Thus, to properly remove the folding byproducts from the unfolded luminance signal on playback, it is necessary to supply a separate channel for passing the motion-representative signal, derived during the encoding side processing and utilized for motion-adaptively filtering the separated luminance component signal, to the decoder side for utilization in motion adaptively pre-filtering the unfolded luminance signal as previously described.

One skilled in the art of video signal processor design will recognize that providing a separate channel for supplying the motion representative signal to the playback circuitry allows the motion adaptive luminance reconstruction process in the playback circuitry to mimic the motion-adaptive processing in the chrominance/luminance signal separator in the record circuitry. For example, if the chrominance/luminance signal separator in the record circuitry chose temporal processing in some region of the image to derive the luminance signal, it would be incorrect to choose spatial processing on the playback side to reconstruct the full bandwidth luminance signal in the same region of the image.

Further, the chrominance/luminance signal separation process performed on the composite NTSC signal in the encoder, no matter how well done, can introduce some artifacts into the image, i.e. chrominance aliasing as luminance and vice versa. The full bandwidth luminance signal reconstruction process performed in the decoder can also introduce artifacts into the image. If the second process is independent of the first process, then the artifacts introduced by the upstream process have artifacts introduced upon them by the downstream process, intensifying them. Artifact intensification can be greatly reduced if the downstream processing can be made to faithfully follow, that is, to parallel, the upstream processing. Providing a separate channel in the transmission or recording medium for the motion representative signal, for compatibly encoding the motion signal and allowing it to be recovered on the decoding side, allows for both the above improvements. As described previously, it has been found advantageous to compatibly encode the motion signal into the chrominance component signal and then to recover it by a separation process in the decoding processing. In a VHS format-compatible implementation, this is done by encoding the motion signal into vacant quadrants of the VHS format color-under carrier on the record side. On the playback side, the encoded motion signal must be separated from the reproduced color-under carrier component, in order that the recovered motion signal may be utilized for motion-adaptive filtering of the unfolded luminance signal.

Figure 11A:
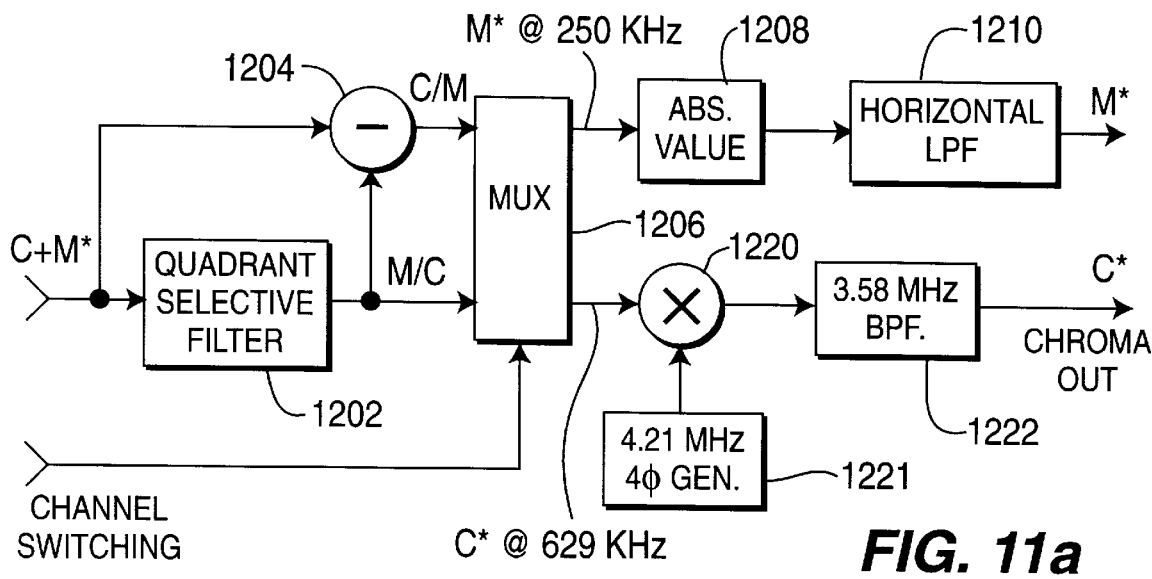
FIG. 11a is a detailed block diagram of a chrominance/motion signal separation circuit of the decoder of FIG. 9.
Figure 11B:
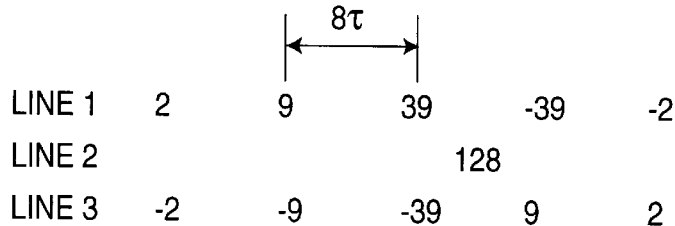
FIG. 11b shows the coefficients of a digitally implemented quadrant selective filter forming part of the chrominance/motion signal separation circuit.
Figure 11C:
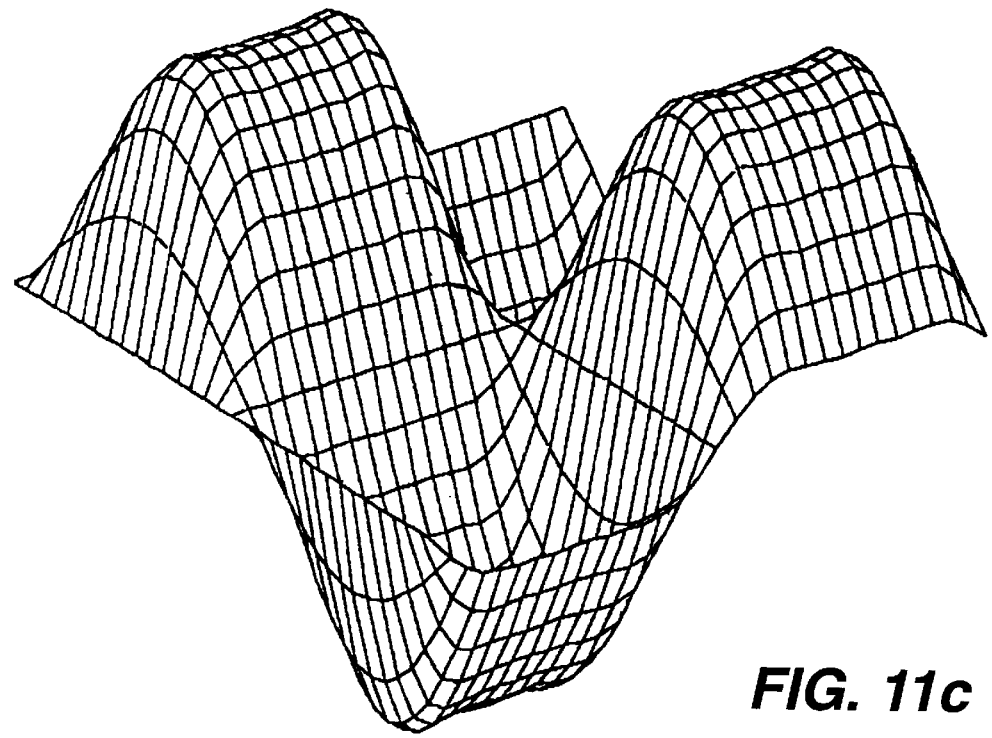
FIG. 11c is a three-dimensional plot of the spatial frequency response of the quadrant selective filter.
Figure 11D:
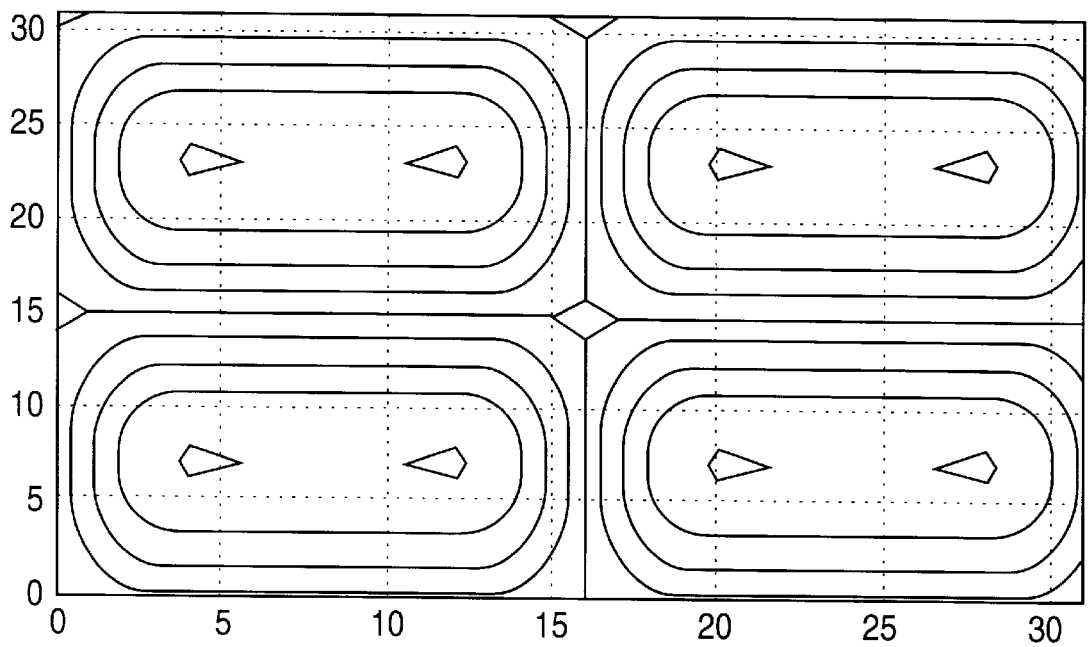
FIG. 11d is a two-dimensional plot taken across the horizontal midplane of the three-dimensional plot in FIG. 11c.
Figure 11E:
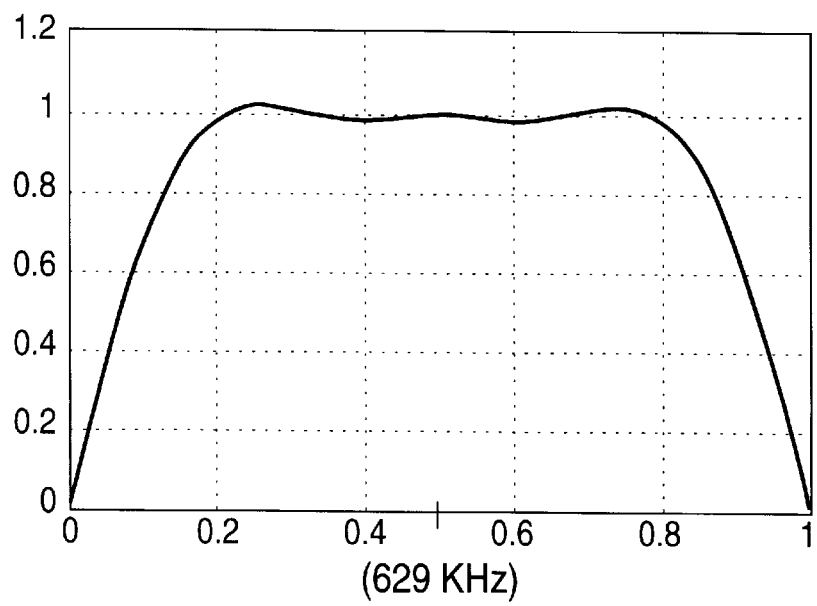
FIG. 11e is a selectivity plot of the horizontal frequency response of the quadrant selective filter.

The separation of the composite chrominance-plus-motion signal C+M* in chrominance/motion separation circuit 818 of FIG. 9 as implemented for application to use with the conventional VHS format will now be described in more detail with reference to FIGS. 11a through 11e. It is preferable, from the viewpoint of digitally implementing the separation process, to perform this processing directly on the C+M* signal when it is still at the color-under frequency prior to up-conversion, due to the reduced storage requirements for the filter stages involved at the lower frequency. As shown in FIG. 11a, the chrominance-plus-motion signal C+M* from TBC 816 is applied to the input of a quadrant selective filter QSF 1202 and also to the minuend input of a subtractor 1204. QSF 1202 selects between odd and even quadrants of the input C+M* signal and may be implemented by a diagonal filter with 2H of delay and having four unique coefficients and a structure as shown in FIG. 11b. The spatial frequency response of QSF 1202 is shown in FIGS. 11c and 11d, where the negative (lower) peaks represent zero amplitude or stop bands and the positive (upper) peaks represent pass bands. FIG. 11e shows the horizontal frequency response or selectivity of QSF 1202, centered on 629 KHz. The bandwidth of the pass region is approximately 1 MHz, providing 500 KHz bandwidth for each sideband for maintaining good chroma response. Due to the fixed nature of QSF 1202, it will be appreciated that for those reproduced tracks (i.e. fields) from the encoded recorded videotape in which the chrominance component of the signal C+M* is in a quadrant of QSF 1202 with the positive peaks (pass bands), the filter will pass only the chrominance component, while in the next track (field) only the motion signal component will be passed. Accordingly, QSF passes the motion component or the chroma component, depending on what track, odd or even, is being decoded.

For each track (field/channel) reproduced by the playback head 50, QSF 1202 will pass either the C* or the M* component of the reproduced composite C+M* signal to its output, depending on which component is located in the filter's pass region during that track. The output of QSF 1202 is coupled to the subtrahend input of subtractor 1204 in order to obtain the opposite signal component, M* or C*, by differencing the filter output against the composite C+M* signal applied at the minuend input of subtractor 1204. The output of QSF 1202 (i.e. M* or C*) and the output of subtractor 1204 (i.e. C* or M*) are coupled to respective inputs of a multiplexer (MUX) 1206 having a pair of inputs and a pair of outputs which are switched at the field rate of 30 Hz under control of a signal (e.g. field pulse or channel 1-channel 2 switching signal) which may be generated in known manner by a conventional head switching circuit (not shown) of the VCR associated with the playback head 50, or by conventional channel switching circuitry associated with playback preamplifier circuits. One output of MUX 1206 therefore will continuously provide only the separated chrominance component C* for each track/channel reproduced, while the other output of MUX 1206 will continuously provide only the separated motion signal component M*.

The separated motion signal M* is coupled to the input of an absolute value circuit (ABS) 1208 which may be conveniently implemented by a full wave rectifier. The output of ABS 1208 is coupled to the input of a horizontal lowpass filter (HLPF) 1210 which may be implemented with 15 taps at about 500 KHz. It will be appreciated that the order of ABS 1208 and HLPF 1210 may be reversed if desired without affecting the resultant signal. The recovered spread motion signal M* output from HLPF 1210 is supplied to the motion signal input of LUT 910 of the spatio-temporal post-filter 820 for controlling the motion-adaptive filtering of the unfolded luminance signal $L_{uf}$ as previously described.

The separated chrominance signal component C* output by MUX 1206 may be D/A converted to an analog signal and then processed by a conventional VHS chroma recovery circuit in known manner to obtain the 3.58 MHz NTSC chroma component. This may in fact be preferable from the viewpoint of chroma phase control processing during picture search and still modes, which is more complex if performed digitally. However, the separated chrominance signal component C* output by MUX 1206 may be also be digitally processed by a digital implementation of a conventional VHS chroma recovery circuit employing a modulator 1220 (e.g. a multiplier) supplied with a 4.21 MHz four-phase carrier, whereby the 629 KHz chroma component carrier is frequency up-converted to 3.58 MHz by heterodyning, then passed through a 3.58 MHz bandpass filter (BPF) 1222 to pass the 3.58 MHz chroma. The chrominance component may be filtered further for removing residual up-conversion carrier and modulation byproducts, and processed for burst de-emphasis if desired. The recovered digital 3.58 MHz chrominance sub-carrier component signal may then be D/A converted to an analog NTSC chroma component signal, supplied to composite video signal generator 810 (which may include a D/A conversion facility), or utilized in further processing.

Having now described the details of the video signal system according to the present invention and its processes, it will be appreciated that the invention is amenable to many modifications and alternative implementations, for example, application to a broadcast or other transmission or storage medium rather than a recording medium, or implementation according to different video signal conventions and formats, or varying the respective transfer functions of the adaptive de-emphasis and adaptive re-emphasis processing, and such modifications are considered to fall within the scope of the invention which is intended to be limited only by the appended claims.

What is claimed:

1. A video signal processing system for transmitting a wide bandwidth video signal via a limited bandwidth medium, comprising:

encoder means connectable to a limited bandwidth video medium, for receiving an input video signal including at least a wide bandwidth luminance signal having low frequency and high frequency luminance components and for producing therefrom a limited bandwidth luminance signal having a low frequency luminance band with a bandwidth limited to a limited bandwidth and a high frequency luminance band component de-emphasized in amplitude from said input video signal and folded into a bandwidth of said low frequency luminance band component, wherein the amount of de-emphasis of said high frequency luminance band component varies in dependence on an amplitude thereof in the input video signal.

2. The video signal processing system according to claim 1, wherein the amount of de-emphasis of said high frequency luminance band component varies in proportion to the amplitude thereof in the input video signal.

3. The video signal processing system according to claim 1, wherein the amount of de-emphasis of said high frequency luminance band component varies in monotonically increasing relation to an average energy thereof in the input video signal.

4. The video signal processing system according to claim 1, wherein the encoder means comprises:

band filtering means for receiving said wide bandwidth luminance signal and producing therefrom a low frequency luminance band component having a bandwidth limited to said limited bandwidth and a high frequency luminance band component;

de-emphasis means for de-emphasizing said high frequency luminance band component in dependence upon the amplitude thereof; and folding means for folding said high frequency luminance band component into a spectrum of said low frequency luminance band component.

5. The video signal processing system according to claim 4, wherein said de-emphasis means comprises:

gain control signal generator means for generating a de-emphasis gain control signal which varies in monotonically decreasing relation to an average energy of said high frequency luminance band component; and de-emphasis gain means for attenuating an amplitude of said high frequency luminance band component in accordance with said de-emphasis gain control signal.

6. The video signal processing system of claim 5, wherein said gain control signal generator means comprises:

absolute value means for generating an absolute value signal representing an absolute value of said high frequency luminance band component;

lowpass filter means for lowpass filtering said absolute value signal to provide an average energy signal representing an average energy of said high frequency luminance band component; and look-up table means for generating a de-emphasis gain control signal varying in value in accordance with said average energy signal.

7. The video signal processing system according to claim 5, wherein said de-emphasis gain means comprises:

multiplier means for multiplying said high frequency luminance band component by said de-emphasis gain control signal.

8. The video signal processing system according to claim 4, wherein said de-emphasis means comprises:

absolute value means for generating an absolute value signal representing an absolute value of said high frequency luminance band component;

lowpass filter means for lowpass filtering said absolute value signal to provide an average energy signal representing an average energy of said high frequency luminance band component;

look-up table means for generating a de-emphasis gain control signal varying in value in accordance with said average energy signal; and multiplier means for multiplying said high frequency luminance band component by said de-emphasis gain control signal.

9. The video signal processing system according to claim 4, wherein the amount of de-emphasis of said high frequency luminance band component effected by said de-emphasis means varies in proportion to the amplitude thereof in the input video signal.

10. The video signal processing system according to claim 4, wherein the amount of de-emphasis of said high frequency luminance band component effected by said de-emphasis means varies in monotonically increasing relation to an average energy thereof in the input video signal.

11. The video signal processing system according to claim 1, wherein the encoder means comprises:
   band filtering means for receiving said wide bandwidth luminance signal and for producing therefrom a low frequency luminance band component having a bandwidth limited to said limited bandwidth and a high frequency luminance band component;
   de-emphasis means for de-emphasizing said high frequency luminance band component in dependence upon the amplitude thereof; and
   folding means for folding said de-emphasized high frequency luminance band component into said low frequency luminance band component.

12. The video signal processing system according to claim 11, wherein said de-emphasis means comprises:
   gain control signal generator means for generating a de-emphasis gain control signal which varies in monotonically decreasing relation to an average energy of said high frequency luminance band component; and
   de-emphasis gain means for attenuating an amplitude of said high frequency luminance band component in accordance with said de-emphasis gain control signal..

13. The video signal processing system of claim 12, wherein said gain control signal generator means comprises:
   absolute value means for generating an absolute value signal representing an absolute value of said high frequency luminance band component;
   lowpass filter means for lowpass filtering said absolute value signal to provide an average energy signal representing an average energy of said high frequency luminance band component; and
   look-up table means for generating a de-emphasis gain control signal varying in value in accordance with said average energy signal.

14. The video signal processing system according to claim 12, wherein said de-emphasis gain means comprises:
   multiplier means for multiplying said high frequency luminance band component by said de-emphasis gain control signal.

15. The video signal processing system according to claim 11, wherein said de-emphasis means comprises:
   absolute value means for generating an absolute value signal representing an absolute value of said high frequency luminance band component;
   lowpass filter means for lowpass filtering said absolute value signal to provide an average energy signal representing an average energy of said high frequency luminance band component;
   look-up table means for generating a de-emphasis gain control signal varying in value in accordance with said average energy signal; and
   multiplier means for multiplying said high frequency luminance band component by said de-emphasis gain control signal.

16. The video signal processing system according to claim 11, wherein the amount of de-emphasis of said high frequency luminance band component effected by said de-emphasis means varies in proportion to the amplitude thereof in the input video signal.

17. The video signal processing system according to claim 11, wherein the amount of de-emphasis of said high frequency luminance band component effected by said de-emphasis means varies in monotonically increasing relation to an average energy thereof in the input video signal.

18. The video signal processing system according to claim 1, wherein the encoder means comprises:
   folding means for folding said high frequency luminance component into said low frequency luminance component; and
   de-emphasis means for de-emphasizing said high frequency luminance component in dependence upon the amplitude thereof.

19. The video signal processing system according to claim 18, wherein said de-emphasis means comprises:
   gain control signal generator means for generating a de-emphasis gain control signal which varies in monotonically decreasing relation to an average energy of said high frequency luminance component; and
   de-emphasis gain means for attenuating an amplitude of said high frequency luminance component in accordance with said de-emphasis gain control signal.

20. The video signal processing system of claim 19, wherein said gain control signal generator means comprises:
   absolute value means for generating an absolute value signal representing an absolute value of said high frequency luminance component;
   lowpass filter means for lowpass filtering said absolute value signal to provide an average energy signal representing an average energy of said high frequency luminance component; and
   look-up table means for generating a de-emphasis gain control signal varying in value in accordance with said average energy signal.

21. The video signal processing system according to claim 19, wherein said de-emphasis gain means comprises:
   multiplier means for multiplying said high frequency luminance component by said de-emphasis gain control signal.

22. The video signal processing system according to claim 18, wherein said de-emphasis means comprises:
   absolute value means for generating an absolute value signal representing an absolute value of said high frequency luminance component;
   lowpass filter means for lowpass filtering said absolute value signal to provide an average energy signal representing an average energy of said high frequency luminance component;
   look-up table means for generating a de-emphasis gain control signal varying in value in accordance with said average energy signal; and
   multiplier means for multiplying said high frequency luminance component by said de-emphasis gain control signal.

23. The video signal processing system according to claim 18, wherein the amount of de-emphasis of said high frequency luminance component effected by said de-emphasis means varies in proportion to the amplitude thereof in the input video signal.

24. The video signal processing system according to claim 18, wherein the amount of de-emphasis of said high frequency luminance component effected by said de-emphasis means varies in monotonically increasing relation to an average energy thereof in the input video signal.

25. A video signal processing system for transmitting a wide bandwidth video signal via a limited bandwidth medium, comprising:

encoder means connectable to a limited bandwidth video medium, for receiving an input video signal including at least an input wide bandwidth luminance signal and for producing therefrom a limited bandwidth video signal including a limited bandwidth luminance signal having a high frequency luminance component of said input wide bandwidth luminance signal de-emphasized in amplitude from said input video signal and folded into a bandwidth of a low frequency luminance component limited to said limited bandwidth, wherein the amount of de-emphasis of said high frequency luminance component varies in dependence on the amplitude thereof in the input video signal, and for also generating a motion signal representative of a degree of image motion in said input video signal; and means for transmitting said motion signal together with said limited bandwidth video signal.

26. The video signal processing system according to claim 25, wherein the amount of de-emphasis of said high frequency luminance component varies in proportion to the amplitude thereof in the input video signal.

27. The video signal processing system according to claim 25, wherein the amount of de-emphasis of said high frequency luminance component varies in monotonically increasing relation to an average energy thereof in the input video signal.

28. The video signal processing system according to claim 25, wherein the encoder means comprises:

band filtering means for receiving said wide bandwidth luminance signal and producing therefrom a low frequency luminance band component having its bandwidth limited to a limited bandwidth and a high frequency luminance band component;

de-emphasis means for de-emphasizing said high frequency luminance band component in dependence upon the amplitude thereof;

folding means for folding said high frequency luminance band component into a frequency spectrum of said low frequency luminance band component; and motion signal generation means for generating said motion signal representative of the degree of image motion in said wide bandwidth luminance signal.

29. The video signal processing system according to claim 28, wherein said de-emphasis means comprises:

gain control signal generator means for generating a de-emphasis gain control signal which varies in monotonically decreasing relation to an average energy of said high frequency luminance band component; and de-emphasis gain means for attenuating an amplitude of said high frequency luminance band component in accordance with said de-emphasis gain control signal.

30. The video signal processing system of claim 29, wherein said gain control signal generator means comprises:

absolute value means for generating an absolute value signal representing an absolute value of said high frequency luminance band component;

lowpass filter means for lowpass filtering said absolute value signal to provide an average energy signal representing an average energy of said high frequency luminance band component; and look-up table means for generating a de-emphasis gain control signal varying in value in accordance with said average energy signal.

31. The video signal processing system according to claim 29, wherein said de-emphasis gain means comprises:

multiplier means for multiplying said high frequency luminance band component by said de-emphasis gain control signal.

32. The video signal processing system according to claim 28, wherein said de-emphasis means comprises:

absolute value means for generating an absolute value signal representing an absolute value of said high frequency luminance band component;

lowpass filter means for lowpass filtering said absolute value signal to provide an average energy signal representing an average energy of said high frequency luminance band component;

look-up table means for generating a de-emphasis gain control signal varying in value in accordance with said average energy signal; and multiplier means for multiplying said high frequency luminance band component by said de-emphasis gain control signal.

33. The video signal processing system according to claim 28, wherein the amount of de-emphasis of said high frequency luminance band component effected by said de-emphasis means varies in proportion to the amplitude thereof in the input video signal.

34. The video signal processing system according to claim 28, wherein the amount of de-emphasis of said high frequency luminance band component effected by said de-emphasis means varies in monotonically increasing relation to an average energy thereof in the input video signal.

35. The video signal processing system according to claim 28, wherein said motion signal is spread horizontally and vertically by sa id motion signal generation means.

36. The video signal processing means of claim 28, where in said motion signal is spread horizontally, vertically and temporally.

37. The video signal processing means of claim 28, wherein said motion signal generating means includes spreading means for spreading said motion signal spatially.

38. The video signal processing means of claim 28, wherein said motion signal generating means includes spreading means for spreading said motion signal spatially and temporally.

39. The video signal processing means of claim 28, wherein the wide bandwidth luminance signal which said band splitting means operates upon is a spatio-temporally filtered wide bandwidth luminance signal and wherein said encoder means further comprises:

spatial filter means for spatially filtering the wide bandwidth luminance signal to produce a spatially filtered luminance signal;

temporal filter means for temporally filtering the wide bandwidth luminance signal to produce a temporally filtered luminance signal; and motion-adaptive means for varying, in response to said motion signal, a proportion of said spatially filtered luminance signal and a proportion of said temporally filtered luminance signal in said wide bandwidth spatio-temporally filtered luminance signal supplied to said band splitting means.

40. The video signal processing means of claim 39, wherein said motion signal is spread horizontally and vertically by said motion signal generation means.

41. The video signal processing means of claim 39, wherein said motion signal is spread horizontally, vertically and temporally by said motion signal generation means.

42. A video signal processing system for transmitting a wide bandwidth video signal via a limited bandwidth medium, comprising:

encoder means having an input terminal connectable to a source of composite video signals and an output terminal connectable to a limited bandwidth video medium, for receiving at said input terminal an input composite video signal including a wide bandwidth baseband luminance signal component having low frequency and high luminance frequencies together with a chrominance signal component, and for producing therefrom a limited bandwidth luminance signal having a high frequency luminance component de-emphasized in amplitude from said input video signal and folded into a bandwidth of a low frequency luminance component which is limited to a limited bandwidth, wherein the amount of de-emphasis of said high frequency luminance component varies in dependence on an amplitude thereof in the input video signal;

for deriving from said input video signal a motion signal representative of a degree of image motion in said input video signal;

for spatially filtering said baseband luminance signal to produce a spatially filtered luminance signal;

for temporally filtering said baseband luminance signal to produce a temporally filtered luminance signal;

for varying, in response to said motion signal, a proportion of said spatially filtered luminance signal and a proportion of said temporally filtered luminance signal in said limited bandwidth luminance signal;

for combining said motion signal with said chrominance signal to produce a composite chrominance-plus-motion signal; and for providing said limited bandwidth luminance signal and said chrominance-plus-motion signal at said output terminal.

43. The video signal processing system according to claim 42, wherein the amount of de-emphasis of said high frequency luminance component varies in proportion to the amplitude thereof in the input video signal.

44. The video signal processing system according to claim 42, wherein the amount of de-emphasis of said high frequency luminance component varies in monotonically increasing relation to an average energy thereof in the input video signal.

45. The video signal processing means of claim 42, wherein said motion signal is spread horizontally and vertically by said encoder means.

46. The video signal processing means of claim 42, wherein said motion signal is spread horizontally, vertically and temporally by said encoder means.

47. The video signal processing means of claim 42, wherein said motion signal is added into a vacant portion of said chrominance signal for producing said composite chrominance-plus-motion signal.

48. The video signal processing system of claim 42, wherein the chrominance signal component of said chrominance-plus-motion signal is a color-under chrominance signal.

49. The video signal processing system according to claim 42, wherein the encoder means comprises:

chrominance/luminance separation means for separating said input composite video signal into its said wide bandwidth baseband luminance signal and chrominance signal components;

motion signal generation means for deriving said motion signal from said wide bandwidth baseband luminance signal;

spatial filter means for spatially filtering the wide bandwidth baseband luminance signal to produce a spatially filtered baseband luminance signal;

temporal filter means for temporally filtering the wide bandwidth baseband luminance signal to produce a temporally filtered baseband luminance signal;

motion-adaptive means for varying, in response to said motion signal, respective proportions of said spatially filtered baseband luminance signal and said temporally filtered baseband luminance signal which are output as a spatio-temporally filtered baseband luminance signal;

band filtering means for receiving said spatio-temporally filtered baseband luminance signal and producing therefrom a low frequency luminance band component having a bandwidth limited to said limited bandwidth and a high frequency luminance band component;

de-emphasis means for adaptively de-emphasizing said high frequency luminance band component in dependence upon the amplitude thereof;

folding means for folding said high frequency luminance band component into the bandwidth of said low frequency luminance band component to provide said limited bandwidth luminance signal and for coupling said limited bandwidth luminance signal to said output terminal of said encoder means; and chrominance/motion combining means for combining said chrominance and motion signals into a composite chrominance-plus-motion signal and for coupling said chrominance-plus-motion signal to said output terminal of said encoder means.

50. The video signal processing system according to claim 49, wherein said de-emphasis means comprises:

gain control signal generator means for generating a de-emphasis gain control signal which varies in monotonically decreasing relation to an average energy of said high frequency luminance band component; and de-emphasis gain means for attenuating an amplitude of said high frequency luminance band component in accordance with said de-emphasis gain control signal.

51. The video signal processing system of claim 50, wherein said gain control signal generator means comprises:

absolute value means for generating an absolute value signal representing an absolute value of said high frequency luminance band component;

lowpass filter means for lowpass filtering said absolute value signal to provide an average energy signal representing an average energy of said high frequency luminance band component; and look-up table means for generating a de-emphasis gain control signal varying in value in accordance with said average energy signal.

52. The video signal processing system according to claim 50, wherein said de-emphasis gain means comprises:

multiplier means for multiplying said high frequency luminance band component by said de-emphasis gain control signal.

53. The video signal processing system according to claim 50, wherein said de-emphasis means comprises:

absolute value means for generating an absolute value signal representing an absolute value of said high frequency luminance band component;

lowpass filter means for lowpass filtering said absolute value signal to provide an average energy signal representing an average energy of said high frequency luminance band component;

look-up table means for generating a de-emphasis gain control signal varying in value in accordance with said average energy signal; and multiplier means for multiplying said high frequency luminance band component by said de-emphasis gain control signal.

54. The video signal processing system of claim 50, wherein the amount of de-emphasis of said high frequency luminance band component effected by said de-emphasis means varies in proportion to the amplitude thereof in the input video signal.

55. The video signal processing system according to claim 50, wherein the amount of de-emphasis of said high frequency luminance band component effected by said de-emphasis means varies in monotonically increasing relation to an average energy thereof in the input video signal.

56. The video signal processing system according to claim 50, wherein said motion signal generation means spreads said derived motion signal spatially.

57. The video signal processing system according to claim 50, wherein said motion signal generation means spreads said derived motion signal spatially and temporally.

58. A video signal processing system for converting an input wide bandwidth composite video signal including a wide bandwidth baseband luminance signal component and a chrominance component into a limited bandwidth video signal, comprising:

chrominance/luminance separation means for separating said input wide bandwidth composite video signal into its said wide bandwidth baseband luminance signal and chrominance signal components;

motion signal generation means for deriving from said wide bandwidth baseband luminance signal a motion signal representative of a degree of image motion in said input wide bandwidth composite video signal;

spatial filter means for spatially filtering the wide bandwidth baseband luminance signal to produce a spatially filtered baseband luminance signal;

temporal filter means for temporally filtering the wide bandwidth baseband luminance signal to produce a temporally filtered baseband luminance signal;

motion-adaptive means for varying, in response to said motion signal, respective proportions of said spatially filtered baseband luminance signal and said temporally filtered baseband luminance signal which are output as a spatio-temporally filtered baseband luminance signal;

band filtering means for receiving said spatio-temporally filtered baseband luminance signal and producing therefrom a low frequency luminance band component having a bandwidth limited to said limited bandwidth and a high frequency luminance band component;

de-emphasis means for adaptively de-emphasizing said high frequency luminance band component in dependence upon an amplitude thereof;

folding means for folding said high frequency luminance band component into the bandwidth of said low frequency luminance band component to provide a folded limited bandwidth luminance signal; and chrominance/motion combining means for combining said chrominance signal component and said motion signal into a composite chrominance-plus-motion signal.

59. The video signal processing system according to claim 58, wherein said de-emphasis means comprises:

gain control signal generator means for generating a de-emphasis gain control signal which varies in monotonically decreasing relation to an average energy of said high frequency luminance band component; and de-emphasis gain means for attenuating an amplitude of said high frequency luminance band component in accordance with said de-emphasis gain control signal.

60. The video signal processing system of claim 59, wherein said gain control signal generator means comprises:

absolute value means for generating an absolute value signal representing an absolute value of said high frequency luminance band component;

lowpass filter means for lowpass filtering said absolute value signal to provide an average energy signal representing an average energy of said high frequency luminance band component; and look-up table means for generating a de-emphasis gain control signal varying in value in accordance with said average energy signal.

61. The video signal processing system according to claim 59, wherein said de-emphasis gain means comprises:

multiplier means for multiplying said high frequency luminance band component by said de-emphasis gain control signal.

62. The video signal processing system according to claim 58, wherein said de-emphasis means comprises:

absolute value means for generating an absolute value signal representing an absolute value of said high frequency luminance band component;

lowpass filter means for lowpass filtering said absolute value signal to provide an average energy signal representing an average energy of said high frequency luminance band component;

look-up table means for generating a de-emphasis gain control signal varying in value in accordance with said average energy signal; and multiplier means for multiplying said high frequency luminance band component by said de-emphasis gain control signal.

63. The video signal processing system of claim 58, wherein the amount of de-emphasis of said high frequency luminance band component effected by said de-emphasis means varies in proportion to the amplitude thereof.

64. The video signal processing system according to claim 58, wherein the amount of de-emphasis of said high frequency luminance band component effected by said de-emphasis means varies in monotonically increasing relation to an average energy thereof.

65. The video signal processing means of claim 58 28, wherein said chrominance/motion combining means adds said motion signal into a vacant portion of said chrominance signal component for producing said composite chrominance-plus-motion signal.

66. The video signal processing system of claim 58, wherein the chrominance signal component combined with said motion signal by said chrominance/motion combining means is a color-under chrominance signal.

67. The video signal processing system of claim 58, further comprising:

luminance signal recording means for recording said folded limited bandwidth luminance signal onto a recording medium; and chrominance signal recording means for recording said chrominance-plus-motion signal onto said recording medium.

68. The video signal processing system of claim 67, wherein the recording medium is magnetic tape in a video cassette.

69. The video signal processing system of claim 58, wherein the chrominance/motion combining means comprises:
   chrominance signal modulation means for modulating said chrominance signal component onto a chrominance carrier to provide a modulated chrominance signal component such that at any one time said modulated chrominance signal component occupies only a portion of said chrominance signal carrier and another portion of said chrominance signal carrier is vacant of said modulated chrominance signal component;
   motion signal modulation means for modulating said motion signal onto a motion signal carrier to provide a modulated motion signal such that at said any one time said modulated motion signal occupies only a portion of said motion signal carrier corresponding to said vacant portion of said chrominance signal carrier not occupied by said modulated chrominance signal component; and
   means for adding said modulated chrominance signal component and said modulated motion signal component to provide said composite chrominance-plus-motion signal, whereby said modulated motion signal component is always 180° out of phase with said modulated chrominance signal component in said chrominance-plus-motion signal.

70. A video signal processing system for converting a limited bandwidth folded video luminance signal into a wide bandwidth unfolded video luminance signal, comprising:
   decoder means for unfolding a limited bandwidth folded video luminance signal including a low frequency luminance band component having a bandwidth limited to said limited bandwidth and a high frequency luminance band component folded into a spectrum of said low frequency luminance band component to provide therefrom an unfolded baseband luminance signal having a bandwidth greater than said limited bandwidth and containing the low frequency luminance band component of said limited bandwidth video luminance signal and the high frequency luminance band component unfolded from said limited bandwidth video luminance signal, and for emphasizing said unfolded luminance high frequency band component in amplitude by an amount depending upon a magnitude thereof.

71. The video signal processing system of claim 70, wherein the amount of emphasis of said high frequency luminance band component varies in proportion to an amplitude thereof.

72. The video signal processing system of claim 70, wherein the amount of emphasis of said high frequency luminance band component varies in monotonically decreasing relation to an average energy thereof.

73. The video signal processing system of claim 70, wherein the decoder means comprises:
   unfolding means for unfolding said limited bandwidth video luminance signal to provide said unfolded baseband luminance signal; and
   emphasis means for emphasizing said unfolded high frequency luminance band component by an amount dependent upon an amplitude thereof.

74. The video signal processing system of claim 73, wherein the amount of emphasis effected upon said high frequency luminance band component by said emphasis means varies in proportion to the amplitude thereof.

75. The video signal processing system of claim 73, wherein the amount of emphasis effected upon said high frequency luminance band component by said emphasis means varies in monotonically decreasing relation to an average energy thereof.

76. The video signal processing system according to claim 73, wherein said emphasis means comprises:
   gain control signal generator means for generating an emphasis gain control signal which varies in monotonically increasing relation to an average energy of said unfolded high frequency luminance band component; and
   emphasis gain means for boosting an amplitude of said unfolded high frequency luminance band component in accordance with said emphasis gain control signal.

77. The video signal processing system of claim 76, wherein said gain control signal generator means comprises:
   absolute value means for generating an absolute value signal representing an absolute value of said unfolded high frequency luminance band component;
   lowpass filter means for lowpass filtering said absolute value signal to provide an average energy signal representing an average energy of said unfolded high frequency luminance band component; and
   look-up table means for generating an emphasis gain control signal varying in value in accordance with said average energy signal.

78. The video signal processing system according to claim 76, wherein said emphasis gain means comprises:
   multiplier means for multiplying said unfolded high frequency luminance band component by said emphasis gain control signal.

79. The video signal processing system according to claim 73, wherein said emphasis means comprises:
   absolute value means for generating an absolute value signal representing an absolute value of said unfolded high frequency luminance band component;
   lowpass filter means for lowpass filtering said absolute value signal to provide an average energy signal representing an average energy of said unfolded high frequency luminance band component;
   look-up table means for generating an emphasis gain control signal varying in value in accordance with said average energy signal; and
   multiplier means for multiplying said unfolded high frequency luminance band component by said emphasis gain control signal.

80. A video signal processing system, comprising:
   unfolding means for unfolding a limited bandwidth folded video luminance signal containing a low frequency luminance band component having a bandwidth limited to a limited bandwidth and a high frequency luminance band component folded into a spectrum of said low frequency luminance band component to provide therefrom an unfolded baseband luminance signal having a bandwidth greater than said limited bandwidth and containing said low frequency luminance band component of said folded video luminance signal and said high frequency luminance band component unfolded from said folded video luminance signal;
   spatial filter means for spatially filtering the unfolded baseband luminance signal to produce a spatially filtered baseband luminance signal;
   temporal filter means for temporally filtering the unfolded baseband luminance signal to produce a temporally filtered baseband luminance signal;

chrominance/motion separation means for separating a composite chrominance-plus-motion signal containing a video chrominance signal component combined with a motion signal component representative of a degree of motion in a video image to provide therefrom a separated chrominance signal and a separated motion signal;

motion-adaptive means for varying, in response to said motion signal, respective proportions of said spatially filtered baseband luminance signal and said temporally filtered baseband luminance signal which are output as a spatio-temporally filtered baseband luminance signal;

band filtering means for receiving said spatio-temporally filtered baseband luminance signal and producing therefrom a spatio-temporally filtered low frequency luminance band component having a bandwidth limited to said limited bandwidth and a spatio-temporally filtered high frequency luminance band component;

emphasis means for adaptively emphasizing said spatio-temporally filtered high frequency luminance band component in amplitude in dependence upon a magnitude thereof to provide an emphasized spatio-temporally filtered high frequency luminance band component; and combining means for contiguously combining said emphasized spatio-temporally filtered high frequency luminance band component with said spatio-temporally filtered low frequency luminance band component to provide a wide bandwidth luminance signal.

81. The video signal processing system according to claim 80, wherein said emphasis means emphasizes said spatio-temporally filtered high frequency luminance band component in amplitude by an amount which varies in proportion to an amplitude of said spatio-temporally filtered high frequency luminance band component.

82. The video signal processing system according to claim 80, wherein said emphasis means emphasizes said spatio-temporally filtered high frequency luminance band component in amplitude by an amount which varies in monotonically increasing relation to an average energy of said spatio-temporally filtered high frequency luminance band component.

83. The video signal processing system according to claim 80, wherein said chrominance signal component is a color-under chrominance signal.

84. The video signal processing system according to claim 80, wherein said emphasis means comprises:

gain control signal generator means for generating an emphasis gain control signal which varies in monotonically increasing relation to an average energy of said spatio-temporally filtered high frequency luminance band component; and emphasis gain means for boosting an amplitude of said spatio-temporally filtered high frequency luminance band component in accordance with said emphasis gain control signal.

85. The video signal processing system of claim 84, wherein said gain control signal generator means comprises:

absolute value means for generating an absolute value signal representing an absolute value of said spatio-temporally filtered high frequency luminance band component;

lowpass filter means for lowpass filtering said absolute value signal to provide an average energy signal representing an average energy of said spatio-temporally filtered high frequency luminance band component; and look-up table means for generating an emphasis gain control signal varying in value in accordance with said average energy signal.

86. The video signal processing system according to claim 84, wherein said emphasis gain means comprises:

multiplier means for multiplying said spatio-temporally filtered high frequency luminance band component by said emphasis gain control signal.

87. The video signal processing system according to claim 80, wherein said emphasis means comprises:

absolute value means for generating an absolute value signal representing an absolute value of said spatio-temporally filtered high frequency luminance band component;

lowpass filter means for lowpass filtering said absolute value signal to provide an average energy signal representing an average energy of said spatio-temporally filtered high frequency luminance band component;

look-up table means for generating an emphasis gain control signal varying in value in accordance with said average energy signal; and multiplier means for multiplying said spatio-temporally filtered high frequency luminance band component by said emphasis gain control signal.

88. The video signal processing system according to claim 80, further comprising:

luminance signal playback means for reproducing said folded video luminance signal from a recording medium; and chrominance signal playback means for reproducing said chrominance-plus-motion signal from said recording medium.

89. The video signal processing system according to claim 88, wherein said recording medium is magnetic tape in a video cassette.

90. A video signal processing system, comprising:

encoder means for encoding an input video signal including at least an input wide bandwidth luminance signal having low and high luminance frequencies to produce therefrom a limited bandwidth video signal containing at least an encoded limited bandwidth luminance signal having a low frequency luminance band component with a bandwidth limited to a limited bandwidth together with a high frequency luminance band component de-emphasized in magnitude from a magnitude thereof in said input wide bandwidth luminance signal and folded into a bandwidth of said low frequency luminance band component and with the amount of de-emphasis of said high frequency luminance band component varying in dependence upon the magnitude thereof in said input wide bandwidth luminance signal; and decoder means for decoding said limited bandwidth video signal to produce therefrom an output video signal including at least a decoded wide bandwidth luminance signal having a bandwidth greater than said limited bandwidth and containing said low frequency luminance band component along with said high frequency luminance band component unfolded from said limited bandwidth signal, and for re-emphasizing said unfolded high frequency luminance band component in magnitude by an amount corresponding to said amount of de-emphasis thereof by said encoder means for thereby restoring said high frequency luminance band component to said magnitude thereof in said input wide bandwidth luminance signal.

91. The video signal processing system of claim 90, wherein the amount of de-emphasis of said high frequency luminance band component effected by said encoder means and the amount of re-emphasis of said high frequency luminance band component effected by said decoder means both vary in proportion to the respective magnitudes thereof.

92. The video signal processing system of claim 90, wherein the amount of de-emphasis of said high frequency luminance band component effected by said encoder means varies in monotonically increasing relation to an average energy thereof, and wherein the amount of re-emphasis of said unfolded high frequency luminance band component effected by said decoder means varies in monotonically decreasing relation to an average energy thereof.

93. A method for processing a wide bandwidth video signal into a limited bandwidth video signal, comprising the steps of:

receiving a wide bandwidth video signal including at least a baseband video luminance signal and producing therefrom a low frequency luminance component having a bandwidth limited to a limited bandwidth and a high frequency luminance component;

reducing said high frequency luminance component in amplitude by an amount which varies in dependence upon an amplitude thereof for de-emphasizing said high frequency luminance component;

shifting a frequency spectrum of said high frequency luminance component to a frequency spectrum of said low frequency luminance component for providing a folded high frequency luminance component; and adding said folded high frequency luminance component to said low frequency luminance component for providing a folded video luminance signal having a bandwidth limited to said limited bandwidth.

94. The method according to claim 93, wherein the amount of de-emphasis of said high frequency luminance component varies in proportion to an amplitude of said high frequency luminance component.

95. The method according to claim 93, wherein the amount of de-emphasis of said high frequency luminance component varies in monotonically increasing relation to an average energy of said high frequency luminance component.

96. The method of claim 93, wherein said step of de-emphasizing said high frequency luminance component comprises the substeps of:

generating an absolute value signal representing an absolute value of said high frequency luminance component;

lowpass filtering said absolute value signal to provide an average energy signal representing an average energy of said high frequency component;

generating a de-emphasis gain control signal varying in monotonically decreasing relation to said average energy signal; and multiplying said high frequency luminance component by said emphasis gain control signal.

97. A method for processing a wide bandwidth video luminance signal into a limited bandwidth video luminance signal, comprising the steps of:

receiving a wide bandwidth video luminance signal and producing therefrom a low frequency luminance component having a bandwidth limited to a limited bandwidth and a high frequency luminance component having a bandwidth not exceeding said limited bandwidth;

reducing said high frequency luminance component in amplitude by an amount which varies in dependence upon an amplitude thereof, for de-emphasizing high frequency luminance component;

shifting said high frequency luminance component to a frequency spectrum of said low frequency luminance component for providing a folded high frequency luminance component; and adding said folded high frequency luminance component to said low frequency luminance component for producing a folded video luminance signal having a bandwidth limited to said limited bandwidth.

98. The method according to claim 97, wherein the amount of de-emphasis of said high frequency luminance component varies in proportion to an amplitude of said high frequency luminance component.

99. The method according to claim 97, wherein the amount of de-emphasis of said high frequency luminance component varies in monotonically increasing relation to an average energy of said high frequency luminance component.

100. The method of claim 97, wherein said step of de-emphasizing said high frequency luminance component comprises the substeps of:

generating an absolute value signal representing an absolute value of said high frequency luminance component;

lowpass filtering said absolute value signal to provide an average energy signal representing an average energy of said high frequency component;

generating a de-emphasis gain control signal varying in monotonically decreasing relation to said average energy signal; and multiplying said high frequency luminance component by said de-emphasis gain control signal.

101. A method for converting a limited bandwidth video luminance signal into a wide bandwidth baseband video luminance signal, comprising the steps of:

receiving a limited bandwidth video luminance signal having a low frequency luminance component with a bandwidth limited to a limited bandwidth and a high frequency luminance component folded into a frequency spectrum of said low frequency luminance component and de-emphasized in amplitude in relation to an original amplitude thereof;

unfolding said limited bandwidth video luminance signal for providing an unfolded baseband luminance signal having said low frequency luminance component of said limited bandwidth video luminance signal together with said high frequency luminance component of said limited bandwidth video luminance signal in unfolded form, whereby a bandwidth of said unfolded baseband luminance signal is greater than said limited bandwidth; and increasing said unfolded high frequency luminance component in amplitude by an amount which varies in dependence upon an amplitude thereof, for providing a wide bandwidth baseband video luminance signal having said low frequency luminance component and said unfolded high frequency luminance component, said unfolded high frequency luminance component being thereby emphasized in amplitude.

102. The method according to claim 101, wherein the amount of emphasis of said unfolded high frequency luminance component varies in proportion to the amplitude thereof.

103. The method according to claim 101, wherein the amplitude of said unfolded high frequency luminance component is increased by an amount which varies in monotonically increasing relation to an average energy thereof.

104. A method for converting a full bandwidth video luminance signal into a limited bandwidth video luminance signal retaining therein luminance information of the full bandwidth luminance signal within a limited bandwidth, and for reconverting the limited bandwidth video luminance signal into a wide bandwidth baseband luminance signal corresponding to the full bandwidth video luminance signal, comprising the steps of:

receiving said full bandwidth video luminance signal and producing therefrom a low frequency luminance component having a bandwidth limited to a limited bandwidth and a high frequency luminance component having a bandwidth not exceeding said limited bandwidth;

reducing said high frequency luminance component in amplitude by an amount dependent upon the amplitude of said high frequency luminance component;

shifting said high frequency luminance component to a frequency spectrum of said low frequency luminance component for producing a folded high frequency luminance component; and adding said folded high frequency luminance component to said low frequency luminance component for producing a limited bandwidth video luminance signal;

unfolding said limited bandwidth video luminance signal for providing an unfolded baseband luminance signal having said low frequency luminance component of said limited bandwidth video luminance signal and said folded high frequency luminance component of said limited bandwidth video luminance signal in unfolded form; and increasing said unfolded high frequency luminance component in amplitude by an amount which varies in dependence upon the amplitude thereof, for providing a wide bandwidth baseband video luminance signal having said low frequency luminance component and said unfolded high frequency luminance component, said unfolded high frequency luminance component being thereby emphasized in amplitude.

105. The method according to claim 104, wherein the amount of de-emphasis of said high frequency luminance component and the amount of emphasis of said unfolded high frequency luminance component both vary in proportion to the respective amplitudes thereof.

106. The method according to claim 105, wherein the amount of de-emphasis of said high frequency luminance component varies in monotonically increasing relation to an average energy thereof, and wherein the amount of emphasis of said unfolded high frequency luminance component varies in monotonically decreasing relation to an average energy thereof.

107. A recording on a narrow bandwidth video medium of a limited bandwidth video signal, said limited bandwidth video signal comprising:

a limited bandwidth luminance signal component carrying luminance information of an original wide bandwidth luminance signal and including:

a low frequency luminance band component corresponding to a low frequency band of said original wide bandwidth luminance signal and having a bandwidth limited to said narrow bandwidth; and a high frequency luminance band component corresponding to a high frequency band of said original wide bandwidth luminance signal and folded into a frequency spectrum of said low frequency luminance band component, said high frequency luminance band component being de-emphasized in amplitude with respect to said high frequency band of said original wide bandwidth luminance signal.

108. A recording on a narrow bandwidth video medium, as set forth in claim 107, wherein the amount of de-emphasis of said high frequency luminance band component varies in proportion to an amplitude of said high frequency band of said original wide bandwidth luminance signal.

109. A recording on a narrow bandwidth video medium, as set forth in claim 107, wherein the amount of de-emphasis of said high frequency luminance band component varies in monotonically increasing relation to an average energy of said high frequency band of said original wide bandwidth luminance signal.

110. A recording on a narrow bandwidth video medium, as set forth in claim 107, further comprising:

a motion signal component carrying information representative of a degree of image motion in said original wide bandwidth luminance signal.

111. A recording on a narrow bandwidth video medium, as set forth in claim 107, further comprising:

a chrominance signal component carrying chrominance information.

112. A recording on a narrow bandwidth video medium of a limited bandwidth video signal, said limited bandwidth video signal comprising:

a limited bandwidth luminance signal component carrying luminance information of an original wide bandwidth video signal and including:

a low frequency luminance band component corresponding to a low frequency luminance band of said original wide bandwidth video signal and having a bandwidth limited to said narrow bandwidth; and a high frequency luminance band component corresponding to a high frequency luminance band of said original wide bandwidth video signal and folded into a frequency spectrum of said low frequency luminance band component, said high frequency luminance band component being de-emphasized in amplitude with respect to said high frequency luminance band of said original wide bandwidth video signal;

a chrominance signal component carrying chrominance information of said original wide bandwidth video signal; and a motion signal component carrying information representative of a degree of image motion in said original wide bandwidth video signal.

113. A recording on a narrow bandwidth video medium, as set forth in claim 112, wherein the amount of de-emphasis of said high frequency luminance band component varies in proportion to an amplitude of said high frequency band of said original wide bandwidth video signal.

114. A recording on a narrow bandwidth video medium, as set forth in claim 112, wherein the amount of de-emphasis of said high frequency luminance band component varies in monotonically increasing relation to an average energy of said high frequency band of said original wide bandwidth video signal.

115. A recording on a narrow bandwidth video medium, as set forth in claim 112, wherein said chrominance signal component is a color-under chrominance signal.

116. A recording on a narrow bandwidth video medium, as set forth in claim 112, wherein said chrominance signal component and said motion signal component are combined into a composite chrominance-plus-motion signal.

117. A recording on a narrow bandwidth video medium, as set forth in claim 112, wherein said chrominance signal component is a quadrature amplitude modulated color-under chrominance signal and wherein said motion signal component is carried in quadrants of said color-under chrominance signal complementary to quadrants occupied at any one time by said chrominance signal component.

118. A limited bandwidth video signal manifested in electric signal form, comprising:

- a limited bandwidth luminance signal component carrying luminance information of an original wide bandwidth luminance signal and including:
- a low frequency luminance band component corresponding to a low frequency band of said original wide bandwidth luminance signal and having a bandwidth limited to said narrow bandwidth; and
- a high frequency luminance band component corresponding to a high frequency band of said original wide bandwidth luminance signal and folded into a frequency spectrum of said low frequency luminance band component, said high frequency luminance band component being de-emphasized in amplitude with respect to said high frequency band of said original wide bandwidth luminance signal.

119. A limited bandwidth video signal manifested in electric signal form, as set forth in claim 118, wherein the amount of de-emphasis of said high frequency luminance band component varies in proportion to an amplitude of said high frequency band of said original wide bandwidth luminance signal.

120. A limited bandwidth video signal manifested in electric signal form, as set forth in claim 118, wherein the amount of de-emphasis of said high frequency luminance band component varies in monotonically increasing relation to an average energy of said high frequency band of said original wide bandwidth luminance signal.

121. A limited bandwidth video signal manifested in electric signal form, as set forth in claim 118, further comprising:

- a motion signal component carrying information representative of a degree of image motion in said original wide bandwidth luminance signal.

122. A limited bandwidth video signal manifested in electric signal form, as set forth in claim 118, further comprising:

- a chrominance signal component carrying chrominance information.

123. A limited bandwidth video signal manifested in electric signal form, comprising:

- a limited bandwidth luminance signal component carrying luminance information of an original wide bandwidth video signal and including:
- a low frequency luminance band component corresponding to a low frequency luminance band of said original wide bandwidth video signal and having a bandwidth limited to said narrow bandwidth; and
- a high frequency luminance band component corresponding to a high frequency luminance band of said original wide bandwidth video signal and folded into a frequency spectrum of said low frequency luminance band component, said high frequency luminance band component being de-emphasized in amplitude with respect to said high frequency luminance band of said original wide bandwidth video signal;
- a chrominance signal component carrying chrominance information of said original wide bandwidth video signal; and
- a motion signal component carrying information representative of a degree of image motion in said original wide bandwidth video signal.

124. A limited bandwidth video signal manifested in electric signal form, as set forth in claim 123, wherein the amount of de-emphasis of said high frequency luminance band component varies in proportion to an amplitude of said high frequency band of said original wide bandwidth video signal.

125. The limited bandwidth video signal according to claim 123, wherein the amount of de-emphasis of said high frequency luminance band component varies in monotonically increasing relation to an average energy of said high frequency band of said original wide bandwidth video signal.

126. The limited bandwidth video signal according to claim 123, wherein said chrominance signal component is a color-under chrominance signal.

127. The limited bandwidth video signal according to claim 123, wherein said chrominance signal component and said motion signal component are combined into a composite chrominance-plus-motion signal.

128. The limited bandwidth video signal according to claim 123, wherein said chrominance signal component is a quadrature amplitude modulated color-under chrominance signal and wherein said motion signal component is carried in quadrants of said color-under chrominance signal complementary to quadrants occupied at any one time by said chrominance signal component.

* * * * *